(12) United States Patent
Wardle et al.

(10) Patent No.: US 8,337,979 B2
(45) Date of Patent: Dec. 25, 2012

(54) NANOSTRUCTURE-REINFORCED COMPOSITE ARTICLES AND METHODS

(75) Inventors: Brian L. Wardle, Lexington, MA (US); Anastasios John Hart, Somerville, MA (US); Enrique J. Garcia, Cambridge, MA (US); Alexander Henry Slocum, Bow, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 1468 days.

(21) Appl. No.: 11/895,621

(22) Filed: Aug. 24, 2007

(65) Prior Publication Data
US 2008/0075954 A1 Mar. 27, 2008

Related U.S. Application Data

(63) Continuation-in-part of application No. PCT/US2007/011913, filed on May 18, 2007.

(60) Provisional application No. 60/802,040, filed on May 19, 2006.

(51) Int. Cl.
*B32B 27/04* (2006.01)

(52) U.S. Cl. ............... 428/297.4; 428/298.1; 428/300.7; 977/742; 977/750; 977/752; 977/753

(58) Field of Classification Search ......................... None
See application file for complete search history.

(56) References Cited

U.S. PATENT DOCUMENTS

| | | | |
|---|---|---|---|
| 3,580,731 A | 5/1971 | Milewski et al. |
| 4,560,603 A | 12/1985 | Giacomel |
| 4,770,926 A | 9/1988 | Yamamura et al. |
| 4,892,693 A | 1/1990 | Perrotta et al. |
| 5,149,584 A | 9/1992 | Baker et al. |
| 6,265,333 B1 | 7/2001 | Dzenis et al. |
| 6,420,293 B1 | 7/2002 | Chang et al. |
| 6,495,258 B1 | 12/2002 | Chen et al. |
| 7,160,531 B1 | 1/2007 | Jacques et al. |

(Continued)

FOREIGN PATENT DOCUMENTS

EP  1 489 630 A1  12/2004

(Continued)

OTHER PUBLICATIONS

Barber, A.H., et al., "*Measurement of Carbon Nanotube-Polymer Interfacial Strength*," Applied Physics Letters, vol. 82(23), pp. 4140-4142, 2003.

(Continued)

*Primary Examiner* — Camie Thompson
(74) *Attorney, Agent, or Firm* — Wolf, Greenfield & Sacks, P.C.

(57) ABSTRACT

The present invention provides methods for uniform growth of nanostructures such as nanotubes (e.g., carbon nanotubes) on the surface of a substrate, wherein the long axes of the nanostructures may be substantially aligned. The nanostructures may be further processed for use in various applications, such as composite materials. For example, a set of aligned nanostructures may be formed and transferred, either in bulk or to another surface, to another material to enhance the properties of the material. In some cases, the nanostructures may enhance the mechanical properties of a material, for example, providing mechanical reinforcement at an interface between two materials or plies. In some cases, the nanostructures may enhance thermal and/or electronic properties of a material. The present invention also provides systems and methods for growth of nanostructures, including batch processes and continuous processes.

88 Claims, 43 Drawing Sheets

U.S. PATENT DOCUMENTS

| | | | |
|---|---|---|---|
| 7,323,157 | B2 | 1/2008 | Kinloch et al. |
| 7,537,825 | B1* | 5/2009 | Wardle et al. ............ 428/292.1 |
| 2003/0012721 | A1 | 1/2003 | Nakayama et al. |
| 2003/0143453 | A1 | 7/2003 | Ren et al. |
| 2003/0231471 | A1 | 12/2003 | De Lorenzo et al. |
| 2004/0071870 | A1 | 4/2004 | Knowles et al. |
| 2004/0105807 | A1 | 6/2004 | Fan et al. |
| 2005/0081983 | A1 | 4/2005 | Nakayama et al. |
| 2005/0152826 | A1 | 7/2005 | Shatwell |
| 2005/0167647 | A1 | 8/2005 | Huang et al. |
| 2005/0170089 | A1 | 8/2005 | Lashmore et al. |
| 2006/0073089 | A1 | 4/2006 | Ajayan et al. |
| 2006/0166003 | A1 | 7/2006 | Khabashesku et al. |
| 2006/0240238 | A1* | 10/2006 | Boussaad et al. ......... 428/293.4 |
| 2006/0252853 | A1 | 11/2006 | Ajayan et al. |
| 2007/0090489 | A1* | 4/2007 | Hart et al. ..................... 257/618 |
| 2007/0092431 | A1 | 4/2007 | Resasco et al. |
| 2007/0128960 | A1 | 6/2007 | Nejhad et al. |
| 2010/0192851 | A1 | 8/2010 | Shah et al. |
| 2010/0276072 | A1 | 11/2010 | Shah et al. |
| 2010/0279569 | A1 | 11/2010 | Shah et al. |

FOREIGN PATENT DOCUMENTS

| | | |
|---|---|---|
| EP | 1637828 A2 | 3/2006 |
| EP | 1 652 573 A1 | 5/2006 |
| FR | 2865739 A1 | 8/2005 |
| JP | 2001080912 A | 3/2001 |
| JP | 2002293518 A | 10/2002 |
| JP | 17-022141 | 1/2005 |
| JP | 2005-22141 | 1/2005 |
| JP | 2005200676 | 7/2005 |
| JP | 2005200676 A | 7/2005 |
| WO | WO 0194260 A1 | 12/2001 |
| WO | WO 03/069019 A1 | 8/2003 |
| WO | WO 03/093174 A1 | 11/2003 |
| WO | WO 2005/028549 | 3/2005 |
| WO | WO 2005/044723 A2 | 5/2005 |
| WO | WO 2007/136755 A2 | 11/2007 |
| WO | WO 2008/054541 A2 | 5/2008 |
| WO | WO 2009/029218 A2 | 3/2009 |

OTHER PUBLICATIONS

Bennett, R.D., "Controlling the Morphology of Carbon Nanotube Films by Varying the Areal Density of Catalyst Nanoclusters Using Block Copolymer Micellar Thin Films," Advanced Materials, vol. , pp. 2274-2279, 2006.

Bennett, R.D., et al., "Using Block Copolymer Micellar Thin Films as Templates for the Production of Catalysts for Carbon Nanotube Growth," Chemistry of Materials, vol. 16(26), pp. 5589-5598, 2004.

Bennett, R.D., et al., "Creating Patterned Carbon Nanotube Catalysts through the Microcontact Printing of Block Copolymer Micellar Thin Films," Langmuir, vol. 22, No. 20, pp. 8273-8276, Aug. 23, 2006.

Boskovic, B.O., et al., "Low Temperature Synthesis of Carbon Nanofibres on Carbon Fibre Matrices," Carbon, vol. 43, pp. 2643-2648.

Breuer, O., et al., "Big Returns From Small Fibers: A Review of Polymer/Carbon Nanotube Composites," Polymer Composites, vol. 25(6), pp. 630-645, 2004.

Cao, A., et al., "Multifunctional Brushes Made From Carbon Nanotubes," Nature Materials, vol. 4, pp. 540-545, 2005.

Ci, L.J., et al., "Direct Growth of Carbon Nanotubes on the Surface of Ceramic Fibers," Carbon, vol. 43(4), pp. 883-886. 2005.

Cooper, C.A., et al., "Detachment of Nanotubes from a Polymer Matrix," Applied Physics Letter, vol. 81(20), pp. 3873-3875, 2002.

Coleman, J.N. et al., "Improving the Mechanical Properties of Single-Walled Carbon Nanotube Sheets by Intercalation of Polymeric Adhesives," Applied Physics Letters, vol. 82(11), pp. 1682-1684, 2003.

Coleman, J.N. et al., "High-Performance Nanotube-Reinforced Plastics: Understanding the Mechanism of Strength Increase," Advanced Functional Materials, vol. 14(8), pp. 791-798, 2004.

Coleman, J.N., et al., "Small but strong: A review of the mechanical properties of carbon nanotube-polymer composites," Carbon, vol. 44, pp. 1-29, 2006.

Du, F.M., "Effect of Nanotube Alignment on Percolation Conductivity in Carbon Nanotube/Polymer Composites," Physical Review B, vol. 72(12), 2005.

Endo, M., et al., "Atomic Nanotube Welders: Boron Interstitials Triggering Connections in Double-Walled Carbon Nanotubes," Nano Letters, vol. 5(6), pp. 1099-1105, 2005.

Fan, S.S., et al., "Self-Oriented Regular Arrays of Carbon Nanotubes and Their Field Emission Properties," Science, vol. 283(5401), pp. 512-514, 1999.

Garcia, E.J., et al., "(Student Paper) Fabrication and Testing of Long Carbon Nanotubes Grown on the Surface of Fibers for Hybrid Composites," presented at the 47th AIAA/ASME/ASCE/AJS/ASC Structures, Structural Dynamics, and Materials Conference, Newport, R.I., May 1-4, 2006.

Hart, A.J., et al., "Desktop Growth of Carbon-Nanotube Monoliths with In Situ Optical Imaging," Small Journal, vol. 3, No. 5, pp. 772-777, Apr. 5, 2007.

Hart, A.J., et al., "Rapid Growth and Flow-Mediated Nucleation of Millimeter-Scale Aligned Carbon Nanotube Structures From Thin-Film Catalyst," Journal of Physical Chemistry B, vol. 110, Mar. 10, 2006, pp. 8250-8257.

Hart, A.J., et al., "Growth of Conformal Single-Walled Carbon Nanotube Films from Mo/Fe/$Al_2O_3$ Deposited by Electron Beam Evaporation," Carbon, vol. 44(2), pp. 348-359, 2006.

Hart, A.J., et al., "Force Output, Control of Film Structure, and Microscale Shape Transfer by Carbon Nanotube Growth under Mechanical Pressure," Nano Letters, vol. 6, No. 6, pp. 1254 1260, 2006.

Kwok, K., et al., "Continuous Deposition of Carbon Nanotubes on a Moving Substrate by Open-Air Laser-Induced Chemical Vapor Deposition," Carbon, vol. 43(12), pp. 2571-2578, 2005.

Kis, A., et al., "Reinforcement of Single-Walled Carbon Nanotube Bundles by Intertube Bridging," Nature Materials, vol. 3(3), pp. 153-157, 2004.

Koratkar, N.A., et al., "Multifunctional Structural Reinforcement Featuring Carbon Nanotube Films," Composites Science and Technology, vol. 63, pp. 1525-1531, 2003.

Krasheninnikov, A.V. et al., "Ion-Irradiation-Induced Welding of Carbon Nanotubes," Physical Review B., vol. 66(24):2455403-1-6, 2002.

Krasheninnikov, A.V. et al., "Irradiation Effects in Carbon Nanotubes," Nuclear Instruments and Methods in Physics Research B, vol. 216, pp. 355-366, 2004.

Sandler, J.K.W., et al., "Ultra-Low Electrical Percolation Threshold in Carbon-Nanotube-Epoxy Composites," Polymer, vol. 44(19), pp. 5893-5899, 2003.

Terrones, M., et al., "Controlled Production of Aligned-Nanotube Bundles," Nature, vol. 388(6637), pp. 52-55, 1997.

Thostenson, E.T., et al., "Advances in the Science and Technology of Carbon Nanotubes and Their Composites: A Review," Composites Science and Technology, 61(13):1899-1912, 2001.

Thostenson, E.T., et al.,"Nanocomposites in Context," Composites Science and Technology, vol. 65(3-4):491-516, 2005.

Thostenson, E.T., et al., "Carbon Nanotube/Carbon Fiber Hybrid Multiscale Composites," Journal of Applied Physics, vol. 91(9), pp. 6034-6037, 2002.

Veedu, V.P., et al., "Multifunctional Composites Using Reinforced Laminae With Carbon-Nanotube Forests," Nature Materials, vol. 5, pp. 457-462, Jun. 2006.

Wagner, H.D., et al., "Nanotube-Polymer Adhesion: A Mechanics Approach," Chemical Physics Letters, vol. 361(1-2), pp. 57-61, 2002.

Zhao, B., et al, "A Bone Mimic Based on the Self-Assembly of Hydroxyapatite on Chemically Functionalized Single-Walled Carbon Nanotubes," Chem. Mater., vol. 17(120), pp. 3225-3241, 2005.

International Search Report and Written Opinion dated Dec. 4, 2007 in PCT/US2007/011914.

International Preliminary Report on Patentability and Written Opinion dated Dec. 4, 2008 in PCT/US2007/011914.

International Search Report and Written Opinion dated Feb. 2, 2009 in PCT/US2007/011913.

International Preliminary Report on Patentability and Written Opinion dated Feb. 26, 2009 in PCT/US2007/011913.

"*Bucky-Paper Systems for Treatment of Acute Wounds*", Nanotech Briefs, Oct. 2005, vol. 2/No. 7, pp. 14-15.

All Office Actions and Responses filed in U.S. Appl. No. 11/386,378.

International Search Report, from PCT/US2008/009996. mailed Jul. 6, 2009.

Hart, J., "Chemical, Mechanical, and Thermal Control of Substrate-Bound Carbon Nanotube Growth", Doctoral Thesis, Department of Mechanical Engineering, MIT, Dec. 31, 2006.

European Extended Search Report mailed Sep. 15, 2011 from European Patent Application No. 11176264.7.

Zhu et al., "Direct Synthesis of Long Single-Walled Carbon Nanotube Strands," Science, vol. 296, No. 5569, May 3, 2002: 884-886, XP-002273566, DOI:10.1126/SCIENCE.1066996.

Supplementary European Search Report, Application No. EP 08828516.8, dated Aug. 25, 2010, 7 pages.

Official Communication from corresponding European Patent Application No. 07 867 126.0, mailed Dec. 22, 2009.

Official Communication from corresponding European Patent Application No. 07 867 126.0, mailed Jul. 21, 2011.

European Search Report for European Application No. 11196015.9 dated Mar. 16, 2012.

European Search Report for European Application No. 11196014.2 dated Mar. 16, 2012.

Huh et al., "Control of carbon nanotube growth using cobalt nanoparticles as catalyst," Applied Surface Science, Elsevier, vol. 249 (2005): 145-150.

* cited by examiner

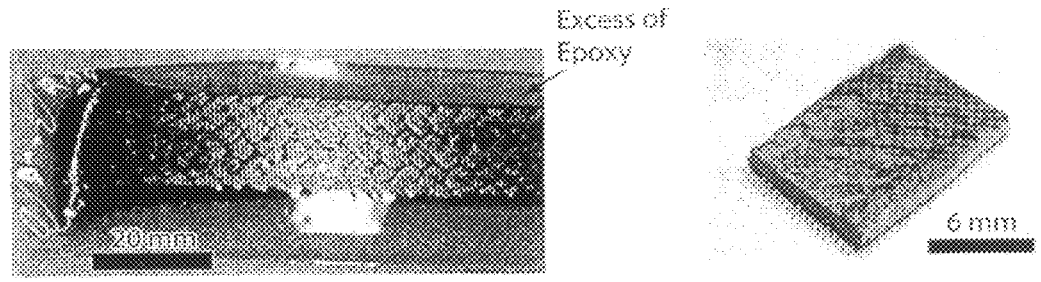
Fig. 24A    Fig. 24B
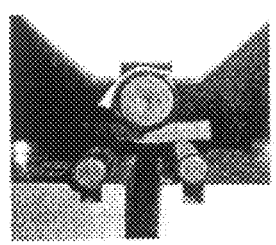    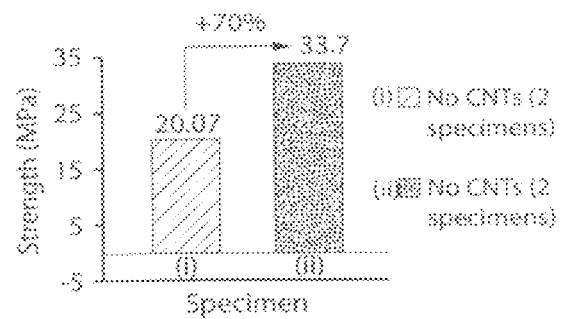
Fig. 25A    Fig. 25B

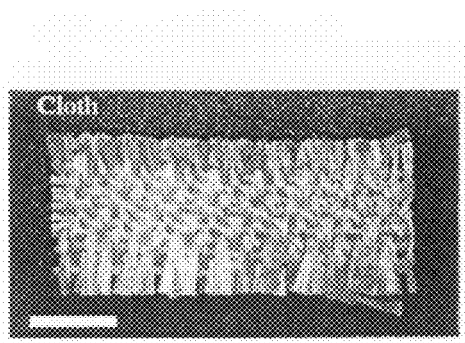
Fig. 30A
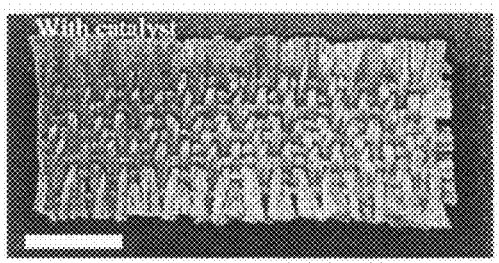
Fig. 30B
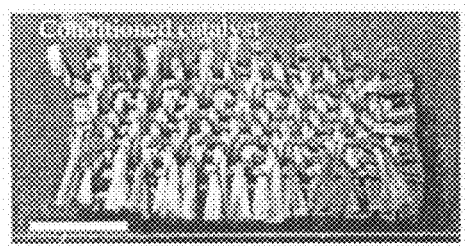
Fig. 30C
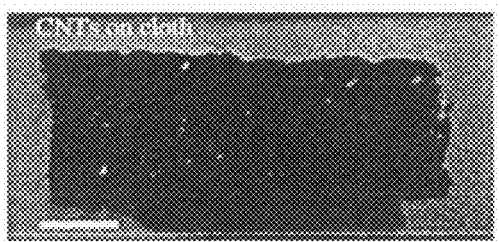
Fig. 30D
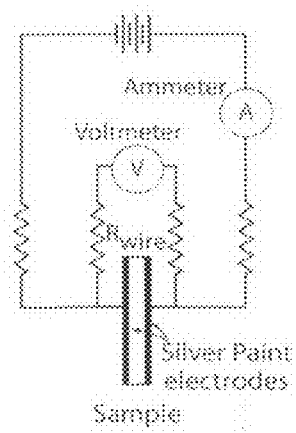
Fig. 31A
| Growth Time | CNT Volume Fraction (%) | In-Plane Resistivity (Ohm mm) | Through-thickness Resistivity (Ohm mm) |
|---|---|---|---|
| 0 min (baseline) | 0.00 | 7.28×10⁵ | 3.10×10⁹ |
| 0 min (baseline) | 0.00 | 7.81×10⁵ | 1.96×10⁹ |
| 0.5 min | 0.56 | 131.49 | 928.59 |
| 2 min | 2.27 | 7.05 | 82.47 |
| 2 min | 2.30 | 9.22 | — |
| 5 min | 2.90 | 9.66 | 64.62 |
Fig. 31B

NANOSTRUCTURE-REINFORCED COMPOSITE ARTICLES AND METHODS

RELATED APPLICATIONS

This is application is a continuation-in-part of International Patent Application No. PCT/US2007/011913, filed May 18, 2007, which claims priority to U.S. Provisional Application Ser. No. 60/802,040, filed May 19, 2006.

STATEMENT REGARDING FEDERALLY SPONSORED RESEARCH OR DEVELOPMENT

This invention was made with the support under the following government contract: DMI-0521985 awarded by the National Science Foundation. The government has certain rights in the invention.

FIELD OF THE INVENTION

The present invention generally relates to the synthesis and processing of nanostructures, composite materials comprising nanostructures, and related systems and methods.

BACKGROUND OF THE INVENTION

Composites are heterogeneous structures comprising two or more components, the combination taking advantage of the individual properties of each component as well as synergistic effects if relevant. Advanced composites refer to a class of materials in which engineered (e.g., man-made) fibers are embedded in a matrix, typically with the fibers being aligned or even woven such that a material with directional (anisotropic) properties is formed. A common example of an advanced composite is graphite-epoxy (Gr/Ep) wherein continuous aligned carbon fibers (stiff/strong/light) are embedded in a polymer (epoxy) matrix. Materials such as these have been used in the Stealth Bomber and Fighter and in sporting equipment, among other applications. Advanced composite systems comprising multiple materials can also be useful in applications where performance benefits from weight savings.

Combining carbon nanotubes (CNTs) with other materials, including macro-advanced composites, can create yet new materials with enhanced physical properties, particularly enhanced engineering properties. Specifically, CNTs have been studied and applied widely as reinforcements for polymers. CNTs have been shown to exhibit strong adhesion to several polymers, for example, where individual CNTs are embedded in and then pulled out of a thermoplastic. While the use of CNTs in composite materials has been studied, existing CNT processing techniques often display several drawbacks. For example, the syntheses of CNTs often result in structures having large diameter and insufficient length, which often results in poor alignment of the CNT axes. Also, dispersion of the CNTs in secondary materials, which typically requires uniform wetting of the CNTs by the secondary materials, is often hindered by CNT agglomeration. Last, alignment of CNTs in the secondary materials may be difficult to achieve in general, particularly when alignment of nanotubes is desired in a system comprising large (e.g., orders of micron diameter) advanced fibers, a secondary material (matrix), and well-aligned CNTs in the secondary material. There are numerous examples of composites comprised of disordered arrangements and/or low volume fractions of CNTs, which exhibit one or more of these drawbacks.

Accordingly, improved materials and methods are needed.

SUMMARY OF THE INVENTION

The present invention provides methods of forming composite articles, comprising providing a first and a second substrate, each having a joining surface; arranging a set of substantially aligned nanostructures on or in the joining surface of at least one of the first and second substrates such that the nanostructures are dispersed uniformly on or in at least 10% of the joining surface; and binding the first and second substrates to each other via their respective joining surfaces to form an interface of the substrates, wherein the interface comprises the set of substantially aligned nanostructures.

The present invention also provides methods of forming composite articles, comprising providing a first and a second substrate, each having a joining surface; arranging a set of substantially aligned nanostructures on or in the joining surface of at least one of the first and second substrates, wherein the nanostructures have an average diameter of 100 nm or less; and binding the first and second substrates to each other via their respective joining surfaces to form an interface of the substrates, wherein the interface comprises the set of substantially aligned nanostructures.

The present invention also provides methods of forming composite articles comprising providing a substrate comprising a plurality of fibers associated with each other to form a cohesive structure; and arranging a set of substantially aligned nanostructures in association with the plurality of fibers such that the nanostructures are dispersed essentially uniformly throughout the structure.

The present invention also provides methods of forming composite articles comprising providing a first and a second prepreg composite ply, each having a joining surface; arranging a set of substantially aligned nanotubes on or in the joining surface of at least one of the first and second composite plies such that the nanotubes are dispersed uniformly on or in at least 10% of the joining surface; binding the first and second composite plies to each other via their respective joining surfaces to form an interface of the plies, wherein the interface comprises the set of substantially aligned nanotubes; and curing the prepreg to bind the nanotubes and prepreg composite plies.

The present invention also provides methods of forming composite articles comprising providing a substrate with a surface comprising a set of substantially aligned nanostructures on or in the surface, wherein the long axes of the nanostructures are substantially aligned in a orientation that is substantially non-parallel to the surface; and treating the substrate with a mechanical tool to change the orientation of the nanostructures such that the long axes of the nanostructures are substantially aligned in a orientation that is parallel to the surface.

The present invention also relates to composite articles comprising a first material layer, and a second material layer integrally connected to the first material layer, forming an interface of the material layers, the interface comprising a set of nanostructures dispersed uniformly throughout at least 10% of the interface, wherein the long axes of the nanostructures are substantially aligned and non-parallel to the interface of the material layers.

The present invention also relates to composite articles comprising a first material layer, and a second material layer integrally connected to the first material layer, forming an interface of the material layers, the interface comprising a set of nanostructures, wherein the long axes of the nanostructures are substantially aligned and non-parallel to interface of the material layers and wherein the nanostructures have an average diameter of 100 nm or less.

The present invention also relates to composite articles comprising a substrate comprising a plurality of fibers associated with each other to form a cohesive structure, and a set of nanostructures arranged in association with the plurality of fibers such that the nanostructures are dispersed essentially uniformly throughout the structure.

The present invention also provides methods of growing nanostructures comprising providing a growth substrate with a surface comprising a catalyst material; exposing a first portion of the growth substrate to a set of conditions selected to cause catalytic formation of nanostructures on the surface; while exposing the first portion of the growth substrate to the set of conditions, removing the nanostructures from a second portion of the surface of the growth substrate; and repeating the exposing and removing acts with said growth substrate at least one time.

The present invention also provides methods of growing nanostructures comprising providing a growth substrate with a surface comprising a first catalyst material; exposing a first portion of the growth substrate to a first set of conditions selected to cause catalytic formation of nanostructures on the surface; and while exposing the first portion of the growth substrate to the first set of conditions, treating a second portion of the growth substrate to a second set of conditions selected to reactivate the first catalyst material or replace the first catalyst material with a second catalyst material.

The present invention also provides methods of growing nanostructures comprising providing a growth substrate with a surface comprising a first catalyst material; exposing growth substrate to a first set of conditions selected to cause catalytic formation of nanostructures on the surface; removing nanostructures from the surface of the growth substrate; and treating the growth substrate to a second set of conditions selected to reactivate the first catalyst material or replace the first catalyst material with a second catalyst material.

The present invention also provides systems for growing nanostructures comprising a growth substrate with a surface suitable for growing nanostructures thereon, the growth substrate comprising a catalyst material; a region able to expose the surface of the growth substrate to a set of conditions selected to cause catalytic formation of nanostructures on the surface of the growth substrate; and a region able to expose the surface of the growth substrate to a set of conditions selected to remove nanostructures from the surface of the growth substrate.

The present invention also provides systems for growing nanostructures comprising a growth substrate with a surface suitable for growing nanostructures thereon; a region able to expose the surface of the growth substrate to a set of conditions selected to cause catalytic formation of nanostructures on the surface of the growth substrate; a region able to expose the surface of the growth substrate to a set of conditions selected to remove nanostructures from the surface of the growth substrate; and a region able to expose the surface of the growth substrate to a set of conditions selected to reactivate the first catalyst material or replace the first catalyst material with a second catalyst material, wherein the growth substrate is a rotatable, hollow, and cylindrical substrate and wherein the nanostructures are formed directly on the surface of the growth substrate.

The present invention also provides systems for growing nanostructures comprising a growth substrate having a surface suitable for growing nanostructures thereon, wherein the surface is a topologically continuous surface; a region able to expose a first portion of the surface of the growth substrate to a set of conditions selected to cause catalytic formation of nanostructures on the surface of the growth substrate; a region able to expose a second portion of the surface of the growth substrate to a set of conditions selected to remove nanostructures from the surface of the growth substrate without substantial removal of the catalyst material from the growth substrate; a region able to expose a third portion of the surface of the growth substrate to a set of conditions selected to chemically treat catalyst material on the surface of the growth substrate wherein, in operation, at least two regions are operated simultaneously.

The present invention also provides methods for forming a composite article comprising providing a first and a second substrate, each having a joining surface; arranging a set of substantially aligned nanostructures on or in the joining surface of at least one of the first and second substrates such that the nanostructures are dispersed uniformly on or in at least 10% of the joining surface, wherein the arranging comprises transfer of the nanostructures from a substantially planar surface to a non-planar surface; and binding the first and second substrates to each other via their respective joining surfaces to form an interface of the substrates, wherein the interface comprises the set of substantially aligned nanostructures.

BRIEF DESCRIPTION OF THE DRAWINGS

FIG. 24A shows a photograph of a carbon nanotube/alumina/epoxy nanoengineered laminate.

FIG. 24B shows a photograph of a cut sample of a carbon nanotube/alumina/epoxy nanoengineered laminate.

FIG. 25A shows a composite structure comprising carbon nanotubes positioned in a short beam shear (SBS) apparatus.

FIG. 25B shows the results of the SBS test of composite structures with and without carbon nanotubes.

FIG. 30 shows a sample of alumina cloth in different stages of carbon nanotube growth, including (a) an un-coated alumina cloth, (b) the alumina cloth after application of the catalyst material, (c) the alumina cloth with a conditioned catalyst, and (d) carbon nanotubes grown on the surface of the fibers in the cloth.

FIG. 31A shows, schematically, an experimental setup for electrical conductivity tests, where a composite is placed between two silver paint electrodes and its electrical properties were measures.

FIG. 311B shows the results from the electrical resistivity measurements.

DETAILED DESCRIPTION

The present invention generally relates to the synthesis and processing of nanostructures including nanotubes, composite materials comprising nanostructures, and related systems and methods.

Generally, the present invention provides methods for uniform growth of nanostructures such as nanotubes (e.g., carbon nanotubes) on the surface of a substrate, wherein the long axes of the nanostructures may be substantially aligned. The nanostructures may be further processed for use in various applications, such as composite materials. For example, a set of aligned nanostructures may be formed and transferred, either in bulk or to another surface, to another material to enhance the properties of the material. In some cases, the nanostructures may enhance the mechanical properties of a material, for example, providing mechanical reinforcement at an interface between two materials or plies. In some cases, the nanostructures may enhance thermal and/or electronic properties of a material. In some cases, the aligned nanostructures may provide the ability to tailor one or more anisotropic properties of a material, including mechanical, thermal, electrical, and/or other properties. The present invention also provides systems and methods for growth of nanostructures, including batch processes and continuous processes.

The present invention advantageously provides systems and methods for producing substantially aligned nanostructures, having sufficient length and/or diameter to enhance the properties of a material when arranged on or within the material. Also, the nanostructures described herein may be uniformly dispersed within various matrix materials, which may facilitate formation of composite structures having improved mechanical, thermal, electrical, or other properties. Methods of the invention may also allow for continuous and scalable production of nanostructures, including nanotubes, nanowires, nanofibers, and the like, in some cases, on moving substrates. As used herein, the term "nanostructure" refers to elongated chemical structures having a diameter on the order of nanometers and a length on the order of microns to millimeters, resulting in an aspect ratio greater than 10, 100, 1000, 10,000, or greater. In some cases, the nanostructure may have a diameter less than 1 µm, less than 100 nm, 50 nm, less than 25 nm, less than 10 nm, or, in some cases, less than 1 nm. Typically, the nanostructure may have a cylindrical or pseudo-cylindrical shape. In some cases, the nanostructure may be a nanotube, such as a carbon nanotube.

Figure 1A:
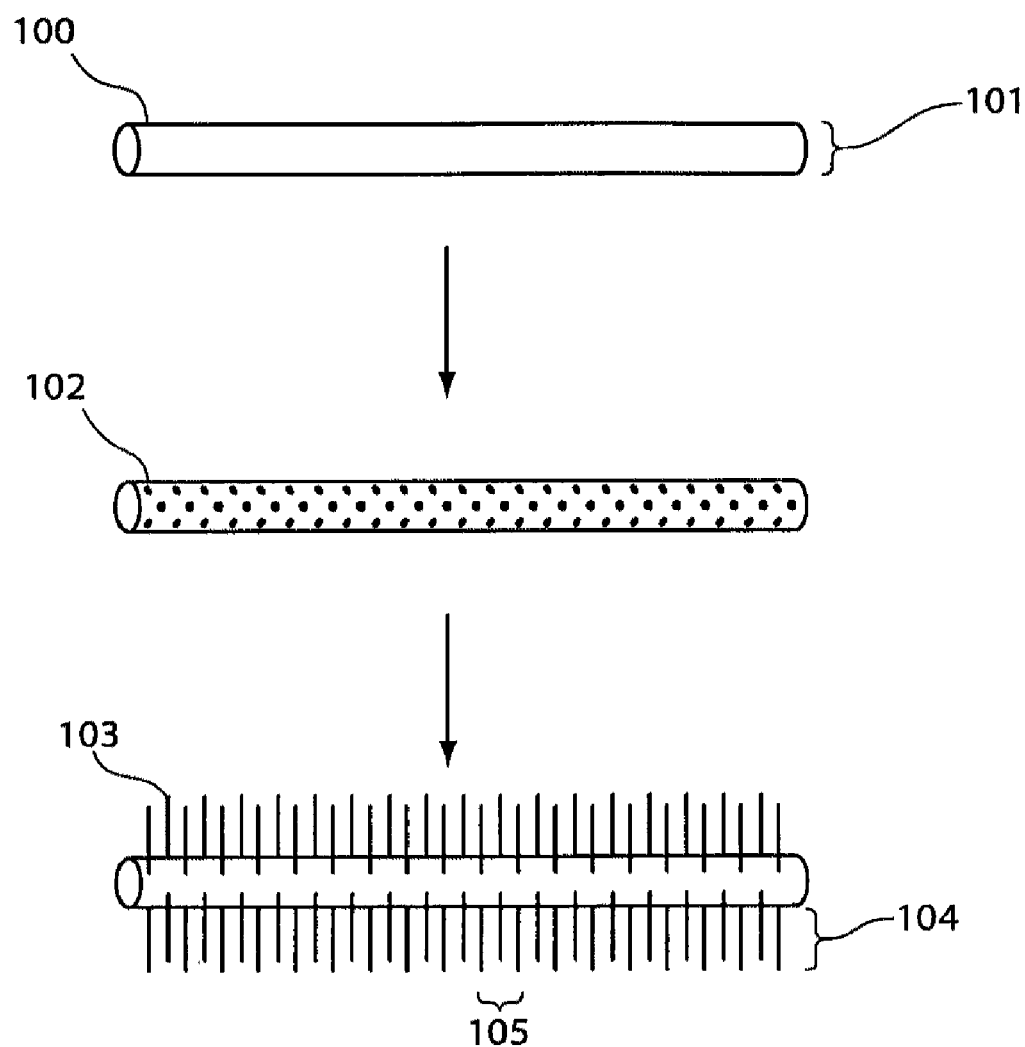
FIG. 1A growth of nanostructures on the surface of a cylindrical growth substrate.

Methods of the invention may generally comprise growth of nanostructures on the surface of a growth substrate, wherein the growth substrate comprises a catalyst material positioned on or in the surface of the growth substrate. The growth substrate may have any shape, including substrates comprising a substantially flat surface or substrates comprising a non-planar surface. In some embodiments, the growth substrate may be an elongated structure having a wide range of cross-sectional shapes, including square, rectangular, triangular, circular, oval, or the like. In some cases, the growth substrate may be a fiber, tow, strip, weave, or tape. In some cases, the growth substrate may be a cylindrical substrate, such as a fiber. For example, FIG. 1A illustrates a fiber 100 having a diameter 101. Catalyst material may be formed on the surface of the fiber, for example, as metal nanoparticles or precursors thereof, to form growth substrate 102. Exposure of the growth substrate to a set of conditions selected to cause catalytic formation and/or growth of nanostructures on the surface of the growth substrate may produce a set of substantially aligned nanostructures 103 having a length 104 and positioned at a distance 105 from an adjacent nanostructure on the surface of the growth substrate.

Figure 1B:
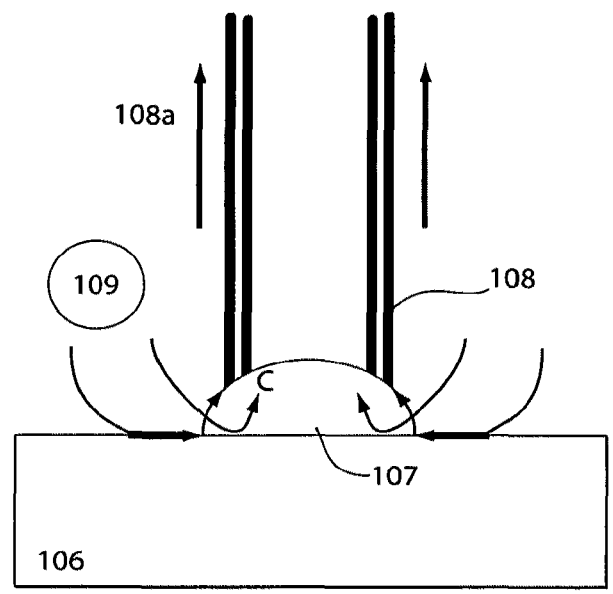
FIG. 1B shows a schematic representation of a carbon nanotube growing from a catalyst nanoparticle on a growth substrate.

FIG. 1B shows a schematic representation of a nanostructure growing from a catalyst material (e.g., nanoparticle) on a growth substrate. Catalyst material 107 is positioned on the surface of growth substrate 106, and, when placed under a set of conditions selected to facilitate nanostructure growth, nanostructures 108 may grow from catalyst material 107. Nanostructure precursor material 109 (e.g., a hydrocarbon gas, alcohol vapor molecule, or other carbon-containing species), may be delivered to growth substrate 106 and contact or permeate the growth substrate surface, the catalyst material surface, and/or the interface between the catalyst material and the growth substrate. In the growth of carbon nanotubes, for example, the nanostructure precursor material may comprise carbon, such that carbon dissociates from the precursor molecule and may be incorporated into the growing carbon nanotube, which is pushed upward from the growth substrate in general direction 108a with continued growth.

In some embodiments, the set of substantially aligned nanostructures formed on the surface may be oriented such that the long axes of the nanostructures are substantially non-planar with respect to the surface of the growth substrate. In some cases, the long axes of the nanostructures are oriented in a substantially perpendicular direction with respect to the surface of the growth substrate, forming a nanostructure "forest." As described more fully below, an advantageous feature of some embodiments of the invention may be that the alignment of nanostructures in the nanostructure "forest" may be substantially maintained, even upon subsequent processing (e.g., transfer to other surfaces and/or combining the forests with secondary materials such as polymers).

The present invention provides various composite articles comprising a first material layer, and a second material layer integrally connected to the first material layer, forming an interface of the material layers. The interface may comprise a set of nanostructures wherein the long axes of the nanostructures are substantially aligned and non-parallel to interface of the material layers. In some cases, the nanostructures may be dispersed uniformly throughout at least 10% of the interface, or, at least 20%, 30%, 40%, 50%, 60%, 70%, 80%, 90%, 95%, or 100% of the interface. As used herein, "dispersed uniformly throughout at least 10% of the interface" refers to the substantially uniform arrangement of nanostructures over at least 10% of the area of the interface. That is, the nanostructures are primarily arranged uniformly over the area of the interface, rather than in a heterogeneous arrangement of bundles or pellets.

Figure 9A:
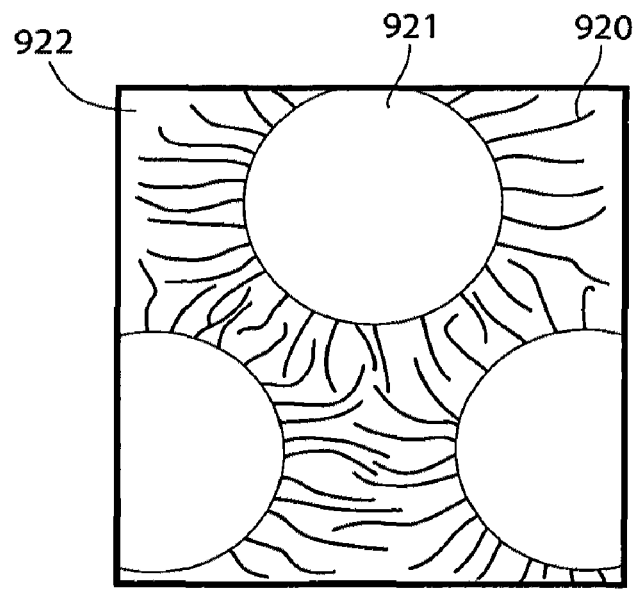
FIG. 9A illustrates the intralaminar interaction of nanotubes of adjacent fibers within a material.
Figure 9B:
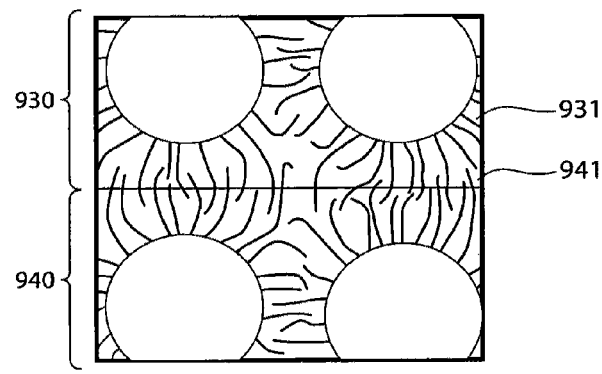
FIG. 9B illustrates the interlaminar interaction of nanotubes of adjacent components of a composite.
Figure 9C:
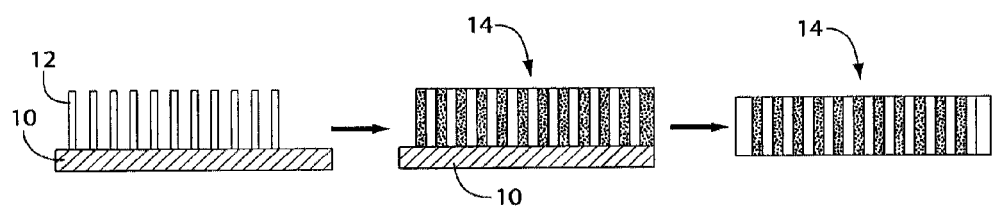
FIG. 9C shows various stages in the formation of a material containing aligned nanostructures.

In some cases, the nanostructures may be arranged such that nanostructures associated with the first material layer may penetrate into at least a portion of the second material layer. Similarly, nanostructures that may be associated with the second material layer may also penetrate into at least a portion of the first material layer. In this arrangement, the interface formed between the first material layer and the second material layer does not form a discrete and/or separate layer from the first and second material layers. Rather, the binding between the first material layer and the second material layer is strengthened by the interpenetration of nanostructures from both material layers. For example, FIG. 9B shows a composite article comprising a substrate 930 and a substrate 940, wherein nanostructures 941 associated with a component (e.g., fiber) of substrate 940 penetrates the interface between substrate 930 and substrate 940 to contact at least a portion of substrate 930. This entanglement between nanostructures of different substrates may reinforce the interface between the substrates. In an illustrative embodiment, FIG. 9F shows a composite article 950 having a first material layer 952 and a second material layer 954, joined to form an interface 956 wherein nanostructures of different material layers may entangle and reinforce the interface between the substrates.

In some embodiments, the invention provides composite articles comprising a substrate having a plurality of fibers associated with each other to form a cohesive structure, and a set of nanostructures arranged in association with the plurality of fibers. As shown in FIG. 9A, substrate 922 may comprise a plurality of fiber 921 having nanostructures 920 arranged substantially uniformly over the surface of the fiber. In some cases, the nanostructures may be arranged radially around and uniformly over a substantial majority of the surface of a fiber. Nanostructures of adjacent fibers may interact to reinforce the interactions between fibers, producing enhanced properties. In some cases, the nanostructures are dispersed essentially uniformly throughout the structure. For example, the structure may be a tow of fibers, a structure comprising interwoven or knit fibers, a weave, or other structure comprising a plurality of fibers in contact with one another to form a cohesive structure. The interaction of nanostructures from adjacent fibers may enhance the properties of the composite article, reinforcing the interaction between individual fibers. In some cases, the structure comprises a set of fibers exposed at the surface of the substrate and a set of fibers not exposed at the surface of the substrate, i.e., the fibers are positioned in an interior location within the substrate. In other cases, the substrate might comprise an arrangement of fibers such that an individual fiber may comprise one or more portions exposed at the surface of the substrate and one or more portions not exposed at the surface of the substrate. For example, as shown in FIG. 9G, article 960 comprises a plurality of fibers arranged in a woven pattern, when an individual fiber may comprise a portion that is exposed at the surface of article 960 and another portion which is in contact with or covered by another fiber such that the portion is not exposed at the surface. As shown in FIG. 9G, fiber 966 may comprise nanostructures dispersed essentially uniformly over the surface area of the fibers such that nanostructures of fiber 966 may interact with nanostructures of adjacent fiber 968.

The ability to arrange nanostructures essentially uniformly throughout structures comprising plurality of fibers allows for the enhanced mechanical strength of the overall structure. For example, in other known systems comprising a plurality of fibers forming a cohesive structure, nanostructures or other reinforcing materials may only be arranged on the surface of the structure, and not within interior portions of the structure. In embodiments where one or more fibers are associated with each other to form a cohesive structure as the substrate, the "surface" of the substrate refers to an outermost continuous boundary defined at the outer extremities of the substrate. For example, the substrate may comprise an upper continuous boundary and a lower continuous boundary, such that a mesh of fibers, or portions of fibers, are disposed between the upper and lower continuous boundaries and do not extend beyond the upper and lower continuous boundaries. That is, the surface of the substrate may not, in some cases, refer to the topological surface of the substrate, i.e., does not refer to the portion of the substrate that may be first contacted by a species introduced to the substrate from a direction perpendicular to the surface of the substrate. Rather the "surface" may refer to a plane defined at the outermost extremities of the substrate. As shown in FIG. 9F, for example, the "surface" of article 950 is shown by plane 950A. Similarly, as shown in FIG. 9G, the "surface" of article 960 is shown by plane 960A.

The present invention also provides methods for forming composite articles, wherein the composite articles comprise nanotubes, or other nanostructures, positioned within the composite article for the enhancement of one or more properties of the composite article. For example, the nanostructures may be positioned to contact at least two components of an article, such as two substrates or two components within a substrate. In some cases, an article may comprise a first component and a second component, each component comprising nanostructures, such that the interaction of nanostructures of different components may enhance properties of the article. In some cases, the nanostructures may be arranged to enhance the intralaminar interactions of components within a material or substrate. In some cases, the nanostructures may be arranged to enhance the interlaminar interactions of two substrates or plies within a composite structure. In some embodiments, the nanostructures may be positioned at an interface between two substrates, wherein the nanostructures may mechanically strengthen or otherwise enhance the binding between the two substrates.

In some embodiments, the method may comprise providing a first and a second substrate, each having a joining surface, and arranging a set of substantially aligned nanostructures on or in the joining surface of at least one of the first and second substrates. The first and second substrates may then be bound to each other via their respective joining surfaces to form an interface of the substrates, wherein the interface comprises the set of substantially aligned nanostructures. In some cases, the nanostructures are dispersed uniformly on or in at least 10% of the joining surface, or, in some cases, at least 20%, 30%, 40%, 50%, 60%, 70%, 80%, 90%, 95%, or 100% of the joining surface. As used herein, "dispersed uniformly on or in at least 10% of the joining surface" refers to the substantially uniform arrangement of nanostructures over at least 10% of the area of the joining surface.

In some cases, the arranging comprises catalytically forming nanostructures on the surface of at least one of the first and second substrates. The nanostructures may be arranged on the surface of a substrate either alone or in combination with one or more support materials. For example, a set of nanostructures may be provided on a growth substrate and may be contacted with at least one of the first and second substrates such that the set of substantially aligned nanostructures may be arranged on or in the joining surface of the substrates. The growth substrate may comprise the nanostructures as freestanding nanostructures or in combination with a support material such as a polymer material, carbon fibers, or the like. The growth substrate may optionally be separated from the set of substantially aligned nanostructures on or in the joining surface, prior to binding of the first and second substrates to each other. In some cases, the substrate may be a fiber, prepreg, resin film, dry weave, or tow. In one embodiment, at least one of the first and second substrate may be a prepreg comprising fibers and a polymer material (e.g., epoxy). The substrate may further comprise various materials, such as conducting materials, fibers, weaves, or nanostructures (e.g., nanotubes) dispersed throughout the substrate.

In some cases, the arranging comprises transfer of the nanostructures from a substantially planar surface to a nonplanar surface, as described more fully below. In some cases, the arranging comprises transfer of the nanostructures from a nonplanar surface to a substantially planar surface.

In some cases, composite material may exhibit a higher mechanical strength and/or toughness when compared to an essentially identical material lacking the set of substantially aligned nanostructures, under essentially identical conditions. In some cases, composite material may exhibit a higher thermal and/or electrical conductivity when compared to an essentially identical composite material lacking the set of substantially aligned nanostructures, under essentially identical conditions. In some cases, the thermal, electrical conductivity, and/or other properties (e.g., electromagnetic properties, specific heat, etc.) may be anisotropic.

Upon arranging the nanostructures on one or more joining surfaces, the method may further comprise adding one or more support materials to the nanostructures on the joining surface. The support materials may provide mechanical, chemical, or otherwise stabilizing support for the set of nanostructures. In some cases, the support material may be a monomer, a polymer, a fiber, or a metal, and may be further processed to support the nanostructures. For example, a mixture of monomeric species may be added to the nanostructures, and subsequent polymerization of the monomeric species may produce a polymer matrix comprising the nanostructures disposed therein. As shown in FIG. 9C, growth substrate 10 may comprise nanostructures 12. One or more support materials may be added to the nanostructures to form a support material (e.g., matrix) such that the nanostructures are dispersed within the support material 14. Growth substrate 10 may then be removed to produce a self-supporting structure with the nanostructures dispersed throughout the structure, with retention of the original alignment of nanostructures. As used herein, a "self-supporting structure" refers to a structure (e.g., solid, non-solid) having sufficient stability or rigidity to maintain its structural integrity (e.g., shape) without external support along surfaces of the structure. Of course, it should be understood that a support material may not be required to form a self-supporting structure. In some cases, a set of nanostructures, such as a carbon nanotube forest, may form a self-supporting structure without need of a support material, and may be manipulated as a film.

Figure 9D:
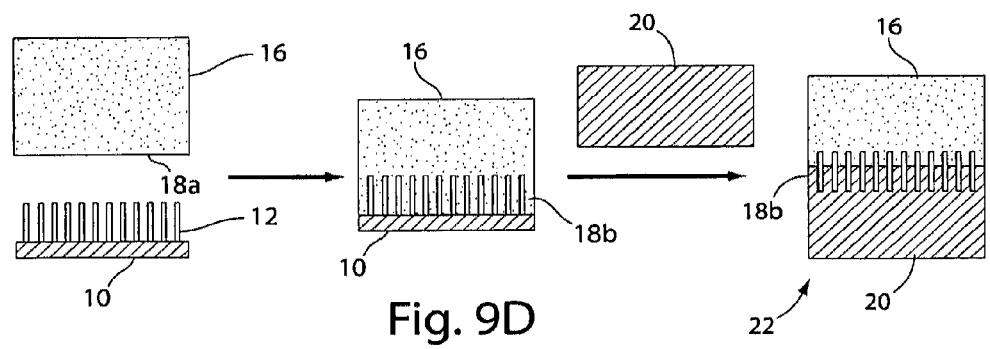
FIG. 9D shows various stages in the formation of composite materials containing aligned nanostructures.

In an illustrative embodiment, FIG. 9D shows a method for forming various composite materials of the invention. Growth substrate 10 may comprise a set of nanostructures 12 and substrate 16 may comprise a joining surface 18A, wherein the joining surface comprises a polymer material such as epoxy. Growth substrate 10 may be contacted with substrate 16 such that nanostructures 12 penetrate the polymer material of joining surface 18A. In some cases, the epoxy material may interact with nanostructures via capillary action, such that at least a portion or, in some cases, substantially all, of the length of nanostructures 12 penetrate into joining surface 18A to form interface 18B comprising both the polymer material and the nanostructures. This may form one type of composite structure. In other embodiments, upon formation of interface layer 18B, growth substrate 10 may be detached from the nanostructures and a new substrate 20 may be bound to layer 18B to form a hybrid composite structure 22, wherein the nanostructures may contact both substrates. In some cases, as shown in FIG. 9F, a first substrate 30 and a second substrate 34 may each comprise nanostructures and a polymer material positioned at joining surfaces 31 and 25, respectively, such that binding of the first and second substrates via their respective joining surfaces may produce a composite material 36 comprising an interface 38, wherein the interface comprises a set of substantially aligned nanostructures and a polymer material.

In other embodiments, the nanostructures may be arranged on a joining surface of at least one of the first and second substrates, or otherwise positioned between the first and second substrates, followed by addition of a binding material, such as epoxy. The binding material may be introduced at the interface between the first and second substrates, or may be diffused through the bulk of the first and/or second substrates to the interface.

In some cases, the first and/or the second substrate may be a prepreg material comprising fibers such as carbon fibers, for example. In some cases, the length of the nanostructures may be approximately equal to or greater than the diameter of the fibers within the prepreg, or may be greater than half the distance between neighboring fibers or plies in the composite material, so as to give sufficient reinforcement between the neighboring plies.

Methods of the invention may also comprise providing a substrate (e.g., growth substrate) comprising a plurality of fibers associated with each other to form a cohesive structure. The substrate may comprise a catalytic material as described herein, such that a set of nanostructures may be arranged in association with the plurality of fibers such that the nanostructures are dispersed essentially uniformly throughout the structure. As used herein, "dispersed essentially uniformly throughout the structure" refers to the substantially uniform arrangement of nanostructures through the bulk of the structure, including both the topological surface of the substrate and interior portions of the substrate. For example, the structure may be a tow of fibers or a weave. In some cases, at least 10% of the fibers have nanostructures attached essentially uniformly across their surfaces. In some cases, at least 20%, 30%, 40%, 50%, 60%, 70%, 80%, 90%, 95%, or a substantially majority (e.g., substantially all) of the fibers have nanostructures attached essentially uniformly across their surfaces. This advantageously produces a substrate comprising nanostructures arranged within interior locations of the substrate, rather than only at the surface or topological surface. In some cases, carbon nanotubes may be grown on fiber tows or mats before the tows or mats are used in various composite processing routes (e.g., filament winding or resin-transfer molding, RTM).

In another embodiment, the substrate may be a single fiber wherein portions of the fiber or other fibers may be arranged to form the cohesive structure (e.g., a knot, twisted fiber, etc.).

In an illustrative embodiment, FIG. 30 shows a sample of alumina cloth in different stages of carbon nanotube growth, including (a) an un-coated alumina cloth, (b) the alumina cloth after application of the catalyst material, (c) the alumina cloth with a conditioned catalyst, and (d) carbon nanotubes grown on the surface of the fibers in the cloth.

Figure 10:
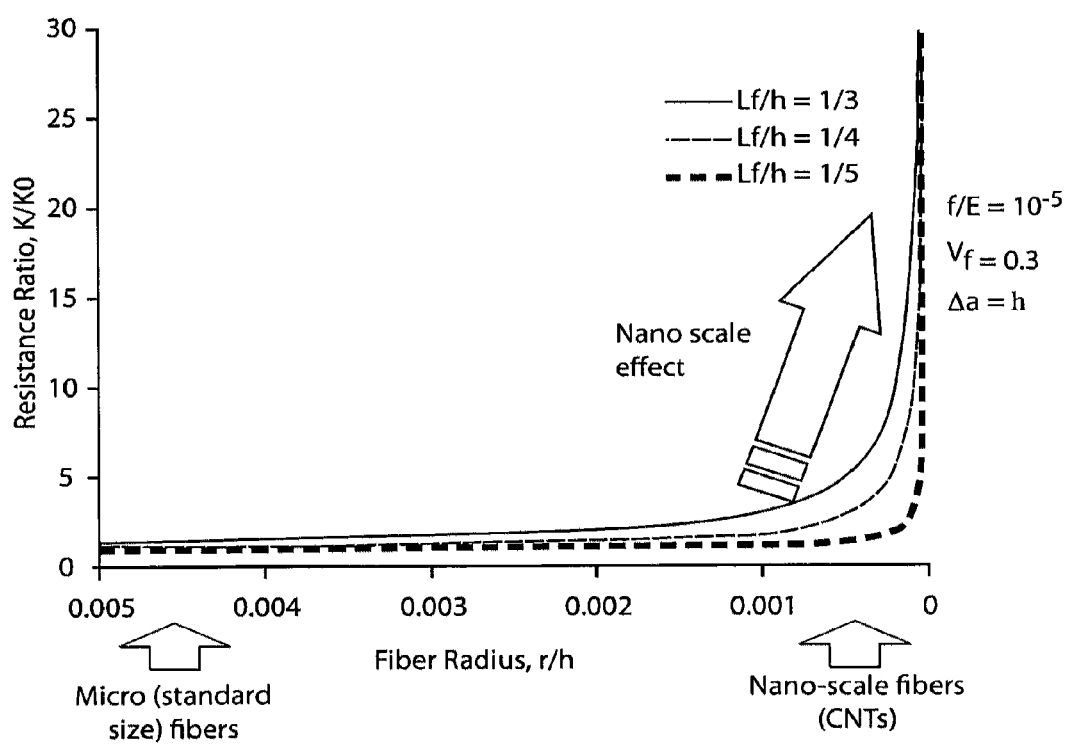
FIG. 10 shows a graph of the resistance ratio as a function of nanostructure radius.

Methods of the invention may be useful producing composite materials having enhanced properties, such as mechanical strength. The integrity of the reinforcement may depend on the diameter and/or length of the nanostructures (e.g., nanotubes), as shown by the graph of the resistance ratio as a function of nanostructure radius in FIG. 10. Nanostructures of the invention may have the appropriate dimensions to enhance the properties of such materials. In some cases, the nanostructures may have a diameter of 100 nm or less, or, in some cases, 10 nm or less, producing significant toughening of the material, for example, by 50%, 100%, 250%, 500%, 1000%, 2000%, 3,000%, or greater. In an illustrative embodiment, a 70% increase in shear strength was observed for materials having intralaminar carbon nanotube interactions, and a 160% increase in the fracture toughness for materials having interlaminar carbon nanotube interactions, have been observed, as described more fully below. The length of the nanostructures can be also controlled through the growth kinetics to create nanostructures capable of interacting (e.g., entangling) with one another upon incorporation of a support material. In this way, the interface layer between components of a composite structure may be reinforced and the mechanical properties (e.g., elastic and strength/toughness) of the composite structure may be significantly increased. In some cases, the electrical conductivity, thermal conductivity, and other properties of a composite structure may also be enhanced or made anisotropic by the structures and methods of the invention. This may be useful in, for example, the manufacture of aircrafts, including applications for lightning protection of non-conductive advanced composites.

Another advantageous feature of the present invention may be that the nanostructures may be uniformly wetted by various materials, including polymeric materials such as epoxy. For example, when a set of aligned nanostructures is contacted with a cured or uncured epoxy layer, strong capillary interactions may cause the epoxy to rapidly and uniformly "wick" into the spaces between the nanostructures, while maintaining alignment among the nanostructures. In some cases, adhesion strength of 100 MPa or more have been measured by pulling nanostructures from a matrix using a scanning probe tip, which exceeds the interfacial strength in known systems. In an illustrative embodiment, a composite microstructure of SU-8 comprising 2 weight % of aligned carbon nanostructures fabricated by the methods described herein, may have a stiffness of 11.8 GPa compared to 3.7 GPa for pure SU-8, indicating a significant reinforcement with carbon nanostructure stiffness exceeding 500 GPa. (FIG. 31)

Figure 8:
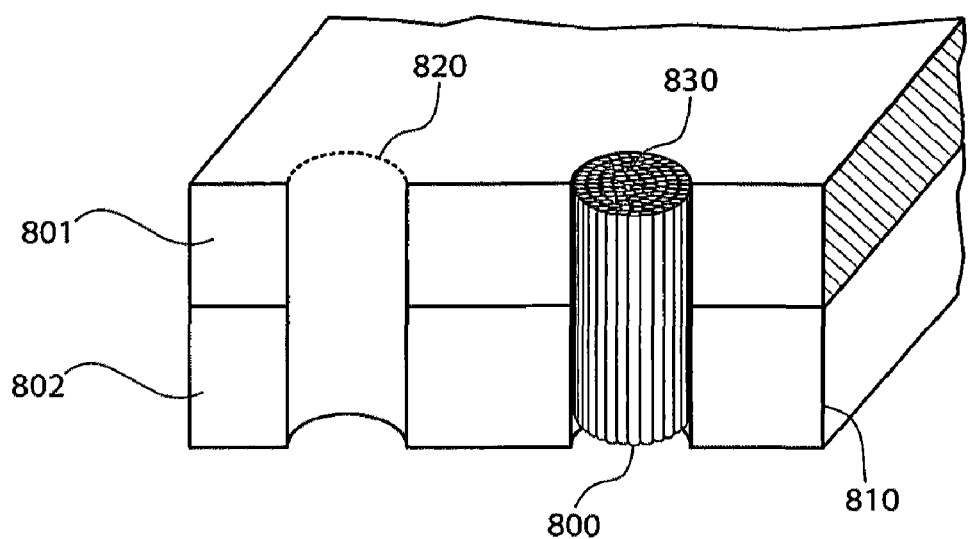
FIG. 8 shows the placement of a reinforcing nanostructure "pillar" at an interface between two materials.

In other embodiments, the set of aligned nanostructures may also be used to reinforce an interface or joint connecting two materials. FIG. 8 shows an illustrative embodiments, wherein the placement of a nanostructure "pillar" at an interface between two materials reinforces the two materials. For example, a pattern of nanostructure "pillars" 800, may be grown on a substrate to a height h, which may be the sum of the thickness of the two materials used to join substrates 801 and 802. Substrates 801 and 802 may be joined together using a joint 810. Both materials may have holes (or other features) 820 aligned and spaced in a manner that may allow the nanostructure pillars to fit in the holes. The holes may then be filled with a matrix (e.g., a polymer resin) 830 which may adhere the nanostructure pillar to both materials 801 and 802.

Figure 1C:
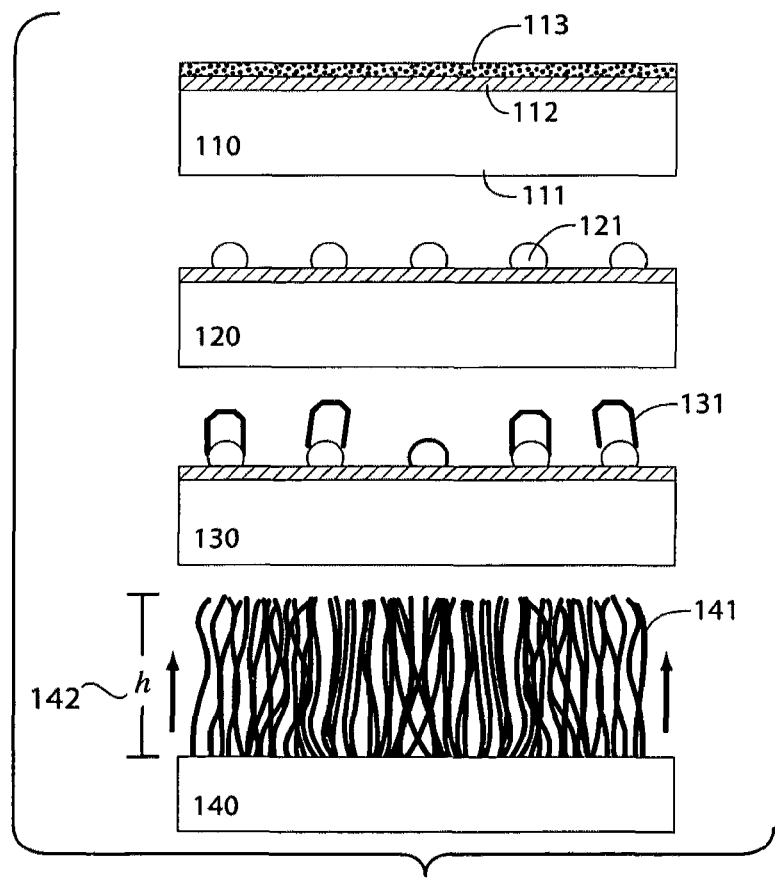
FIG. 1C shows various stages in the manufacture of a film of nanostructures on a growth substrate.

As described herein, the invention provides methods for the growth and fabrication of nanostructures, including nanotubes. FIG. 1C shows a schematic representation of stages in the process of manufacturing a film of nanostructures, such as a "forest" of carbon nanotubes, on a growth substrate. In the first stage 110, the catalyst material (e.g., metal catalyst material) may be deposited onto growth substrate 111 as film 113. Film 113 may be formed directly on growth substrate 111, or may be formed on an intermediate layer 112 formed on growth substrate 111, and film 113 may be treated to form catalyst material nanoparticles 121. Alternatively, the nanoparticles may be deposited directly on the substrate 111, with or without intermediate layer 112. In second stage 120, the nanoparticles 112 may be thermally and chemically treated in preparation for the growth of nanostructures. The treatment may include sequential exposure to oxidizing (e.g., inert or $O_2$-containing) and reducing ($H_2$-contatining) atmospheres at elevated temperature. If a film of metal catalyst is deposited in stage 110, the film may coarsen into nanoparticles during stage 120. In stage 130, the growth substrate may be exposed to a nanostructure precursor material under a set of conditions such that nanostructures 131 (e.g., carbon nanotubes) begin forming or "nucleate" from the catalyst material. In stage 140, the set of conditions may be maintained as the nanostructures 131 grow into a film or "forest" 141 to a desired height h 142.

As used herein, exposure to a "set of conditions" may comprise, for example, exposure to a particular temperature, pH, solvent, chemical reagent, type of atmosphere (e.g., nitrogen, argon, oxygen, etc.), electromagnetic radiation, or the like. In some cases, the set of conditions may be selected to facilitate nucleation, growth, stabilization, removal, and/or other processing of nanostructures. In some cases, the set of conditions may be selected to facilitate reactivation, removal, and/or replacement of the catalyst material. In some cases, the set of conditions may be selected to maintain the catalytic activity of the catalyst material. Some embodiments may a set of conditions comprising exposure to a source of external energy. The source of energy may comprise electromagnetic radiation, electrical energy, sound energy, thermal energy, or chemical energy. For example, the set of conditions comprises exposure to heat or electromagnetic radiation, resistive heating, exposure to a laser, or exposure to infrared light. In some embodiment, the set of conditions comprises exposure to a particular temperature, chemical species, and/or nanostructure precursor material. In some cases, the set of conditions comprises exposure to a temperature between 500-1300° C.

In some cases, a source of external energy may be coupled with the growth apparatus to provide energy to cause the growth sites to reach the necessary temperature for growth. The source of external energy may provide thermal energy, for example, by resistively heating a wire coil in proximity to the growth sites (e.g., catalyst material) or by passing a current through a conductive growth substrate. In some case, the source of external energy may provide an electric and/or magnetic field to the growth substrate. In some cases, the source of external energy may provided via laser, or via direct, resistive heating the growth substrate, or a combination of one or more of these. In an illustrative embodiment, the set of conditions may comprise the temperature of the growth substrate surface, the chemical composition of the atmosphere surrounding the growth substrate, the flow and pressure of reactant gas(es) (e.g., nanostructure precursors) surrounding the substrate surface and within the surrounding atmosphere, the deposition or removal of catalyst material, or other materials, on the surface of the growth surface, and/or optionally the rate of motion of the substrate.

In some cases, the nanostructures may be grown on the growth substrate during formation of growth substrate itself. For example, fibers such as Kevlar and graphite may be formed in a continuous process, in combination with nanostructure fabrication as described herein. In an illustrative embodiment, carbon fibers comprising nanostructures on the surface of the fibers may formed at elevated temperature by first stabilizing the carbon fiber precursor material (pitch or PAN), typically under stress at elevated temperature, followed by carbonization and or graphitization pyrolysis steps at very elevated temperatures (e.g., greater than 1000° C.) to form the fiber. The nanostructures may be grown on the surface of the fibers, followed by surface treatments, sizing, spooling, or other processing techniques.

In some cases, methods of the invention may comprise the act of removing the nanostructures from a substrate. For example, the act of removing may comprise transferring the nanostructures from the surface of a first substrate to the surface of a second substrate, i.e., a receiving substrate. The first and second substrates may comprise substantially planar surfaces or may comprise nonplanar surfaces. For example, the nanostructures may be transferred from one substantially planar substrate to another substantially planar substrate. In some embodiments, the nanostructures may be transferred from one nonplanar substrate to another nonplanar substrate. In some embodiments, the nanostructures may be transferred from a substantially planar surface of a first substrate to a nonplanar surface of a second substrate. In some embodiments, the nanostructures may be transferred from a nonplanar surface of a first substrate to a substantially planar surface of a second substrate. The transfer of nanostructures may comprise application of an external force to one or more substrates, as described more fully below.

In some cases, the act of removing may comprise transferring the nanostructures directly from the surface of the growth substrate to a surface of a receiving substrate. The receiving substrate may be, for example, a polymer material or a carbon fiber material. In some cases, the receiving substrate comprises a polymer material, metal, or a fiber comprising $Al_2O_3$, $SiO_2$, carbon, or a polymer material. In some cases, the receiving substrate comprises a fiber comprising $Al_2O_3$, $SiO_2$, carbon, or a polymer material. In some embodiments, the receiving substrate is a fiber weave.

Removal of the nanostructures may comprise application of a mechanical tool, mechanical or ultrasonic vibration, a chemical reagent, heat, or other sources of external energy, to the nanostructures and/or the surface of the growth substrate. In some cases, the nanostructures may be removed by application of compressed gas, for example. In some cases, the nanostructures may be removed (e.g., detached) and collected in bulk, without attaching the nanostructures to a receiving substrate, and the nanostructures may remain in their original or "as-grown" orientation and conformation (e.g., in an aligned "forest") following removal from the growth substrate.

Figure 6A:
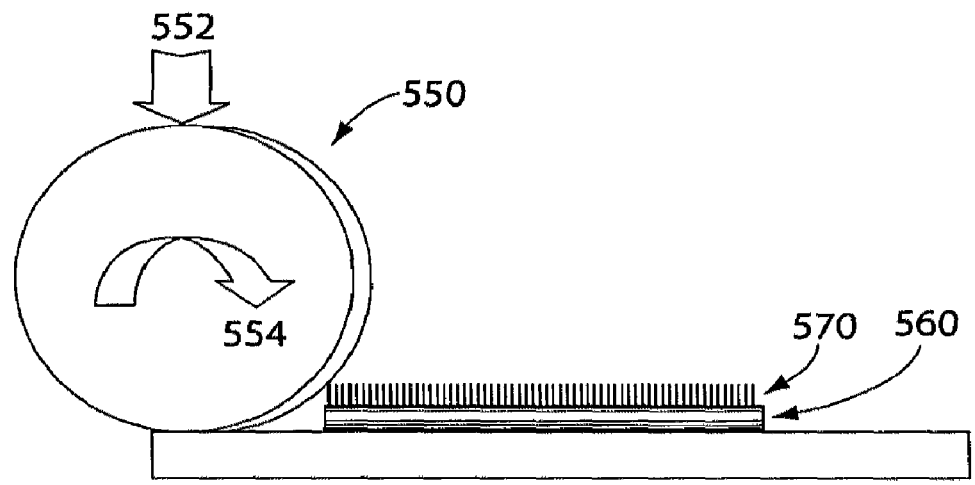
FIG. 6A shows the transfer of nanostructures from a first substrate to a second substrate, according to one embodiment of the invention.

For example, FIG. 6A shows the transfer of nanostructures 570 from a first substrate 560, having a substantially planar surface, to a second substrate 550, having a cylindrical shape comprising a nonplanar surface. Substrate 550 may comprise a material such as a polymer or a prepreg, or substrate 550 may comprise a layer of such a material positioned on the surface of the substrate. Substrate 550 may be placed in contact with substrate 560 and may be rotated in a direction 554 such that nanostructures 570 are transferred from the substantially planar surface of substrate 560 to the nonplanar surface of substrate 550. Pressure may be exerted on substrate 550 in a direction 552 during rotation to facilitate transfer of nanostructures 570. In some cases, substrate 560 may be stationary with respect to substrate 550 while substrate 550 is rolled over substrate 560. In some cases, substrate 560 may be moved linearly and in contact with substrate 550, causing rotation of substrate 550. In an illustrative embodiment, a prepreg material may be attached to cylindrical substrate 550, which may be rolled, with pressure, over a silicon wafer (e.g., substrate 560) containing a set of carbon nanotubes positioned on the surface of the silicon wafer, such that the carbon nanotube may be mechanically transplanted to the prepreg material. Prior to transfer, nanostructures 570 may be grown directly on substrate 560, i.e., substrate 560 may be a growth substrate, or, nanostructures 570 may be transferred to substrate 560 by methods as described herein.

In other embodiments, the nanostructures may be transferred from a substrate having a nonplanar surface to a substrate having a substantially planar surface. For example, a cylindrical substrate comprising a set of nanostructures positioned on a nonplanar surface of the cylindrical substrate may be placed in contact with (e.g., rolled over, optionally with pressure) a substantially planar surface of a receiving substrate, such that the nanostructures are mechanically transferred from the cylindrical substrate to the receiving substrate. Methods for the transfer of nanostructures from the surface of one substrate to another substrate, as described herein, may be performed in batch processes and/or by continuous processes.

Figure 6B:
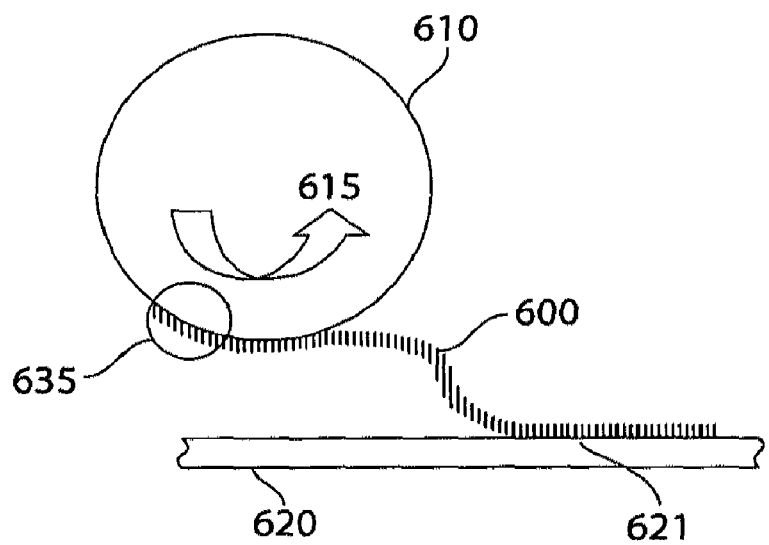
FIG. 6B shows the continuous transfer of nanostructures from a growth substrate to a receiving substrate, according to one embodiment of the invention.

In an illustrative embodiment, FIG. 6B shows the continuous transfer of nanostructures from a growth substrate to a receiving substrate, according to one embodiment of the invention. The layer of nanostructures 600 may be detached from growth substrate 610 and placed on receiving substrate 620, wherein motion of one or both of the substrates, and/or action from a mechanical, chemical, or thermal process, may facilitate the transfer. For example, growth substrate 610 may be rotated in a direction 615. Prior to or simultaneous to the transferring act, a layer of nanostructures may also be grown on a portion 635 of growth substrate. The growth substrate may be a roller or cylindrical drum, where portions of the growth substrate may be processed in distinct thermal and atmospheric "zones" to facilitate arrangement of growth sites, treatment of the growth sites, and growth of nanostructures on the roller surface, while transfer may occurs in a different region of the growth substrate. The growth substrate may be continuously rotated to enable growth of a new layer of nanostructures on the surface of the growth substrate where the nanostructures have been removed by the transfer process. As shown in FIG. 6, rotary motion in a direction 615 of the growth substrate may be matched to translation of the second substrate, which in this case is flat.

An external force, may be used to initiate and continue delamination of the layer from the first substrate, and to direct the layer toward the second substrate. For example a scraping ("doctor") or peeling blade, and/or other means such as an electric field may be used to initiate and continue delamination. In some cases, the layer may be delaminated and/or handled as a film, tape, or web. The layer may contact the second substrate before or instantly when it is detached from the first substrate, so there is no suspended section and therefore the first substrate is "rolling" the layer onto the second substrate. Attractive forces between the layer and the second substrate, such as an adhesive or a resin which wets the layer upon contact, or an electric field applied between the layer and the second substrate, may assist transfer. Alternatively, the film may be suspended, handled, and optionally mechanically (e.g., rolled, compacted, densified), thermally or chemically (e.g., purified, annealed) treated in a continuous fashion prior to being transferred to the second substrate. In some embodiments, the second substrate is a composite ply, such as a weave of carbon or polymer fibers. An interface 621 between the layer of nanostructures and the second substrate, may for example be strengthened by simultaneous or subsequent application of a binder or adhesive material which establishes uniform and strong attachment between the nanostructures and the second substrate. Alternatively, the interface may be strengthened by application of energy, such as by thermal annealing, induction heating, by irradiation using microwave or treatment in an electric or magnetic field, or by application of fluid and/or mechanical pressure, and by combination of one or more of these or other related methods. The second substrate can be made of any suitable material, such as a polymer film (e.g., to give a flexible support), metal foil (e.g., to achieve electrical contact to the layer of nanostructures), and/or the second substrate can previously be coated with another layer of nanostructures, and/or this process may be repeated many times with layers of the same or different properties to give multilayered architectures.

In some cases, the nanostructures may be grown or fabricated in batch processes. That is, a set of nanostructures may be grown on a majority of the surface of the growth substrate and may be further processed in one or more steps as described herein to produce a set of nanostructures arranged on the surface of a substrate. In batch processes, one set of nanostructures may be produced per growth substrate in series of fabrication steps, as described herein, wherein the growth substrate may subsequently be reused, or the catalyst material may be regenerated or replaced, to form another set of nanostructures.

Another aspect of the invention provides methods for the continuous formation of nanostructures, such as carbon nanotubes. As used herein, the term "continuous" refers to the ability to perform one or more different processes on different portions of a single growth substrate simultaneously, such as growth and removal of nanostructures, or growth of nanostructures and reactivation of the catalyst material. The term "continuous" may also refer to the recirculation of a single growth substrate through more than one iteration of a series of steps to grow, process, and detach or transfer nanostructures. In some cases, a growth substrate of the invention may be described as having a "topologically continuous" surface, such that each region in the system may interact with at least a portion of the growth substrate at all times during operation, i.e., as the growth substrate is recirculated (e.g., rotated) within the system. As used herein, "topologically continuous" means continuous in the sense that a particular surface on a growth substrate forms a continuous pathway around or through the structure. Examples of growth substrates having a topologically continuous surface include, but are not limited to, cylinders, flexible belts or bands, or structures having a surface that forms a closed curve or loop structure.

The method may involve providing a growth substrate with a surface comprising a catalytic material, as described herein. The growth substrate may be continuously moved through an apparatus constructed and arranged to facilitate continuous growth of nanostructures on the growth substrate and removal of nanostructures from the growth substrate. In some cases, a first portion of the growth substrate may be exposed to a set of conditions selected to cause catalytic formation of nanostructures on the surface. For example, the set of conditions may comprise exposure to a nanostructure precursor and/or a source of external energy. While exposing the first portion of the growth substrate to the set of conditions, a second portion of the growth substrate may be treated to remove the nanostructures from the surface of the growth substrate. The exposing and removing acts with said growth substrate may be repeated, in some cases, at least one time, at least two times, at least 10 times, at least 100 times, at least 1000 times, or more.

In some embodiments, while exposing the first portion of the growth substrate to the first set of conditions, the method may comprise treating a second portion of the growth substrate to a second set of conditions selected to reactivate the first catalyst material. For example, the method may comprise contacting one or more chemical species with the first catalyst material to reactivate (e.g., oxidize, reduce, etc.) the first catalyst material. In some cases, while exposing the first portion of the growth substrate to the first set of conditions, the method may comprise treating a second portion of the growth substrate to a second set of conditions selected to replace the first catalyst material with a second catalyst material. The first catalyst material may be used multiple times (e.g., at least twice, at least 10 times, at least 100 times, or more) before being replaced with a second catalyst material.

In some cases, the act of exposing comprises continuous rotation of a cylindrical growth substrate, flowing a nanostructure precursor material through the porous growth substrate, or flowing a chemical species through the porous growth substrate to treat the catalyst material. The chemical species may activate the catalyst material prior to growth of the nanostructures, or may re-activate the catalyst material after growth of the nanostructures. In some cases, the chemical species reduces or oxidizes the catalyst material after growth of the nanostructures.

Removal of the catalyst material may be performed mechanically, including treatment with a mechanical tool to scrape or grind the first catalyst material from the surface of the growth substrate. In some cases, the first catalyst material may be removed by treatment with a chemical species (e.g., chemical etching) or thermally (e.g., heating to a temperature which evaporates the catalyst). A second catalyst material may be deposited by printing/spraying of a catalyst precursor solution on the growth substrate. For example, a metal salt solution may be sprayed or printed on the growth catalyst. In other cases, the growth substrate may be treated with a solution containing preformed metal nanoparticles. For example, the growth substrate may be treated with metal nanoparticles as described in Bennett, et al., "Patterning of Block Copolymer Micellar Thin Films Using Microcontact Printing and Applications in Carbon Nanotube Synthesis," Langmuir 2006, 22, 8273-8276.

In an illustrative embodiment, a composite $Fe/Al_2O_3$ substrate, which may be made by sintering nanoscale Fe and $Al_2O_3$ powders, can be mechanically polished to expose a new layer of catalyst. Alternatively, the growth substrate may be heated beyond a temperature at which Fe evaporates, and the growth substrate may be subsequently coated with a new layer of catalyst material, for example, by contact printing. It should be understood that, in some cases, it may not be necessary to replace the catalyst material. That is, the activity of the catalyst material may be placed under a set of conditions selected to maintain continuous catalyst activity through multiple iterations of nanostructure growth and removal.

Figure 2:
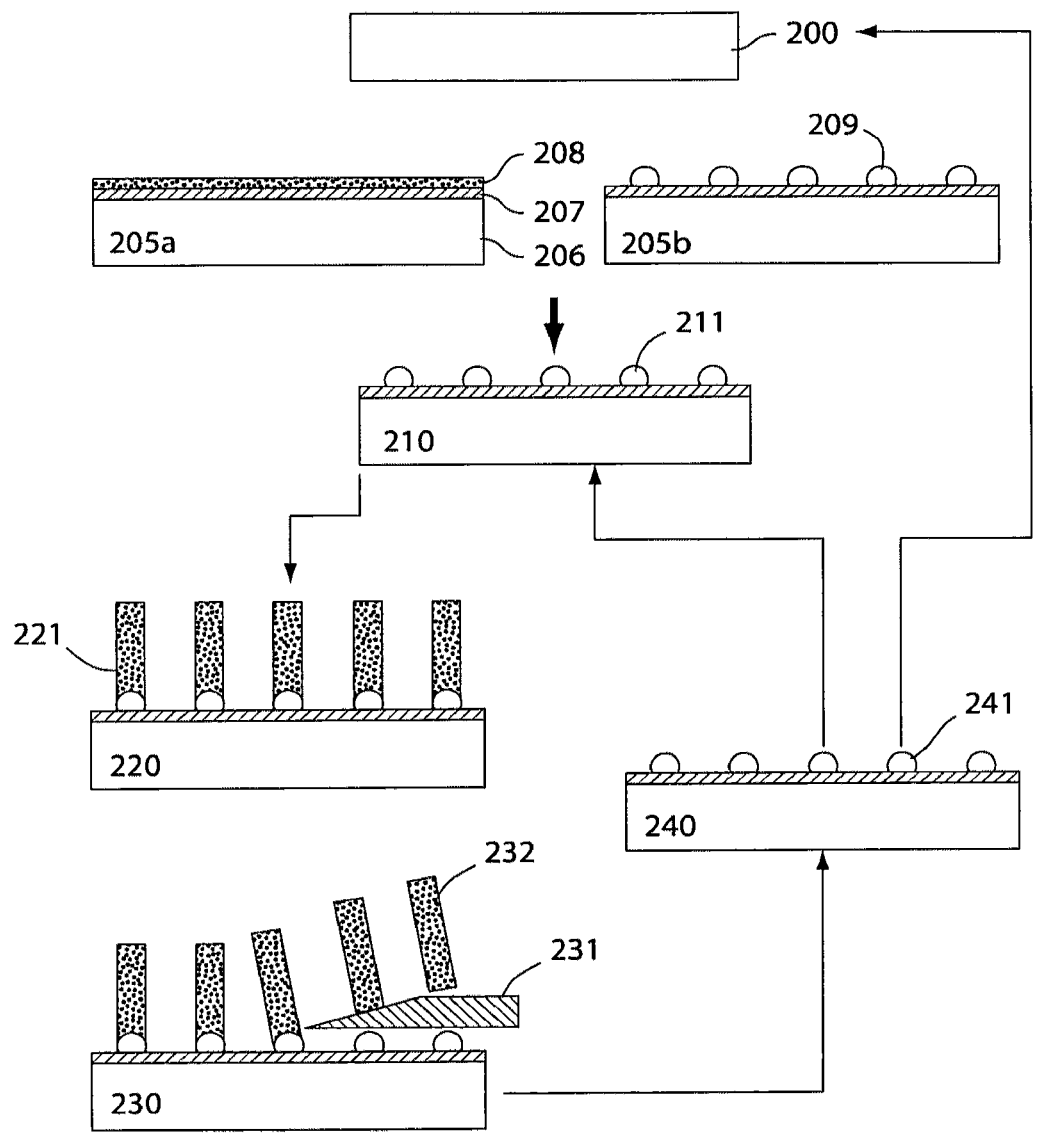
FIG. 2 shows various stages in a continuous process for continuous growth of nanostructures, involving recirculation of a growth substrate

FIG. 2 shows a schematic representation of recirculation of a growth substrate for continuous growth of nanostructures from catalyst particles ("growth sites") on the growth substrate. Growth substrate 200 is optionally coated with an intermediate layer 207 and catalyst material 208 to form growth substrate 205A, or, with catalyst nanoparticles 209 to form growth substrate 205B. Next, the substrate may be thermally and/or chemically treated to prepare the growth sites for growth of nanostructures, on growth substrate 210. Next, nanostructures 221 may be grown from the growth sites of growth substrate 220. The nanostructures 232 may then be removed from growth substrate 230, for example, using mechanical tool 231, while leaving a sufficient amount of the catalyst on the substrate. It should be understood that, while individual nanostructures are shown, the removal process may involve removal of a film of nanostructures (e.g., a "forest") held together by physical entanglement and surface interactions. Next, the substrate may be thermally and/or chemically treated to return the growth substrate to the same state as in growth substrate 210, or the growth sites and/or intermediate layer may be removed return the growth substrate to the same state as in growth substrate 200, and the cycle may be repeated. Examples of intermediate layers are described in, for example, Hart, et al., *Carbon* 2006, 44(2), 348-359, incorporated herein by reference.

The present invention also provides systems for growing nanostructures. The system may comprising a growth substrate with a surface suitable for growing nanostructures thereon, a region able to expose the surface of the growth substrate, or portion thereof, to a set of conditions selected to cause catalytic formation of nanostructures on the surface of the growth substrate, and a region able to expose the surface of the growth substrate, or portion thereof, to a set of conditions selected to remove nanostructures from the surface of the growth substrate, in some cases, without substantial removal of the catalyst material from the growth substrate. That is, a sufficient amount of catalyst material may remain on the surface of the growth substrate after removal of the nanostructures such that nanostructures may be grown on the same growth substrate in subsequent processes. In some cases, the system optionally comprises a region able to expose the surface of the growth substrate, or portion thereof, to a set of conditions selected to reactivate the first catalyst material or replace the first catalyst material with a second catalyst material. The system may also comprise a region able to expose the surface of the growth substrate, or portion thereof, to a set of conditions selected to chemically treat catalyst material on the surface of the growth substrate.

In some embodiments, the nanostructures may be grown on at least a portion of the surface of the growth substrate (e.g., the outer surface of the a rigid ring) to produce a seamless film of nanostructures, which may be removed as the growth substrate is continuously recirculated.

The system may comprise a growth substrate constructed and arranged to for use as a recirculating substrate. In some cases, the growth substrate may be shaped to form a rigid ring, such that the method is performed by continuous rotation of the rigid ring. In some cases, the growth substrate may be a flexible belt (e.g., metal foil, thin ceramic), such that rotation of the flexible belt around a set of rollers may allow for continuous formation and/or transfer of nanostructures on one or more portions of the growth substrate. The system may comprise additional components to facilitate the continuous production of nanostructures. In some cases, the system comprises at least one or more support rollers and/or drive rollers, at least one set of electrical contacts associated with the growth substrate, An advantageous feature of systems and methods for continuous growth of nanostructure may be that the growth substrate is continuously recirculated. That is, the growth substrate may be a single, movable component, rather than a number of individual growth substrates placed on a moving components. That is, the nanostructures may be grown directly on the moving growth substrate, and conditions at various portions of the moving growth substrate may be individually monitored and controlled.

Accordingly, in some cases, methods for continuous growth of nanostructures may involve exposing a growth substrate, or portion thereof, to a series of regions, wherein each region comprises a set of conditions to perform a particular step in the process, to achieve the continuous growth and removal of nanostructures using the same growth substrate, along with necessary thermal, mechanical, and chemical treatment of the substrate to enable recirculation of the substrate and continued growth of nanostructures. In one embodiment, the growth substrate may be moved through various regions of the system. For example, in a first region, the growth substrate may be initially heated and/or the catalyst material may be processed (e.g., to form nanoparticles from a catalyst film and/or to chemically reduce the catalyst material). In a second region, the nanostructures may be nucleated by exposure of the growth substrate to a nanostructure precursor material, wherein the growth of the nanostructures may be monitored optically. In a third region, the formed nanostructures may be removed by any method suitable for a particular application. Upon removal of the nanostructures from the growth substrate, the growth substrate may be recirculated (e.g., by rotation of the growth substrate, by backward translation of the growth substrate, etc.) and repeated growth of nanostructures may be conducted. In some cases, the continuous growth scheme may involve linear translation of the growth substrate. In some cases, the continuous growth scheme may involve rotational translation of the growth substrate, wherein the nanostructures may be continuously delaminated as the growth substrate rotates. In some cases, the growth substrate, or portions thereof, may be locally heated by resistive heating, laser heating, or exposure to electromagnetic radiation (e.g., infrared light). In other cases, the substrate may be placed in a furnace or other enclosure for thermal and/or atmospheric control.

One advantage of a continuous method may be the ability to uniformly grow nanostructures over a relatively large surface area and to collect the nanostructures in bulk and/or to transfer these nanostructures to other substrates (e.g., tows and weaves of advanced fibers). This may allow for industrial production of nanostructure materials, and other nanostructures. This may also be advantageous for industrial production of nanostructure-reinforced hybrid materials which exhibit significant increases in bulk properties such as interlaminar toughness, shear strength, and thermal conductivity.

Figure 3:
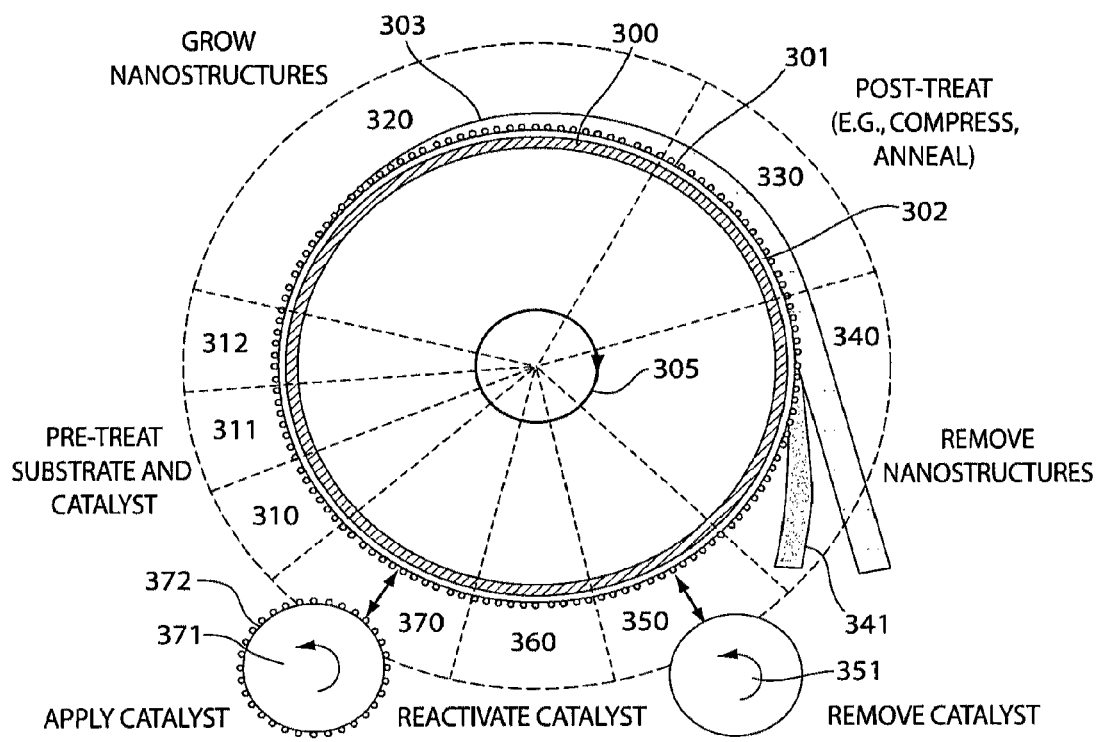
FIG. 3 shows a continuously recirculating growth substrate used in a continuous process for growth of nanostructures.

FIG. 3 shows a schematic representation of an illustrative embodiment of a system of the invention. Growth substrate 300, shown here as a hollow cylinder in cross-section, may be optionally coated with an intermediate layer 301 (e.g., a ceramic such as $Al_2O_3$), along with catalyst nanoparticles 302. A layer of nanostructures 303 may be grown on the surface of the growth substrate, which may be continuously rotated in a direction 305. As the growth substrate is moved the catalyst particles may pass through two or more regions of the system which may be maintained with selected thermal and atmospheric conditions. The catalyst may be chemically and thermally pre-treated in one or more regions, such as regions 310, 311, and 312, for example. In some cases, the growth substrate may be heated to up to 1300° C. in an atmosphere comprising $H_2$ or another inert carrier gas such as Ar or He. In region 320, the nanostructures may be grown as described herein at a temperature of up to 1300° C., and in some cases, between 700-1300° C. In some embodiments, the growth substrate may be electrically conductive and may be heated resistively to a desired temperature in the presence of, for example, a mixture of $C_2H_4$ and $H_2$, for the growth of carbon nanotubes.

In region 330, the nanostructures may be post-treated by, for example, a mechanical tool used to compact or densify the nanostructures. Alternatively, the nanostructures may be heated to anneal the nanostructures by application of radiant heat. In region 340, the nanostructures may be removed from the growth substrate by mechanical means, such as a razor blade or vibration, including surface, acoustic, or ultrasonic waves. The nanostructures may be removed by chemical processes, i.e., by etching the interface between the nanostructures and the growth substrate using an oxygen-containing atmosphere, where the growth substrate is maintained at a temperature sufficient to cause this etching. In some cases, a combination of one or more of these processes may be used.

In region 350, the catalyst material may be removed from the growth substrate, by exposing the growth substrate to a chemical atmosphere (e.g., a gas or liquid) to dissolve or detach the catalyst and/or supporting layer from the growth substrate. Alternatively, the growth substrate is heated to a sufficient temperature (e.g., by infrared means or by resistive heating) to cause evaporation of the catalyst and/or supporting layer. The catalyst and/or supporting layer may also be removed by mechanical means, such as contact with an abrasive wheel as shown 351, where the wheel may move in and out of contact with the growth substrate. In region 360, the catalyst may optionally be reactivated as described herein. In region 370, the catalyst material and/or supporting material may be applied to the growth substrate. For example, the catalyst material may be applied onto the growth substrate by electron beam evaporation or sputtering under vacuum atmosphere. Alternatively, the materials may be applied via roller 371, which may be coated with catalyst nanoparticles, by methods described herein.

Figure 34A:
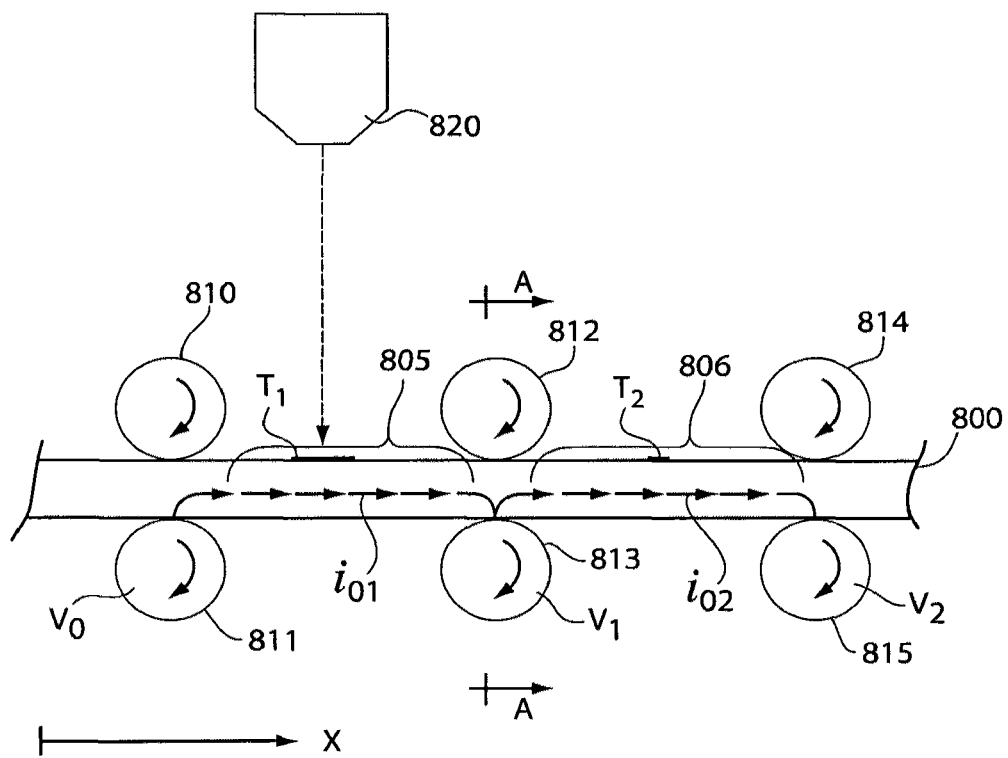
FIG. 34A shows a schematic representation of a growth substrate which is heated resistively using rolling electrical contacts.
Figure 34B:
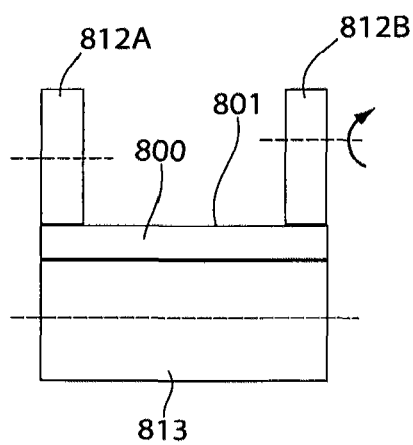
FIG. 34B shows top contacts contacting only the edges of a growth substrate, to allow for growth of nanostructures on the growth substrate.

FIG. 34A shows a schematic representation of a growth substrate which may be heated resistively using rolling electrical contacts, and where adjacent zones may have independent thermal control by passing independently controlled electrical currents through the respective electrical contacts between neighboring zones. A section of the continuous growth substrate, 800, is shown, along with a series of rotating contact elements, such as 810 and 811. The substrate may move from left to right, and the contact elements may rotate to drive and/or permit this motion. The contacts on the bottom surface of the substrate may be electrically conductive, and may be held at suitable voltage to drive suitable current through the substrate, which can cause resistive heating of the substrate. For example, contact 811 may be held at voltage $V_0$, contact 813 may be held at voltage $V_1$, and contact 815 may be held at voltage $V_2$. Thermal zones, 805 and 806 are also shown, where passage of independently controlled currents through respective sections of the substrate may enable maintenance of the substrate surface in each zone at independently controlled temperatures. For example, a non-contact temperature sensors such as an infrared sensor shown as 820 may be used to measure the temperature at a particular location of the substrate (many sensors may be used and/or scanned to measure temperature at multiple locations), and the output of this sensor may be used to control the temperature by controlling the current applied to heat the substrate in the respective zone. FIG. 34B shows that the top contacts may touch only the edges of the substrate, so the top surface 810 may remain uncovered for growth of nanostructures on this surface.

Figure 35:
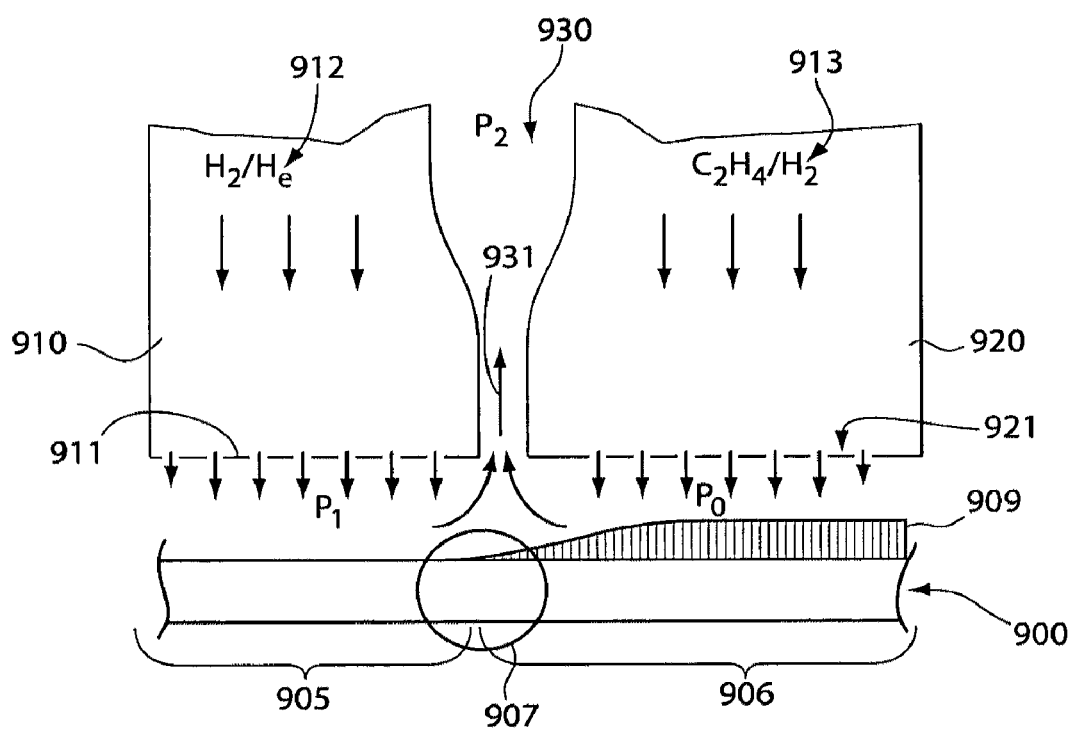
FIG. 35 shows a schematic representation of a growth substrate comprising neighboring atmospheric zones which are isolated using differential pressure and flow seals, and where the gas is supplied from the surface of the substrate on which nanostructures are grown.

FIG. 35 shows a schematic representation of a growth substrate where neighboring atmospheric zones may be isolated using differential pressure and flow seals, where the gas may be supplied from the surface of the substrate on which nanostructures are grown. Above substrate 900, three chambers may be maintained; chamber 910 may provide a first pressure-driven flow through a uniform arrangement of orifices and the flow may reach the substrate surface primarily in the first region 905. Flow from chamber 920 may reach the substrate surface primarily in the second region 906. In between the chambers, flow may be drawn from near the substrate surface, into chamber 930, where chamber 930 may be obtained at a reduced pressure to as to draw flow from both regions near the substrate surface. At the entry to 930, the flows from both regions mix in the small substrate area 907; however, flow which has interacted with the substrate in region 905 may not interact with region 906, therefore isolating the processing atmospheres between these neighboring regions. For example, chamber 910 may have an atmosphere 912 of $H_2/He$, for pre-treating a supported catalyst of $Fe/Al_2O_3$ for carbon nanotube growth, and chamber 920 may have an atmosphere of $C_2H_4/H_2$, for growing carbon nanotubes as shown 909 on the substrate surface. The carbon nanotubes may begin growing when the substrate surface passes under the outlet orifices of chamber 920 and may be thereby exposed to the carbon-containing reactant atmosphere. In some embodiments, the substrate may be heated resistively as shown in FIG. 34.

Figure 36:
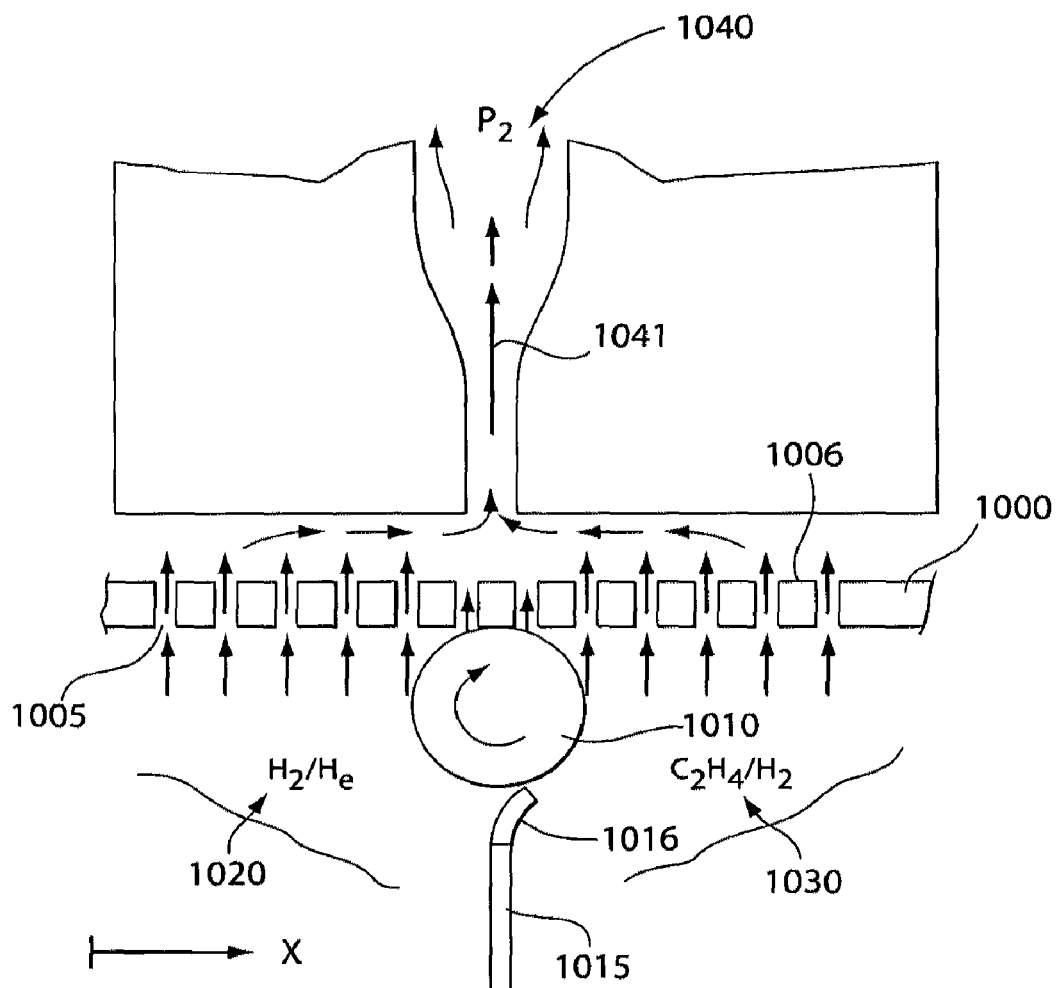
FIG. 36 shows a schematic representation of a growth substrate comprising neighboring atmospheric zones which are isolated using differential pressure and flow seals, and where the gas is supplied through pores or holes in the substrate.

FIG. 36 shows a schematic representation of a growth substrate where neighboring atmospheric zones may be isolated using differential pressure and flow seals, where the gas may be supplied through pores or holes in the substrate. Substrate 1000 can have pores or holes 1005 and flow may be directed through these cavities from the opposite side of the substrate, and where the top surface 1006 of the substrate may be treated for growth of nanostructures and other steps in accordance with the invention. Independent atmospheres 1020 and 1030 may be isolated on the back side of the substrate, and the atmospheres may be isolated by rolling contact 1010 in contact with divider 1015 along with seal 1016 which permits motion between the contact and the divider. Above the top surface of the substrate, the flows may be drawn into chamber 1040 as flow 1041.

Those of ordinary skill in the art would appreciate that systems for continuous growth of nanostructures may contain any number of processing zones as described herein. In some cases, two or more zones may be operated simultaneously and/or under different conditions, depending on a particular application. For example, the conditions of the catalyst and substrate, as determined by in situ monitoring of the catalyst, substrate, and/or nanostructures before or after removal from the substrate, may be varied at different portions of the growth substrate. Systems and methods for continuous growth of nanostructures may also be used in combination with other methods, including those described in Hart, et al., *J. Physical Chemistry B* 2006, 110(16), 8250-8257; Hart, et al., *Small* 2007, 5, 772-777; and Hart, et al., *Nano Lett.* 2006, 6(6), 1254-1260, which are incorporated herein by reference.

In some cases, the characteristics of the nanostructures, catalyst material, and/or growth substrate surface may be monitored during operation of the system, which may facilitate in selecting and/or controlling conditions for production of nanostructures. The system may be monitored by measuring the electrical conductivity or impedance of the growth substrate or catalyst material by Raman or infrared spectroscopy of the nanostructures, by X-ray scattering from the nanostructures, catalyst, or substrate, and/or by measurement of the thickness of the nanostructure layer and/or the length or diameter of nanostructures on the substrate surface.

In some embodiments, the method comprises providing a first and a second prepreg composite ply, each having a joining surface, and arranging a set of substantially aligned nanotubes on or in the joining surface of at least one of the first and second composite plies as described herein. For example, the nanotubes may be dispersed uniformly on or in at least 10% of the joining surface. The method may further comprise binding the first and second composite plies to each other via their respective joining surfaces to form an interface of the plies, wherein the interface comprises the set of substantially aligned nanotubes. The prepreg(s) may then be cured to bind the nanotubes and prepreg composite plies.

Figure 7A:
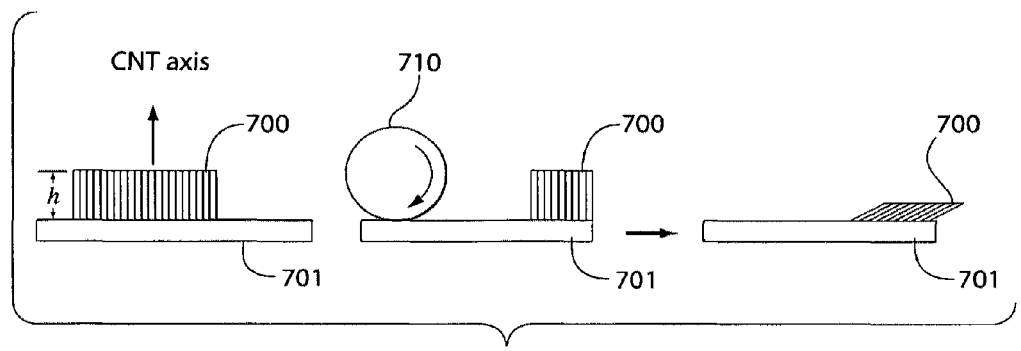
FIG. 7 show processes for altering the alignment of nanostructures for (a) a layer of aligned nanostructures and (b) a pattern of aligned nanostructures.
Figure 7B:
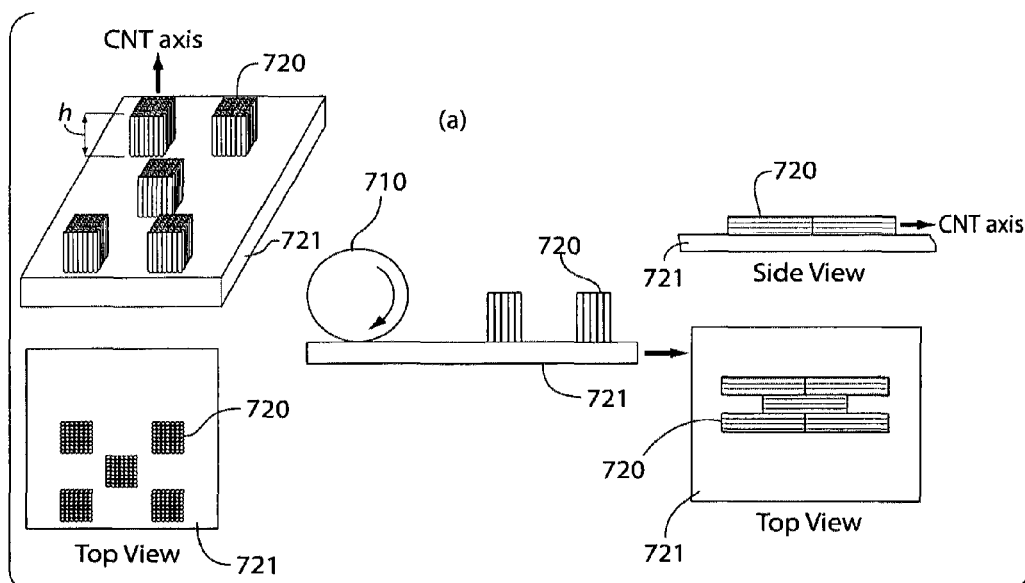

Methods of the invention may comprise additional processing steps to suit a particular application. For example, nanostructures may be formed on a substrate as described herein, such that the long axes of the nanostructures are substantially aligned in an orientation that is non-parallel to the surface of the substrate. The nanostructures and/or substrate may be further treated with a mechanical tool to change the orientation of the nanostructures such that the long axes of the nanostructures are substantially aligned in an orientation that is parallel to the surface. FIGS. 7A-B show processes for creating a composite ply comprising fibers and aligned and evenly distributed nanostructures. In FIG. 7A, a set of aligned nanostructures 700 of height h may be grown on growth substrate 701, wherein the long axes of the nanostructures are oriented substantially perpendicular to the surface of growth substrate 701. A roller 710, or other mechanical tool, may be used to "knock over" the nanostructures 700, such that the long axes of the nanostructures become substantially aligned in a orientation that is parallel to the surface of growth substrate 701. FIG. 7B illustrates a similar process, wherein a pattern of aligned nanostructures 720 may be formed on substrate 721 to a certain height. A roller 710 may be used to "knock over" the nanostructures, giving a substrate which contains aligned and uniformly distributed nanostructures, similar to a traditional aligned short-fiber composite ply. In this embodiment, the loads may be transmitted among the nanostructures by shear lag stress transfer. For example, this process may occur in region 330 of the solid ring substrate shown in FIG. 3, or following delamination of the nanostructures from the growth substrate.

For example, one or more support materials may be added to the set of aligned nanostructures (e.g., nanotube "forest") on the growth substrate, or other nanostructure supporting material, to form a solid or other integrally self-supporting structure. The addition of the support material, or precursor thereof, may harden, tackify, or otherwise strengthen the set of substantially aligned nanostructures, such that a solid structure comprising the aligned nanostructures is formed, for example, upon subsequent removal of the growth substrate. In some cases, the support material may be a monomeric species and/or a polymer comprising cross-linking groups, such that polymerization and/or cross-linking of the polymers may form a hardened structure comprising the aligned nanostructures. In other embodiments, the support material may be a metal or a metal powder such as a metal nanoparticles having diameter on the order of the diameter of the nanostructures or the spacing between the nanostructures on the substrate. The metal may be softened, sintered, or melted when added to the aligned nanostructures, such that cooling of the metal may form a metal structure comprising the aligned nanostructures. As used herein, an "integrally self-supporting structure" is defined as a non-solid structure having sufficient stability or rigidity to maintain its structural integrity (e.g., shape) without external support along surfaces of the structure. Solid and/or self-supporting structures comprising aligned nanostructures may be useful as substrate or other components for composite materials, as described herein.

In some cases, methods of the invention may further comprise the act of annealing or densifying the nanostructures, prior to the act of removing the nanostructures.

In addition to growth of uniform nanostructures, two-dimensionally and three-dimensionally shaped nanostructure microstructures may also be manufactured by patterning the catalyst material on the growth substrate or by physically templating growth using mechanical forces. Lithographic patterning of the catalyst material may enable growth of nanostructure features having cross-sections as small as 3 microns or less. Patterned growth may also be achieved by contact printing of the catalyst material from a solution of block copolymer micelles. Nanostructures may be "grow-molded" into three-dimensionally shaped microstructures by confining growth to within the microfabricated cavity. For example, a microfabricated template may be clamped against the growth substrate and delaminated following nanostructure growth, releasing the free-standing nanostructure shapes.

As used herein, the term "nanotube" is given its ordinary meaning in the art and refers to a substantially cylindrical molecule or nanostructure comprising a fused network of primarily six-membered aromatic rings. In some cases, nanotubes may resemble a sheet of graphite formed into a seamless cylindrical structure. It should be understood that the nanotube may also comprise rings or lattice structures other than six-membered rings. Typically, at least one end of the nanotube may be capped, i.e., with a curved or nonplanar aromatic group. Nanotubes may have a diameter of the order of nanometers and a length on the order of millimeters, or, on the order of tenths of microns, resulting in an aspect ratio greater than 100, 1000, 10,000, or greater. In some cases, the nanotube is a carbon nanotube. The term "carbon nanotube" refers to nanotubes comprising primarily carbon atoms and includes single-walled nanotubes (SWNTs), double-walled CNTs (DWNTs), multi-walled nanotubes (MWNTs) (e.g., concentric carbon nanotubes), inorganic derivatives thereof, and the like. In some embodiments, the carbon nanotube is a single-walled carbon nanotube. In some cases, the carbon nanotube is a multi-walled carbon nanotube (e.g., a double-walled carbon nanotube). In some cases, the nanotube may have a diameter less than 1 μm, less than 100 nm, 50 nm, less than 25 nm, less than 10 nm, or, in some cases, less than 1 nm.

In one set of embodiments the nanotubes have an average diameter of 50 nm or less, and are arranged in composite articles as described herein.

The inorganic materials include semiconductor nanowires such as silicon (Si) nanowires, indium-gallium-arsenide (InGaAs) nanowires, and nanotubes comprising boron nitride (BN), silicon nitride ($Si_3N_4$), silicon carbide (SiC), dichalcogenides such as ($WS_2$), oxides such as titanium dioxide ($TiO_2$) and molybdenum trioxide ($MoO_3$), and boron-carbon-nitrogen compositions such as $BC_2N_2$ and $BC_4N$.

As described herein, the nanostructures may be synthesized by contacting nanostructure precursor material with a catalyst material, for example, positioned on the surface of the growth substrate. In some embodiments, the nanostructure precursor material may be a nanotube precursor material and may comprise one or more fluids, such as a hydrocarbon gas, hydrogen, argon, nitrogen, combinations thereof, and the like. Those of ordinary skill would be able to select the appropriate nanotube precursor material to produce a particular nanotube. For example, carbon nanotubes may be synthesized by reaction of a $C_2H_4/H_2$ mixture with a catalyst material, such as nanoparticles of Fe arranged on an $Al_2O_3$ support. The synthesis of nanotubes is described herein by way of example only, and it should be understood that other nanostructures may be fabricated using methods described herein. For example, nanowires or other structures having high aspect ratio may be fabricated using growth substrates as described herein. For example, nanostructures having an aspect ratio of at least 10:1, at least 100:1, at least 1000:1, or, in some cases, at least 10,000:1, may be fabricated. In one set of embodiments, methods of the invention may be used to synthesize nanostructures having a diameter of less than 100 nanometers and a length of at least 1 micron. Those of ordinary skill in the art would be able to select the appropriate combination of nanotube precursor material, catalyst material, and set of conditions for the growth of a particular nanostructure.

The nanostructure precursor material may be introduced into the system and/or growth substrate by various methods. In some cases, the nanostructure precursor material may contact the surface of a fiber. For example, a flow of nanostructure precursor material may be introduced in a direction substantially perpendicular to the surface of the growth substrate, or, in a continuous method, in the direction of movement of the growth substrate through the system. The growth substrate may be moved at a particular along its axial direction, while a flow of nanostructure precursor material may impinge on the growth substrate in a direction perpendicular to growth substrate motion. In some cases, as the growth substrate is moved through the apparatus, the catalyst material may cause nucleation of a layer of aligned nanostructures, which may increase in thickness as the fiber moves through the growth apparatus.

In cases where the growth substrate comprises a plurality of fibers, such as bundles, weaves, tows, or other configurations where catalyst material may be located at an interior portion of the growth substrate, the growth substrate may comprise regularly-spaced fibers, wherein the flow of nanostructure precursor material can penetrate the space between the fibers, producing growth of aligned nanostructures essentially uniformly throughout the structure.

In some cases, the nanostructures may be primarily oriented radially around the fiber surface, wherein the long axes of the nanostructure may be oriented in a direction that is nonplanar with the surface of the growth substrate. In some cases, the nanostructures may grow in an ordered or disordered fashion on the fiber surface.

The catalyst material may be any material capable of catalyzing growth of nanotubes. The material may be selected to have high catalytic activity and optionally the ability to be regenerated after growth of a set of nanotubes. The material may also be selected to be compatible with the growth substrate such that the catalyst material may be deposited or otherwise formed on the surface of the growth substrate. For example, the catalyst material may be selected to have a suitable thermal expansion coefficient as the growth substrate to reduce or prevent delamination or cracks. The catalyst material may be positioned on or in the surface of the growth substrate. In some cases, the catalyst material may be formed as a coating or pattern on the surface of the growth substrate, using known methods such as lithography. In other embodiments, the growth substrate may be coated or patterned with the catalyst material by contacting at least a portion of the growth substrate with a solution, film, or tape comprising the catalyst material, or precursor thereof. In some cases, the growth substrate may be a fiber, which may be drawn through a liquid solution containing the catalyst materials, or precursors thereof, which may coat the surface of the fiber to provide growth sites for nanotubes. Such methods may be used to introduce the catalyst material to the growth substrate at various stages of a continuous process, such as in an initial stage or in later stages, where reapplication of a catalyst material to the growth substrate may be needed.

Materials suitable for use as the catalyst material include metals, for example, a Group 1-17 metal, a Group 2-14 metal, a Group 8-10 metal, or a combination of one or more of these. Elements from Group 8 that may be used in the present invention may include, for example, iron, ruthenium, or osmium. Elements from Group 9 that may be used in the present invention may include, for example, cobalt, rhenium, or iridium. Elements from Group 10 that may be used in the present invention may include, for example, nickel, palladium, or platinum. In some cases, the catalyst material is iron, cobalt, or nickel. In an illustrative embodiment, the catalyst material may be iron nanoparticles, or precursors thereof, arranged in a pattern on the surface of the growth substrate. The catalyst material may also be other metal-containing species, such as metal oxides, metal nitrides, etc. Those of ordinary skill in the art would be able to select the appropriate catalyst material to suit a particular application.

In some cases, nanotubes may be synthesized using the appropriate combination of nanotube precursors and/or catalyst materials, by delivering sequential exclusive reactant streams (e.g., comprising nanotube precursor materials), or by using a mixed reactant stream which causes growth of multiple types of nanostructures, and which is selective to the nature (e.g., elemental composition and size) of growth sites arranged on the substrates.

The catalyst material may be formed on the surface of the growth substrate using various methods, including chemical vapor deposition, for example. In an illustrative embodiment, a fiber may be drawn through a solution containing the catalyst material, or precursors there, and may exit from the solution with a coating of catalyst material on its surface. The coating may comprise growth sites such as metal nanoparticles (e.g., Fe, Co, and/or Ni) for growth of nanostructures such as carbon nanotubes from the surface of the fiber, or may be precursors to the formation of the growth sites. In some cases, the fiber may be continuously drawn through the solution containing the catalyst material, wherein, at the surface of the solution (e.g., a liquid-gas interface, or liquid-liquid interface), the catalyst material may be aggregated nanoparticles which may be drawn onto the surface of the fiber as it contacts the surface of the solution.

Other methods may be used to deposit the catalyst material on the growth substrate, such as Langmuir-Blodgett techniques, deposition from solutions of pre-formed nanoparticles such as ferrofluids, and deposition from solutions of metal salts which coat the substrate and decompose to form nanoparticles when heated (e.g., metal nitrates at 150-190° C.). In some cases, block copolymers may be used to template the organization catalyst material on the growth substrate.

Substrates suitable for use in the invention include prepregs, polymer resins, dry weaves and tows, inorganic materials such as carbon (e.g., graphite), metals, alloys, intermetallics, metal oxides, metal nitrides, ceramics, and the like. In some cases, the substrate may be a fiber, tow of fibers, a weave, and the like. The substrate may further comprise a conducting material, such as conductive fibers, weaves, or nanostructures.

In some cases, the substrates as described herein may be prepregs, that is, a polymer material (e.g., thermoset or thermoplastic polymer) containing embedded, aligned, and/or interlaced (e.g., woven or braided) fibers such as carbon fibers. As used herein, the term "prepreg" refers to one or more layers of thermoset or thermoplastic resin containing embedded fibers, for example fibers of carbon, glass, silicon carbide, and the like. In some embodiments, thermoset materials include epoxy, rubber strengthened epoxy, BMI, PMK-15, polyesters, vinylesters, and the like, and preferred thermoplastic materials include polyamides, polyimides, polyarylene sulfide, polyetherimide, polyesterimides polyarylenes polysulfones polyethersulfones polyphenylene sulfide, polyetherimide, polypropylene, polyolefins, polyketones, polyetherketones, polyetherketoneketone, polyetheretherketones, polyester, and analogs and mixtures thereof. Typically, the prepreg includes fibers that are aligned and/or interlaced (woven or braided) and the prepregs are arranged such the fibers of many layers are not aligned with fibers of other layers, the arrangement being dictated by directional stiffness requirements of the article to be formed by the method. The fibers generally can not be stretched appreciably longitudinally, thus each layer can not be stretched appreciably in the direction along which its fibers are arranged. Exemplary prepregs include TORLON thermoplastic laminate, PEEK (polyether etherketone, Imperial Chemical Industries, PLC, England), PEKK (polyetherketone ketone, DuPont) thermoplastic, T800H/3900-2 thermoset from Toray (Japan), and AS4/3501-6 thermoset from Hercules (Magna, Utah).

The growth substrate may be any material capable of supporting catalyst materials and/or nanostructures as described herein. The growth substrate may be selected to be inert to and/or stable under sets of conditions used in a particular process, such as nanostructure growth conditions, nanostructure removal conditions, and the like. For example, the growth substrate may be stable under high temperature (e.g., up to 1300° C.) CVD growth of carbon nanotubes. In some cases, the growth substrate may comprise alumina, silicon, carbon, a ceramic, or a metal. In some cases, the growth substrate comprises a substantially flat surface. In some cases, the growth substrate comprises a substantially nonplanar surface. For example, the growth substrate may be an optionally rotatable cylindrical substrate, such as a fiber, which may have a diameter ranging from 0.1 m to 10 m, for example. In some cases, the growth substrate may be a rigid ring (e.g., a cylindrical rigid ring), which may be continuously rotated during formation/removal of the nanotubes. In some cases, the growth substrate may comprise a flexible material, wherein the growth substrate may form a flexible ring or belt that may be placed on one or more rollers for continuous circulation through an apparatus, as described herein. In some embodiments, the growth substrate is a fiber comprising $Al_2O_3$, $SiO_2$, or carbon. In some embodiments, the growth substrate may comprise a layer, such as a transition metal oxide ($Al_2O_3$) layer, formed on surface of an underlying material, such as a metal or ceramic.

Figure 4:
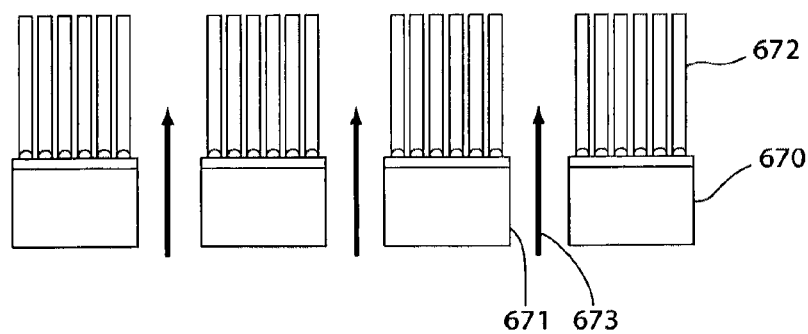
FIG. 4 shows a porous growth substrate for growth of nanostructures.

In some cases, the growth substrate may be hollow and/or porous. In some embodiments, the growth substrate is porous, such as a porous $Al_2O_3$. As used herein, a "porous" material is defined as a material having a sufficient number of pores or interstices such that the material is easily crossed or permeated by, for example, a fluid or mixture of fluids (e.g., liquids, gases). In the present invention, a porous growth substrate may improve the growth of nanotubes by advantageously facilitating the diffusion of reactant gases (e.g., nanotube precursor material) through the growth substrate to the catalyst material. FIG. 4 shows a schematic representation of a porous growth substrate used in accordance with the present invention, where substrate 670 contains pores or holes 671 and nanostructures 672 grow on one surface of the substrate. The pores or holes enable uniform delivery of the reaction atmosphere across the area of the substrate surface. This is for example the atmosphere for pre-treatment of the substrate, for growth of nanostructures, or for reactivation of the catalyst.

Figure 5A:
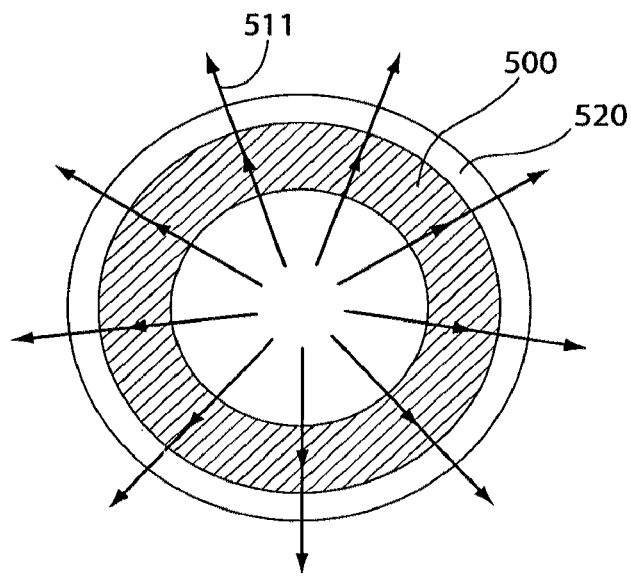
FIG. 5 shows a growth substrate arranged on a component capable of supplying reactant materials to the growth substrate for the growth of nanostructures on a roller.
Figure 5B:
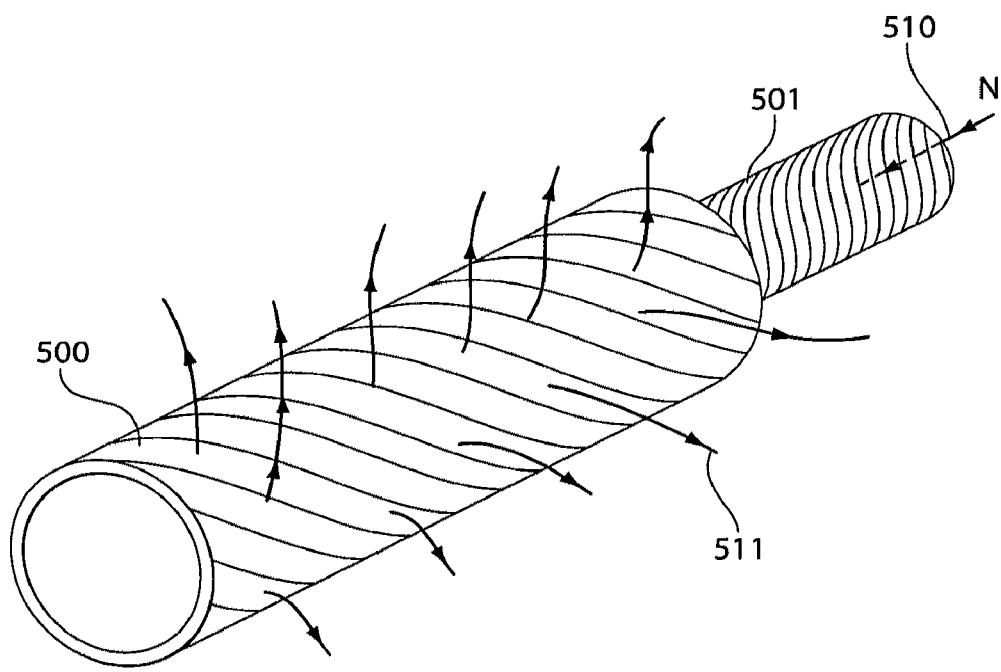

In an illustrative embodiments, FIG. 5 shows a growth substrate arranged on a component (e.g., roller) capable of supplying reactant materials to the growth substrate for the growth of nanostructures on a roller. The component may supply reactive and non-reactive chemical species for the growth of a layer of aligned nanostructures on the growth substrate, wherein chemical species may flow in a radial direction to the growth substrate. The growth substrate may be a hollow cylinder 500, which may be porous to permit gas flow through its surface. A flow 510 of chemical species may be introduced axially along an input pipe 501 in fluid communication with the cylinder, and may be distributed and flowed in a radial direction 511 through the growth substrate to the surface. In some cases, the flow may supply nanostructure precursor materials, which may then interact with growth sites (e.g., catalytic material) on the surface of the growth substrate. Alternatively, catalyst material precursors may be supplied in the flow to form a layer of catalyst nanostructures on the surface of the growth substrate.

In some embodiments, the growth substrate comprises $Al_2O_3$ or $SiO_2$ and the catalyst material comprises iron, cobalt, or nickel. In some cases, the growth substrate comprises $Al_2O_3$ and the catalyst material comprises iron.

As used herein, a "nanostructure precursor material" refers to any material or mixture of materials that may be reacted to form a nanostructure under the appropriate set of conditions. The nanostructure precursor material may comprise a carbon-containing species (e.g., hydrocarbons such as $C_2H_4$ and $CH_4$, alcohols, etc.), one or more fluids (e.g., gases such as $H_2$, $O_2$, helium, argon, nitrogen, etc.), or other chemical species that may facilitate formation of nanostructures.

As described herein, the invention may comprise use or addition of one or more binding materials or support materials. The binding or support materials may be polymer materials, fibers, metals, or other materials described herein. Polymer materials for use as binding materials and/or support materials, as described herein, may be any material compatible with nanostructures. For example, the polymer material may be selected to uniformly "wet" the nanostructures and/or to bind one or more substrates. In some cases, the polymer material may be selected to have a particular viscosity, such as 50,000 cPs or lower, 10,000 cPs or lower, 5,000 cPs or lower, 1,000 cPs or lower, 500 cPs or lower, 250 cPs or lower, or, 100 cPs or lower. In some embodiments, the polymer material may be selected to have a viscosity between 150-250 cPs. In some cases, the polymer material may be a thermoset or thermoplastic. In some cases, the polymer material may optionally comprise a conducting material, including conductive fibers, weaves, or nanostructures.

Examples of thermosets include Microchem SU-8 (UV curing epoxy, grades from 2000.1 to 2100, and viscosities ranging from 3 cPs to 10,000 cPs), Buehler Epothin (low viscosity, ~150 cPs, room temperature curing epoxy), West Systems 206+109 Hardener (low viscosity, ~200 cPs, room temperature curing epoxy), Loctite Hysol 1C (20-min curing conductive epoxy, viscosity 200,000-500,000 cPs), Hexcel RTM6 (resin transfer molding epoxy, viscosity during process ~10 cPs), Hexcel HexFlow VRM 34 (structural VARTM or vacuum assisted resin transfer molding epoxy, viscosity during process ~500 cPs). Examples of thermoplastic include polystyrene, or Microchem PMMA (UV curing thermoplastic, grades ranging from 10 cPs to ~1,000 cPs). In one embodiment, the polymer material may be PMMA, EpoThin, WestSystems EPON, RTM6, VRM34, 977-3, SU8, or Hysol1C.

EXAMPLES

The following examples illustrate embodiments of certain aspects of the invention. It should be understood that the processes described herein may be modified and/or scaled for operation in a large batch or a continuous fashion, as known to those of ordinary skill in the art.

Example 1

The following example describes an exemplary process for growing layers of aligned carbon nanotubes on a substrate. A patterned catalyst film of 1/10 nm Fe/$Al_2O_3$ was deposited on a plain (100) 6" silicon wafer (p-type, 1-10-cm, Silicon Quest International, which was cleaned using a standard "piranha" (3:1 $H_2SO_4$:$H_2O_2$) solution) by e-beam evaporation in a single pump-down cycle using a Temescal VES-2550 with a FDC-8000 Film Deposition Controller. The catalyst pattern was fabricated by lift-off of a 1 μm layer of image-reversal photoresist (AZ-5214E), which was patterned by photolithography. The catalyst was deposited over the entire wafer surface, and the areas of catalyst that were deposited on the photoresist were removed by soaking in acetone for 5 minutes, with mild sonication. The film thickness of the catalyst was measured during deposition using a quartz crystal monitor and was later confirmed by Rutherford backscattering spectrometry (RBS).

CNT growth was performed in a single-zone atmospheric pressure quartz tube furnace (Lindberg), having an inside diameter of 22 mm and a 30 cm long heating zone, using flows of argon (Ar, 99.999%, Airgas), ethylene ($C_2H_4$, 99.5%, Airgas), and hydrogen ($H_2$, 99.999%, BOC). The furnace temperature was ramped to the setpoint temperature in 30 minutes and held for an additional 15 minutes under 400 sccm Ar. The $C_2H_4/H_2/Ar$ mixture was maintained for the growth period of 15-60 minutes. Finally, the $H_2$ and $C_2H_4$ flows were discontinued, and 400 sccm Ar is maintained for 10 more minutes to displace the reactant gases from the tube, before being reduced to a trickle while the furnace cools to below 100° C.

Figure 11A:
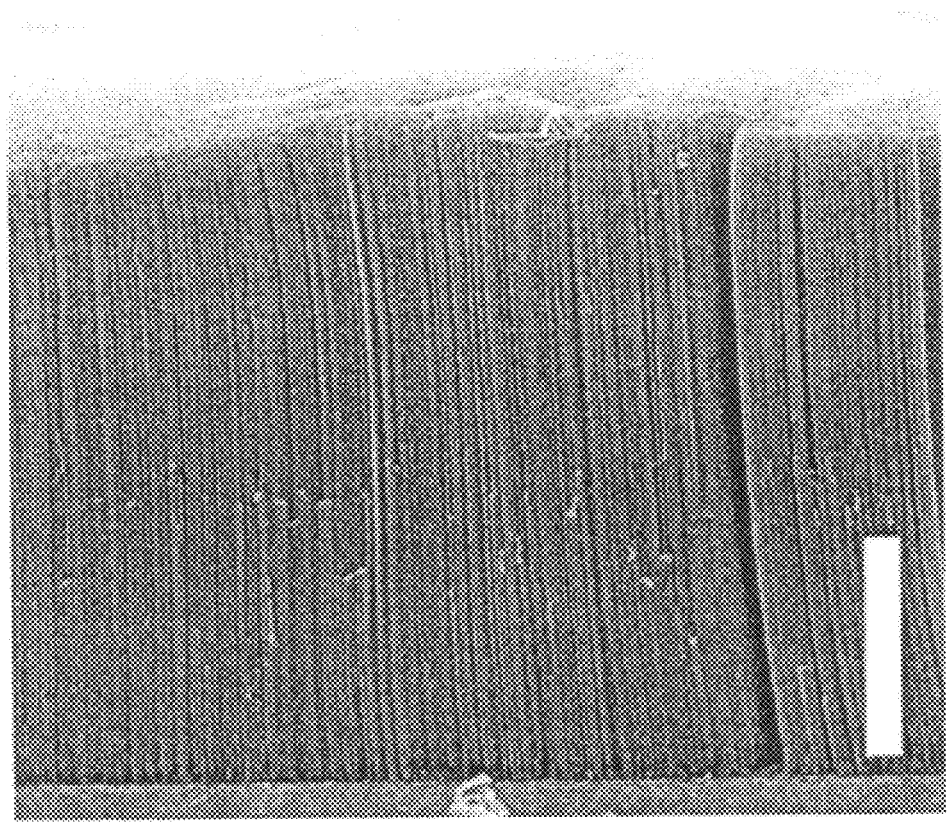
FIG. 11 shows (a) an oblique view (scale 650 μm, stage tilted 70°) SEM image and (b) a side view SAM image (scale 0.5 μm) of an aligned carbon nanotube "forest."
Figure 11B:
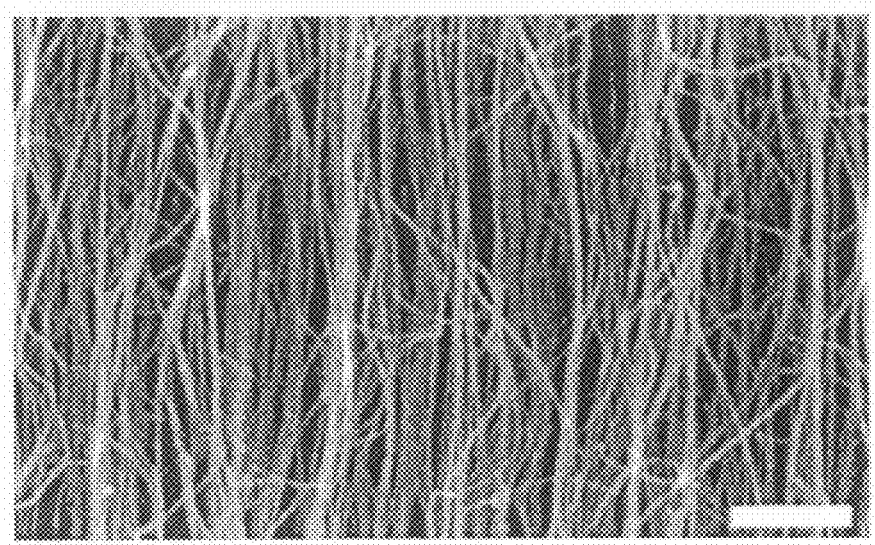

Carbon nanotube structures were grown from the Fe/$Al_2O_3$ film processed in 100/500/200 sccm $C_2H_4/H_2/Ar$, at 750° C. As shown in FIGS. 11-13, the carbon nanotubes are oriented primarily perpendicular to the substrate and are isolated or are clustered in "bundles" as large as 0.1 μm diameter, in which the carbon nanotubes are held closely together by surface forces. FIG. 11A shows an oblique view (stage tilted 70°) SEM image of an aligned CNT forest, approximately 1.8 mm high, grown in 60 minutes from 100/500/200 sccm $C_2H_4/H_2/$argon (scale 650 μm), while FIG. 11B shows alignment of carbon nanotubes within the film, viewed from the side (scale 0.5 em).

Alternatively, a carrier gas of He is used instead of Ar, and the furnace is ramped to the setpoint (growth) temperature and stabilized under a flow of 400/100 sccm He/$H_2$, and a flow of 100/400/100 sccm $C_2H_4/He/H_2$ is introduced during the growth period.

Figure 12A:
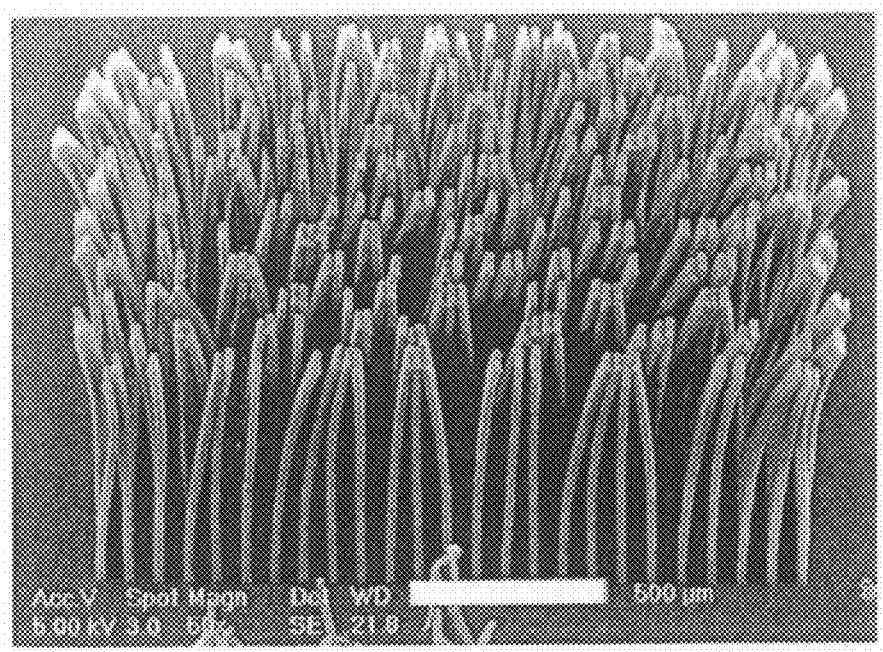
FIG. 12 shows (a) an array of carbon nanotube pillars and (b) a complex pattern of carbon nanotubes, grown from lithographically-patterned Fe/Al$_2$O$_3$ catalyst.
Figure 12B:
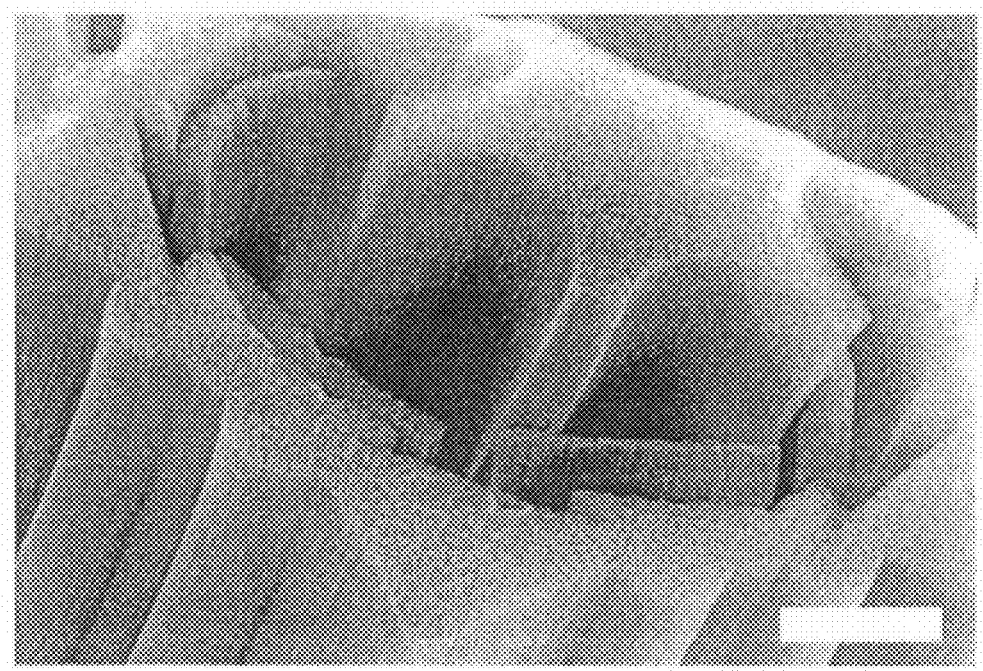
Figure 13:
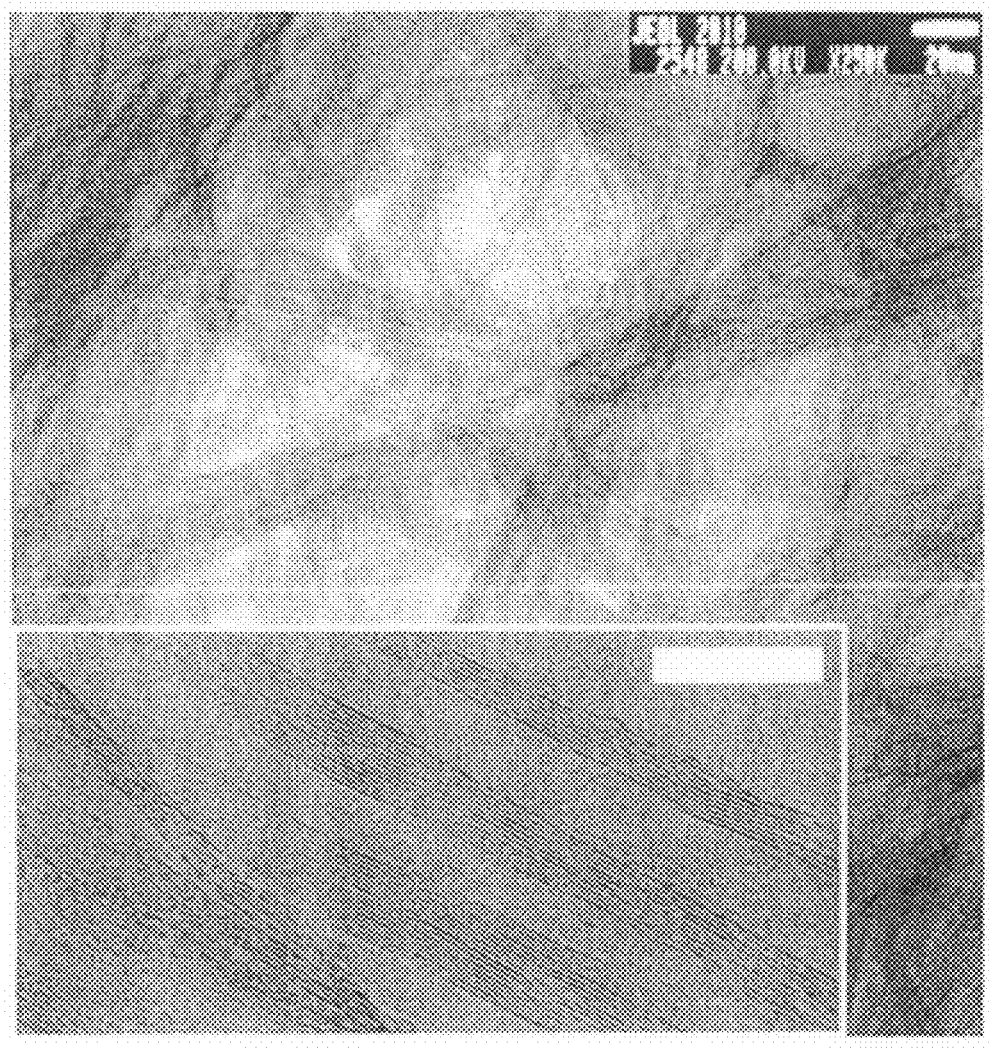
FIG. 13 shows HRTEM images of multi-walled carbon nanotubes from an aligned film of carbon nanotubes (outset scale 20 nm; inset scale 10 nm).

FIGS. 12A-B show carbon nanotube microstructures grown from an $Al_2O_3$ substrate having lithographically-patterned Fe catalyst sites. Carbon nanotube structures having identical cross-sections can be grown in large arrays and complex shapes can be defined. FIG. 12A shows an array of nanotube "pillars" approximately 1 mm high, grown in 15 minutes (scale 500 μm), while FIG. 12B shows a complex pattern of carbon nanotubes which grew taller near its center, and having sharp features reproduced from high-resolution lithography mask (scale 50 μm).

Figure 14A:
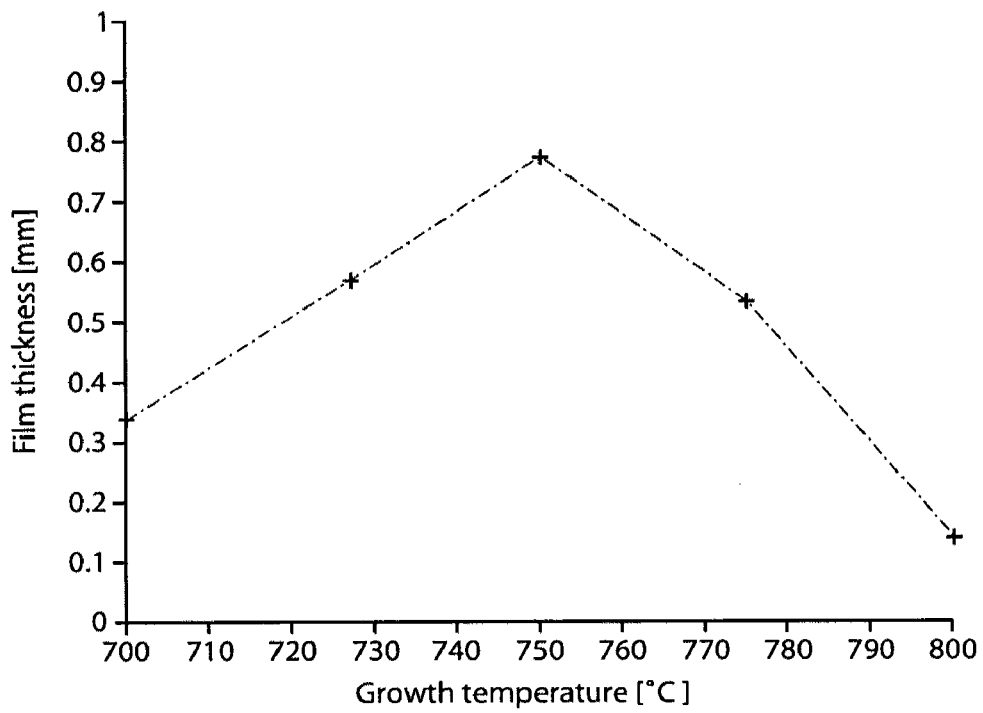
FIG. 14 shows (a) the final thickness of an aligned carbon nanotube film grown at different temperatures, for equal growth times of 15 minutes with 100/500/200 sccm C$_2$H$_4$/H$_2$/Ar, and (b) the final thickness of an aligned carbon nanotube film grown at different C$_2$H$_4$ flows (in addition to 500/200 sccm H$_2$/Ar), for equal growth times of 15 minutes at 750° C.
Figure 14B:
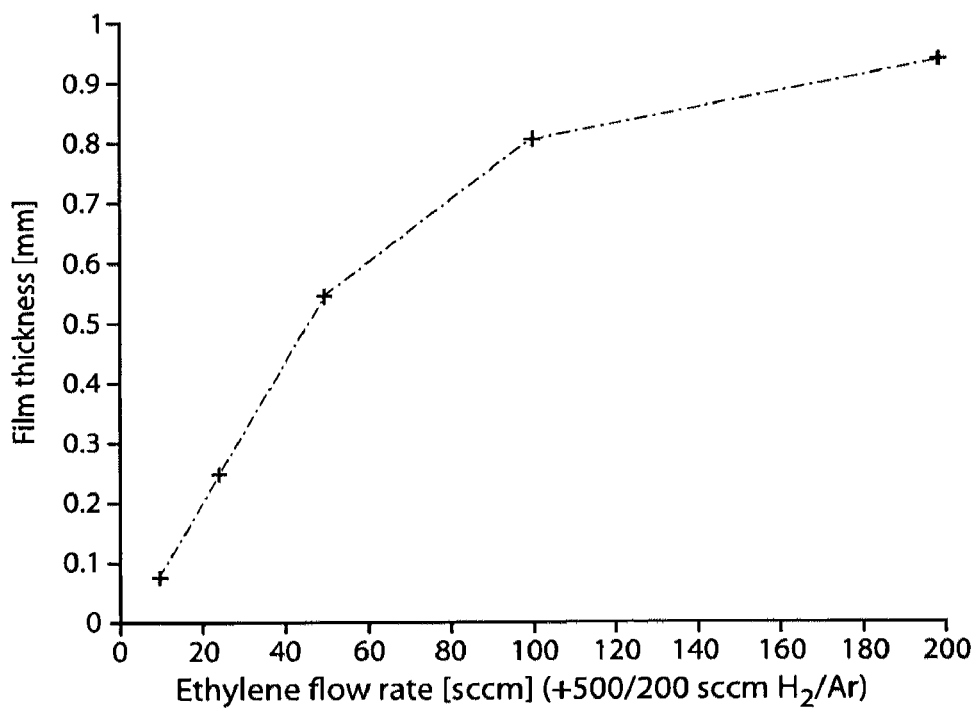

FIG. 13 shows the HRTEM examination of carbon nanotubes, which were primarily multi-walled and tubular. The carbon nanotubes averaged approximately 8 nm OD and 5 nm ID, and most have 3-7 concentric parallel walls. FIG. 14A shows the final thickness of an aligned carbon nanotube film grown at different temperatures, for equal growth times of 15 minutes with 100/500/200 sccm $C_2H_4/H_2/Ar$. FIG. 14B shows the final thickness of an aligned CNT film grown at different $C_2H_4$ flows (in addition to 500/200 sccm $H_2/Ar$), for equal growth times of 15 minutes at 750° C. As shown in FIGS. 14A-B, the growth rate and thickness of the carbon nanotube film can be adjusted by controlling the reaction temperature (FIG. 14A), or by adjusting the concentration of $C_2H_4$ in the feedstock (FIG. 14B). Adjustment of the catalyst particle size, catalyst material, reactants and/or additive species, flow sequence, temperature, pressure, and other parameters, by methods known to those skilled in the art can suitably control the morphology (diameter, crystallinity) and density of aligned CNTs within such layers.

Example 2

Figure 15A:
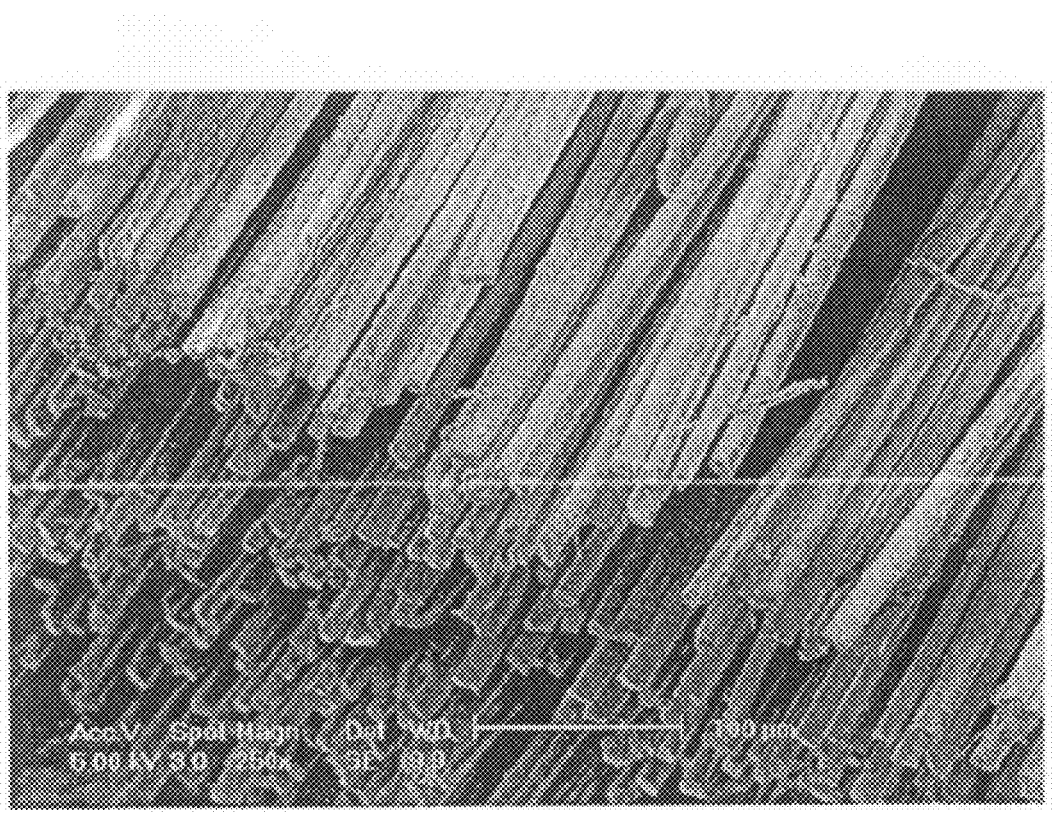
FIG. 15 shows SEM images of Al$_2$O$_3$ fibers loaded with an iron catalyst material on a (a) 100 micron and (b) 20 micron scale.
Figure 15B:
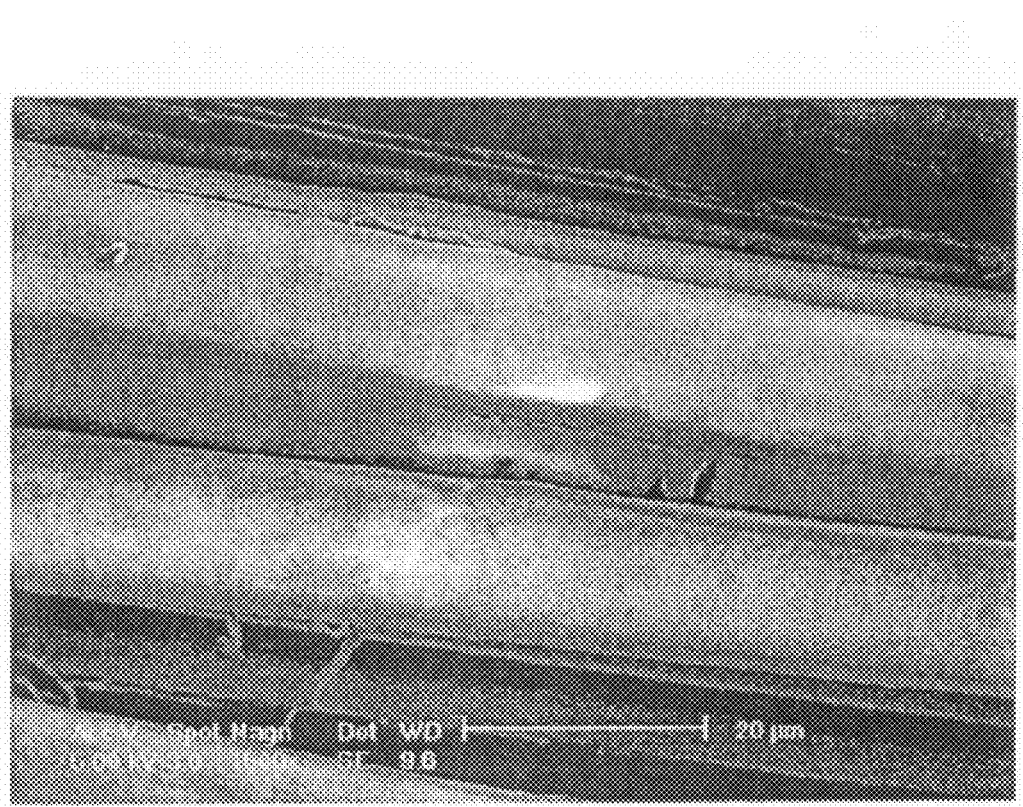

The following examples describes the production of ceramic fibers containing carbon nanotubes on the surface of the fibers. Fiber strands were cut from a commercially-available (McMaster-Carr) aluminum oxide ($Al_2O_3$) fiber cloth and soaked for five minutes in a 10 mM solution of Fe$(NO_3)_3 \cdot 9H_2O$ in isopropanol (prepared by stirring and sonication). The fiber strands were then allowed to dry in air. FIG. 15 shows SEM images of the $Al_2O_3$ fibers loaded with the iron catalyst material on a (a) 100 micron and (b) 20 micron scale. The $Al_2O_3$ fibers were about 20 μm in diameter, each strand comprising several hundred fibers. Carbon nanotube growth was performed using a single-zone atmospheric pressure quartz tube furnace (Lindberg) having an inside diameter of 22 mm and a 30 cm long heating zone. Flows of Ar (99.999%, Airgas), $C_2H_4$ (99.5%, Airgas), and $H_2$ (99.999%, BOC) were measured using manual needle-valve rotameters. The furnace temperature was held at 750° C., with 100/500/200 sccm $C_2H_4/H_2/Ar$.

Two processes were studied. First, the $Al_2O_3$ fibers were processed in a "batch" CVD sequence by placing the fibers in the furnace with a mixture of $C_2H_4/H_2/Ar$ gas, and then heating the furnace to the nanotube growth temperature. Aligned coatings of carbon nanotubes were then formed on the surfaces of the $Al_2O_3$ fibers. In an alternative process (e.g., "rapid heating" sequence), the $Al_2O_3$ fibers were rapidly introduced to the hot zone of the furnace after the furnace was heated to the nanotube growth temperature. After 1-2 minutes, the $C_2H_4/H_2/Ar$ growth mixture was then introduced. The resulting fibers from both processes are shown in FIGS. 15-18.

Figure 16A:
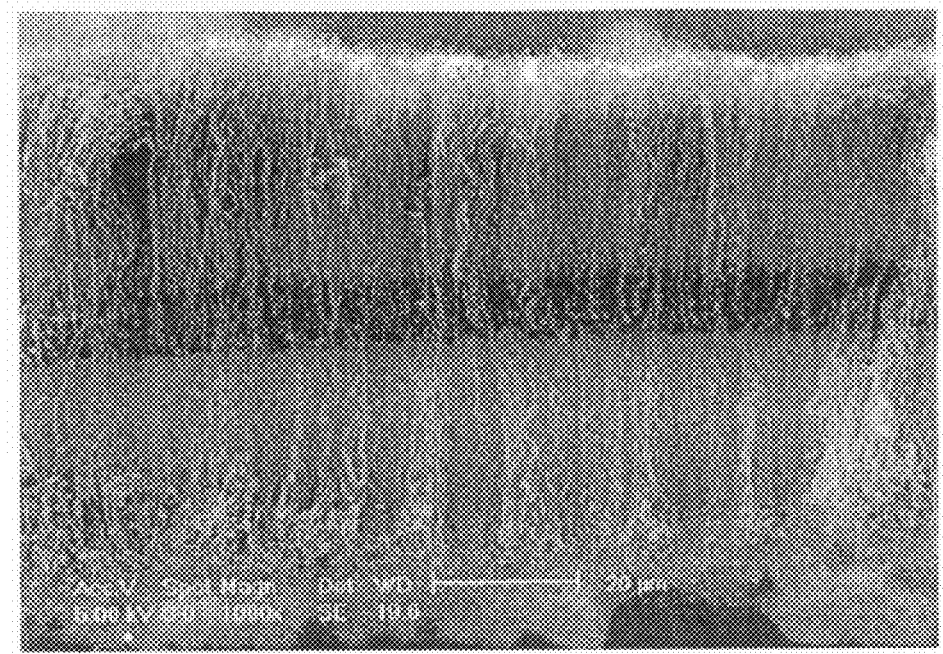
FIG. 16 shows (a) a carbon nanotube-coated Al$_2$O$_3$ fiber (20 micron scale) and (b) the alignment of carbon nanotubes on the Al$_2$O$_3$ fiber (1 micron scale).
Figure 16B:
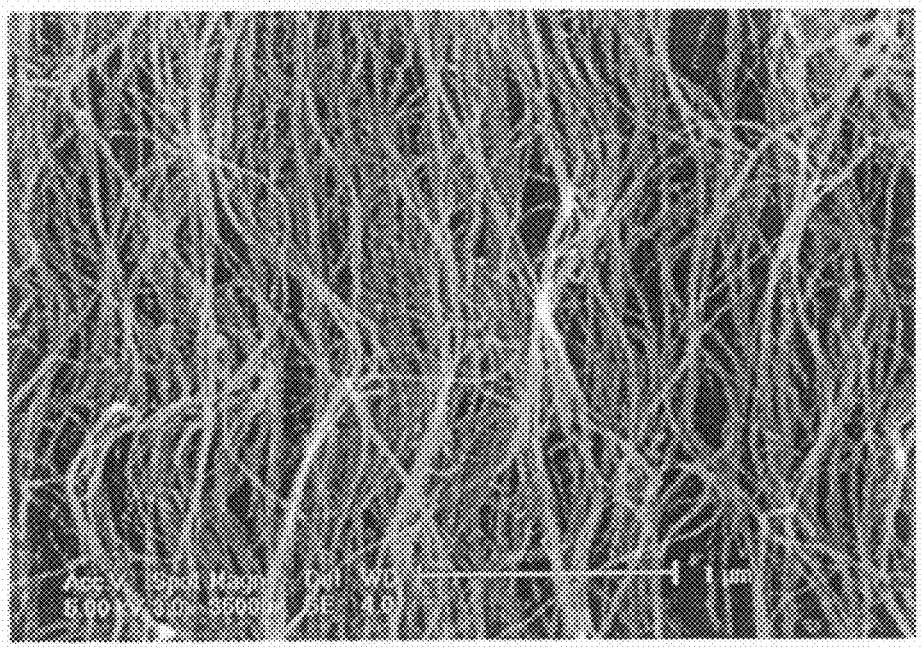
Figure 17A:
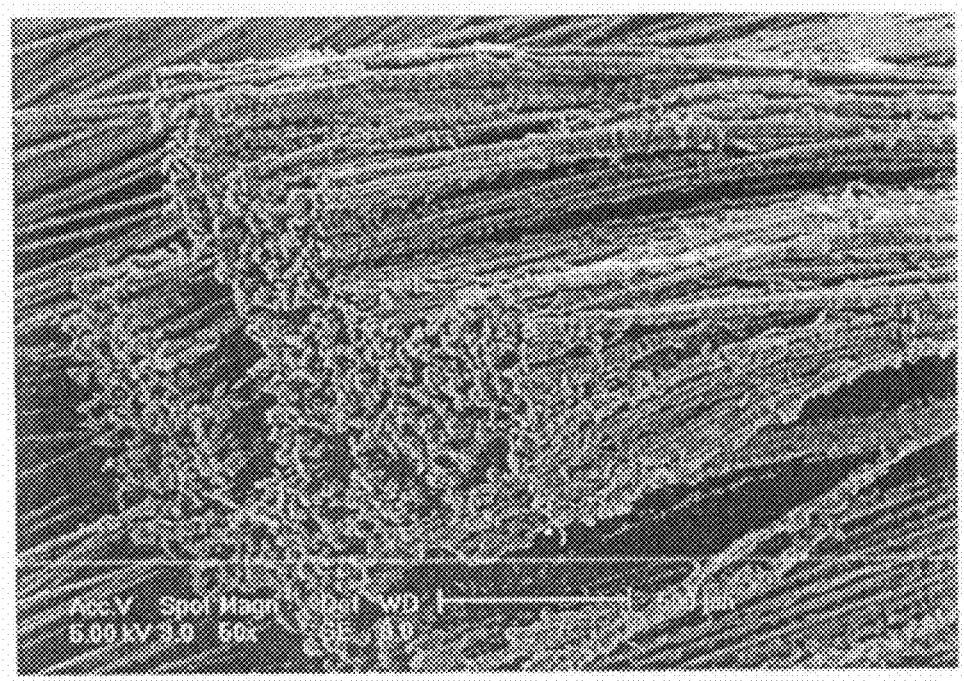
FIG. 17 shows SEM images of bundles the carbon nanotube-coated Al$_2$O$_3$ fibers at (a) 50× and (b) 250× magnification.
Figure 17B:
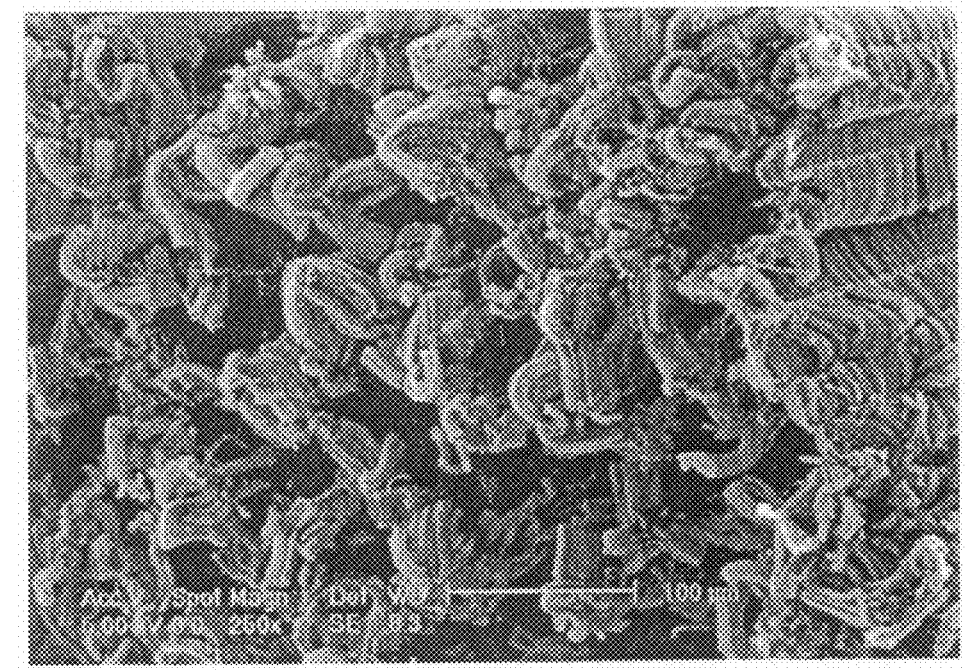
Figure 18A:
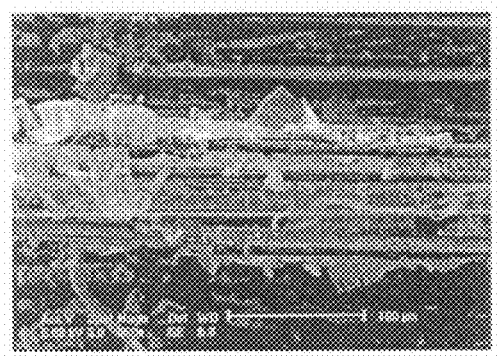
FIG. 18 shows SEM images of Al$_2$O$_3$ fibers coated with an iron catalyst material, via chemical vapor deposition (CVD) with a (a) 1 mM Fe solution, (b) 10 mM Fe solution, and (c) 100 mM Fe solution, and (d) an SEM image of the coated fibers formed by a rapid heating CVD sequence, in a 100 mM Fe solution.
Figure 18B:
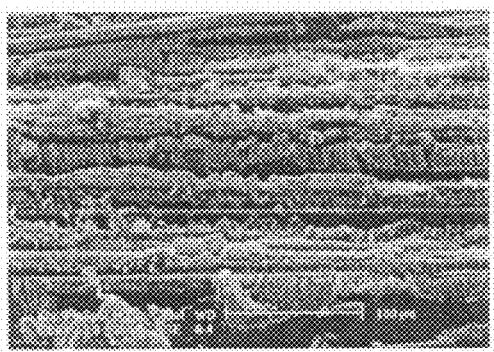
Figure 18C:
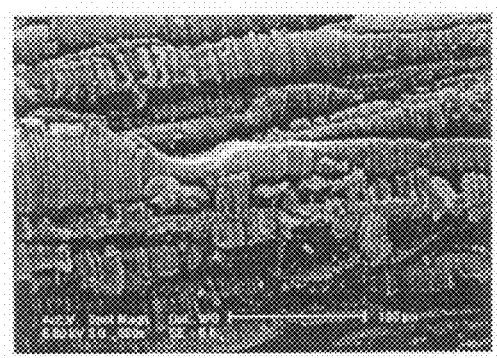
Figure 18D:
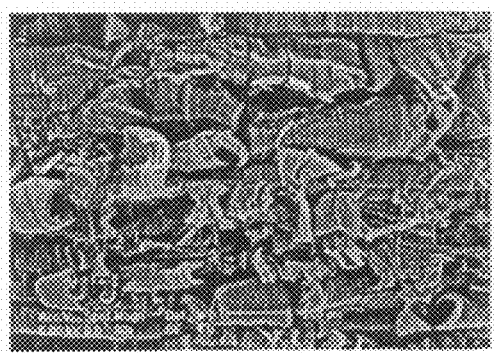

FIG. 16A shows an SEM image of the carbon nanotube-coated $Al_2O_3$ fibers (10 mM solution, 20 micron scale) after 15 minutes of growth time and 100/500/200 sccm $C_2H_4/H_2/$Ar. FIG. 16B shows an SEM image of the carbon nanotube alignment within the carbon nanotube coating (1 micron scale). FIG. 17 shows SEM images of bundles the carbon nanotube-coated $Al_2O_3$ fibers at (a) 50× and (b) 250× magnification, indicating that growth of aligned nanotubes occurred on fibers throughout the tow, and far beneath the outer surface of the tow. FIG. 18 shows SEM images of the coated fibers, coated by a in a (a) 1 mM Fe solution, (b) 10 mM Fe solution, (c) 100 mM Fe solution. FIG. 18D shows an SEM image of the coated fibers formed by the rapid heating CVD sequence, in a 100 mM Fe solution. As shown in FIG. 18, an increase in coverage of the aligned carbon nanotube on $Al_2O_3$ fibers was observed for fibers which were soaked in higher-concentration Fe solution and/or produced by the rapid heating CVD sequence.

As demonstrated by FIG. 18, an aligned growth morphology of carbon nanotubes was achieved, and the residence time (feed rate) of fibers in the hot zone of the furnace can be chosen to give the desired thickness of CNT layer on the fiber surfaces. The uniformity of CNT coating may be affected by the concentration of the Fe solution, yet may also be affected by uneven evaporation fronts in batch soaking of the fibers in the solution. Uniform coatings of catalyst precursors can be achieved by continuous withdrawal of the substrate from the catalyst or catalyst precursor solution, in accordance with the associated embodiments of the invention.

Example 3

The following example describes the production of composite thin films containing vertically-aligned carbon nanotubes. A pattern of rectangular "pillars" containing carbon nanotubes was grown on a silicon wafer, according to the process described in Example 1. The carbon nanotubes were vertically-aligned and substantially perpendicular to the substrate, and were held together in the form of pillars by surface forces. By adjusting the either the concentration of $C_2H_4$ in the reaction chamber or the reaction temperature, it was possible to control the growth rate and height of the carbon nanotube pillars. In this example, the carbon nanotube height was measured to be 100 μm.

The carbon nanotubes on the silicon wafer were then combined with a second substrate to form a composite thin film. A fast-curing (e.g., 20 minute) room-temperature conductive epoxy was deposited on a glass substrate (e.g., the "second" substrate) in the form of a thin film having a thickness approximately the same as the height as the carbon nanotubes. The silicon wafer containing the carbon nanotube pattern was then placed on the glass substrate, such that the carbon nanotube and the conductive epoxy contacted each other, and a 100 g weight was applied on the assembly. The assembly was kept at ambient temperature and humidity, allowing the conductive epoxy to cure over 24 hours. Capillary action, aided by the mechanical pressure exerted by the weight, allowed the epoxy to penetrate into the carbon nanotube-pillars. After 24 h, the epoxy was completely cured. The adhesion between the epoxy and the carbon nanotubes was sufficient to allow the removal of the silicon wafer by mechanical means.

Figure 19A:
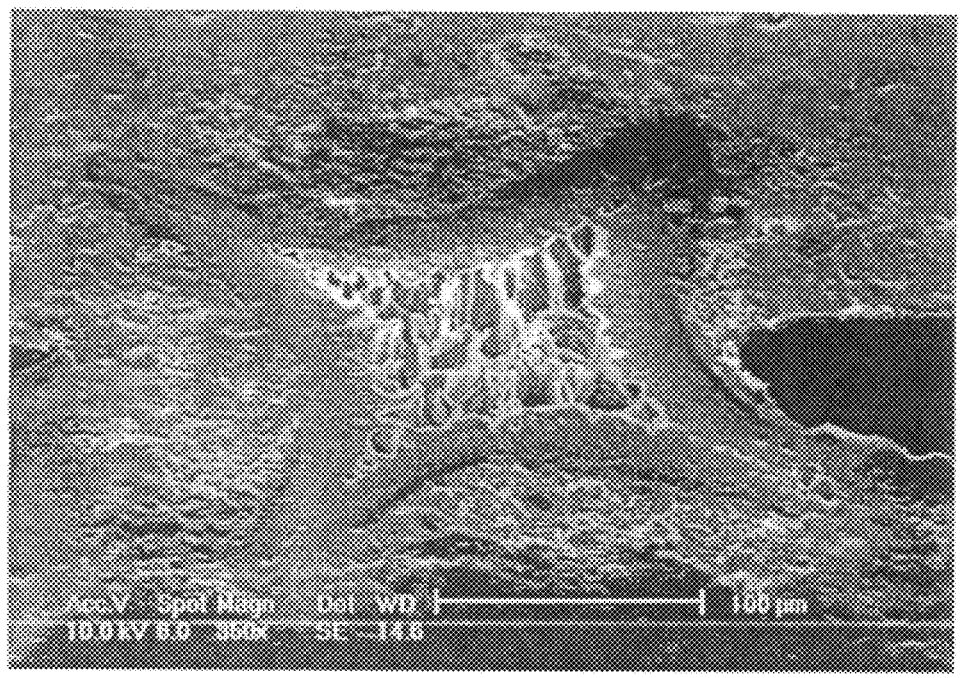
FIG. 19A shows an SEM image of an arrangement of aligned carbon nanotube pillars embedded in an epoxy matrix, shows the effective wetting of the pillars by the epoxy.

FIG. 19A shows an SEM image of an arrangement of aligned carbon nanotube pillars embedded in an epoxy matrix, shows the effective wetting of the pillars by the epoxy.

Figure 19B:
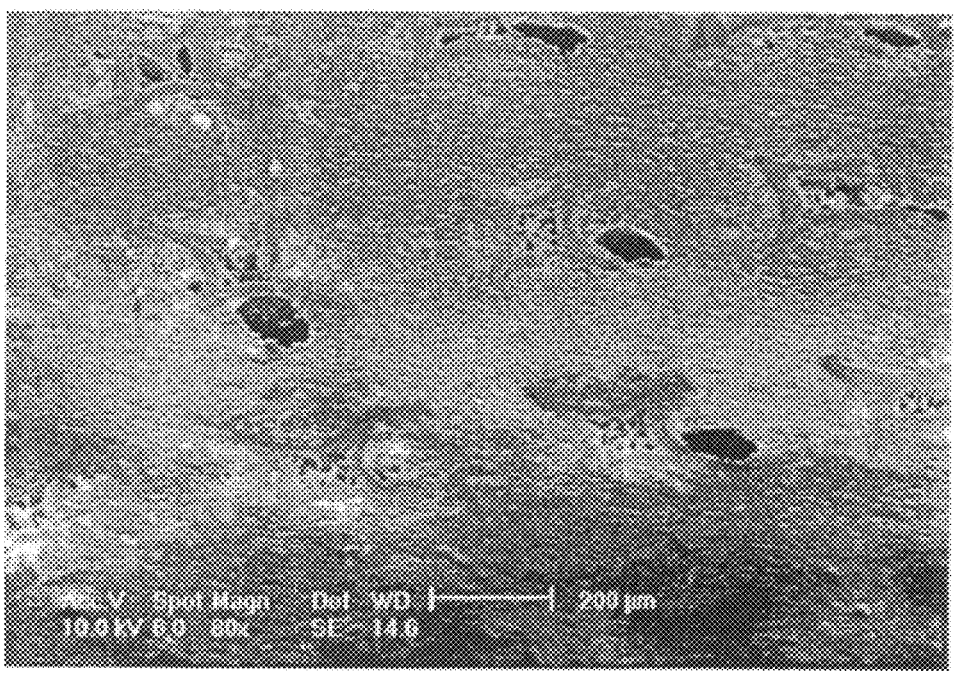
FIG. 19B shows a closer view of an embedded carbon nanotube pillar, showing the nanotube/epoxy interface.

FIG. 19B shows a closer view of an embedded carbon nanotube pillar, showing the nanotube/epoxy interface.

Figure 20A:
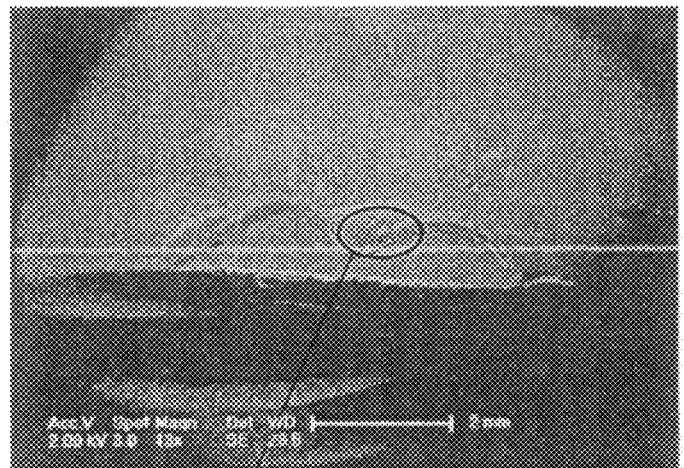
FIG. 20A shows an SEM image of epoxy penetrated by carbon nanotube "forests" by a submersion process, wherein the effectiveness of carbon nanotube wetting was exhibited.
Figure 20B:
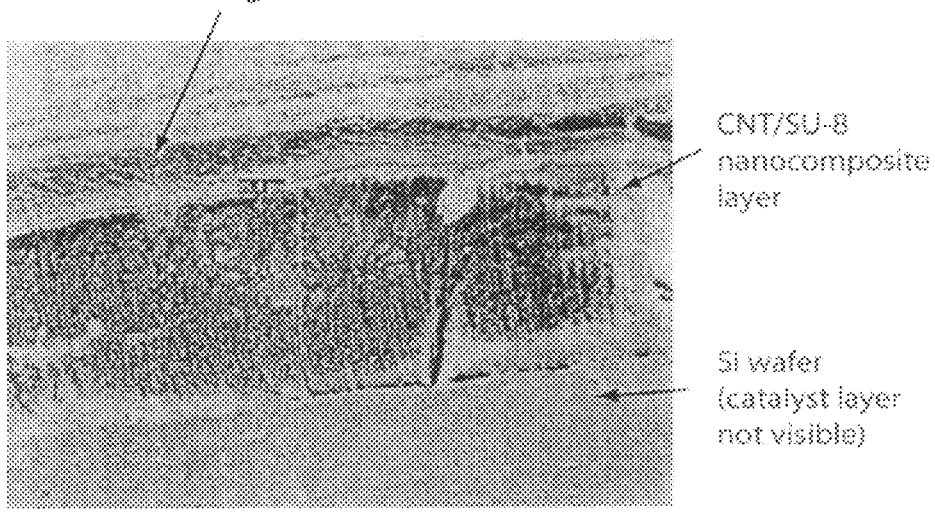
FIG. 20B shows a cross-sectional view of the carbon nanotube/epoxy assembly.
Figure 20C:
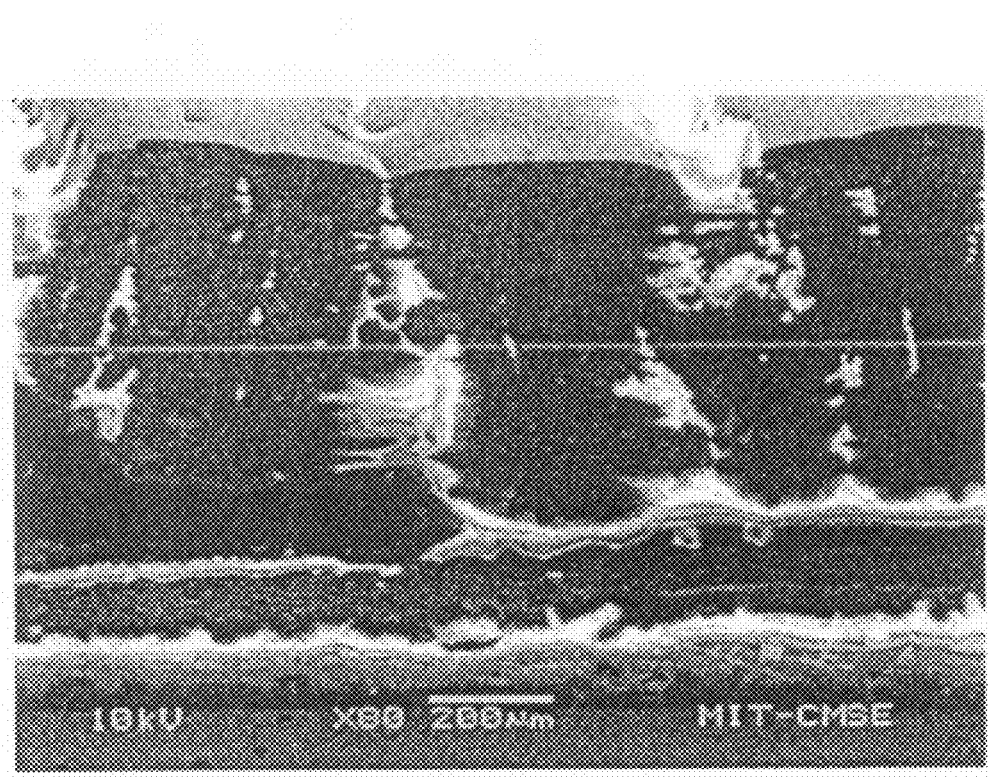
FIG. 20C shows an SEM image of a carbon nanotube/SU-8 composite with ~5% volume fraction.
Figure 20D:
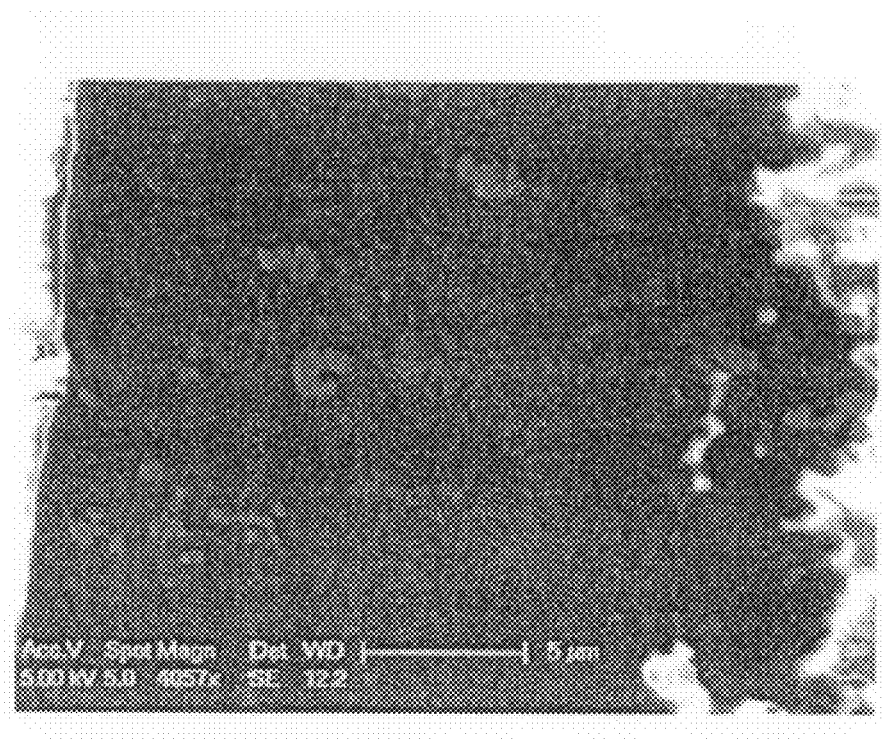
FIG. 20D shows another SEM image of the carbon nanotube/SU-8 composite with ~5% volume fraction, at greater magnification.
Figure 20E:
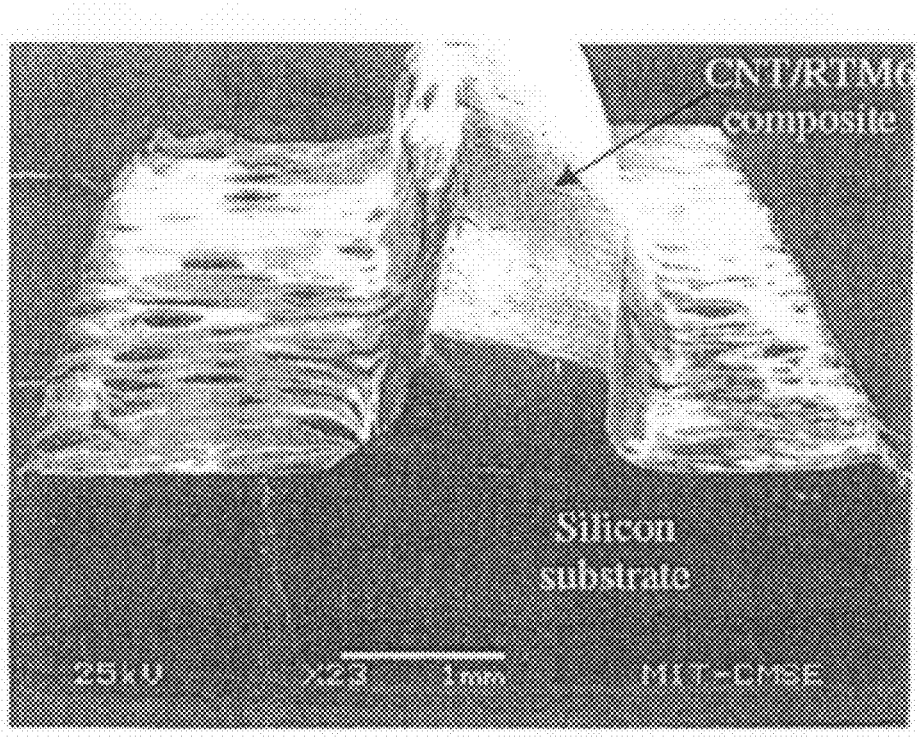
FIG. 20E shows an SEM image of a 10% volume fraction carbon nanotube/RTM 6 composite.
Figure 20F:
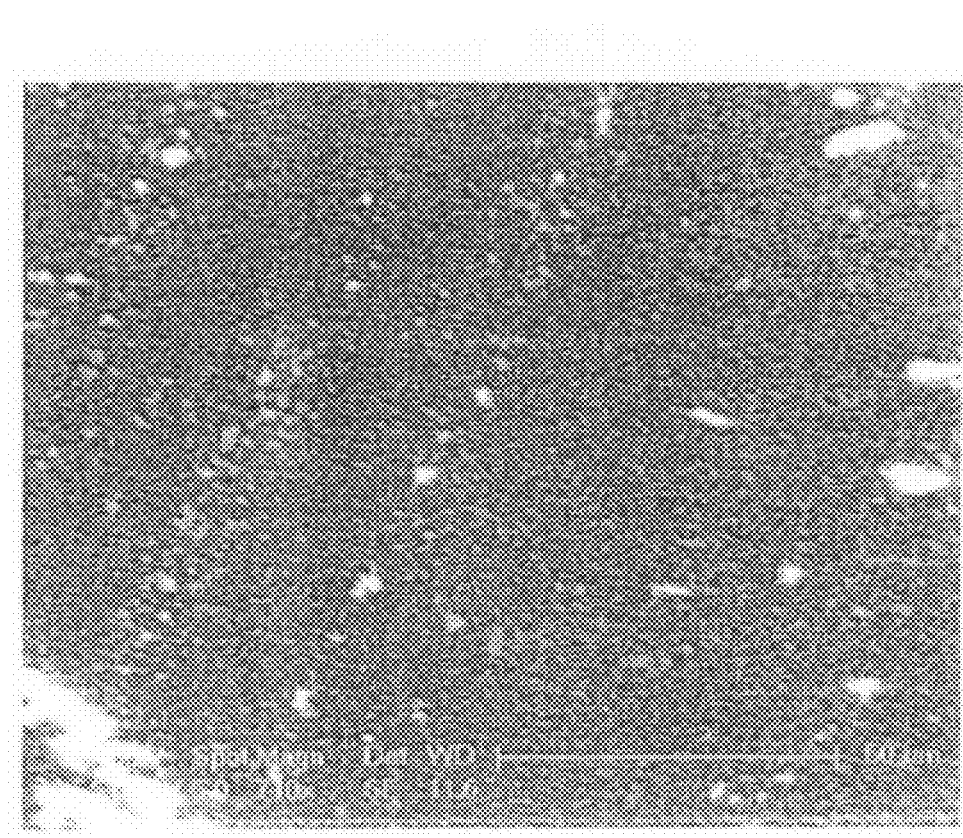
FIG. 20F shows another SEM image of the 10% volume fraction carbon nanotube/RTM 6 composite, at greater magnification.

Alternatively, a submersion process may also be used to effectively wet pillars and dense "forests" of carbon nanotubes, wherein capillary action can aid penetration of the epoxy into the carbon nanotube forest. FIGS. 20A-B show SEM images of epoxy penetrated by carbon nanotube "forests" by a submersion process, wherein the effectiveness of carbon nanotube wetting was exhibited. As shown in cross-sectional view of the nanotube/epoxy assembly in FIG. 20B, the epoxy polymer fully penetrated the thickness of the forest and the CNT alignment was maintained. FIG. 20C shows an SEM image of a carbon nanotube/SU-8 composite with ~5% volume fraction, wherein the wetting was effective and no voids were observed, and FIG. 20D shows a closer view of the composite. FIG. 20E shows a 10% volume fraction carbon nanotube/RTM 6 composite, wherein the effectiveness of the submersion method for wetting can be observed, even at higher volume fractions, and FIG. 20F shows a closer view of the composite.

Example 4

The following example describes the transfer of a carbon nanotube forest to a receiving substrate, and the production of "nanostitched" composite structures.

A carbon nanotube "forest" was grown on a silicon wafer to a height of ~150 μm using the method described in Example 1. FIGS. 27A-D show SEM images of the carbon nanotubes, which have been transplanted from that substrate to a prepreg using mechanical means, and retention of carbon nanotube alignment was observed upon transfer.

Figure 9E:
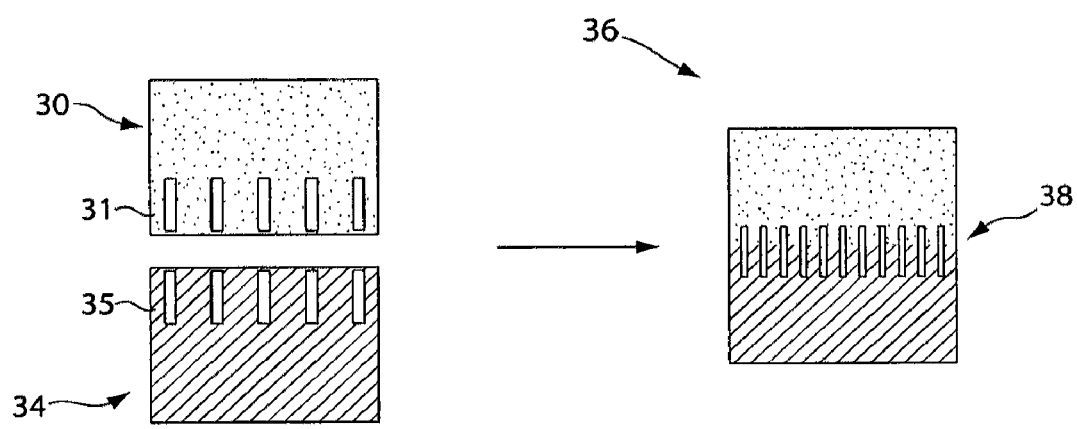
FIG. 9E shows the formation of a composite material containing aligned nanostructures.
Figure 9F:
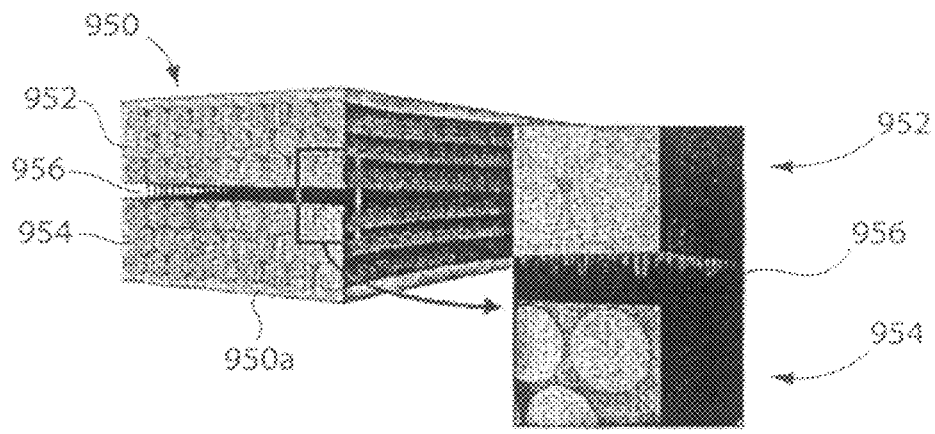
FIG. 9F shows a composite material comprising two material layers and an interface comprising aligned nanostructures between the material layers.
Figure 9G:
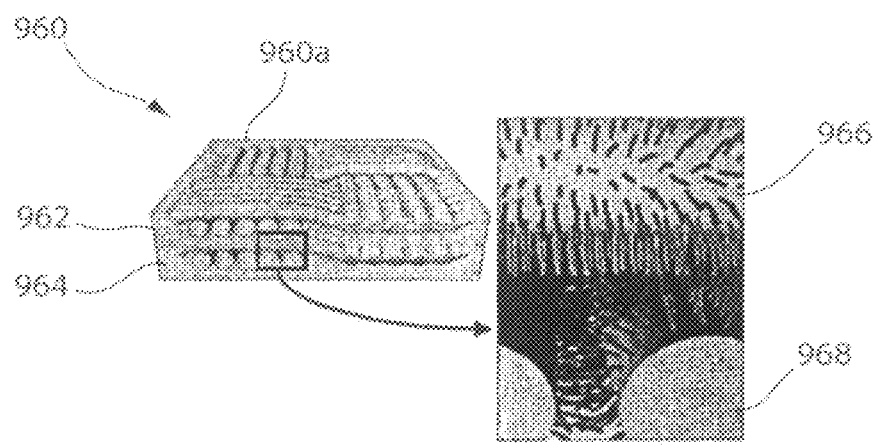
FIG. 9G shows a material comprising a set of fibers arranged in a woven pattern, each fiber having nanostructures arranged on the surface of the fiber.
Figures 21A, 21B:
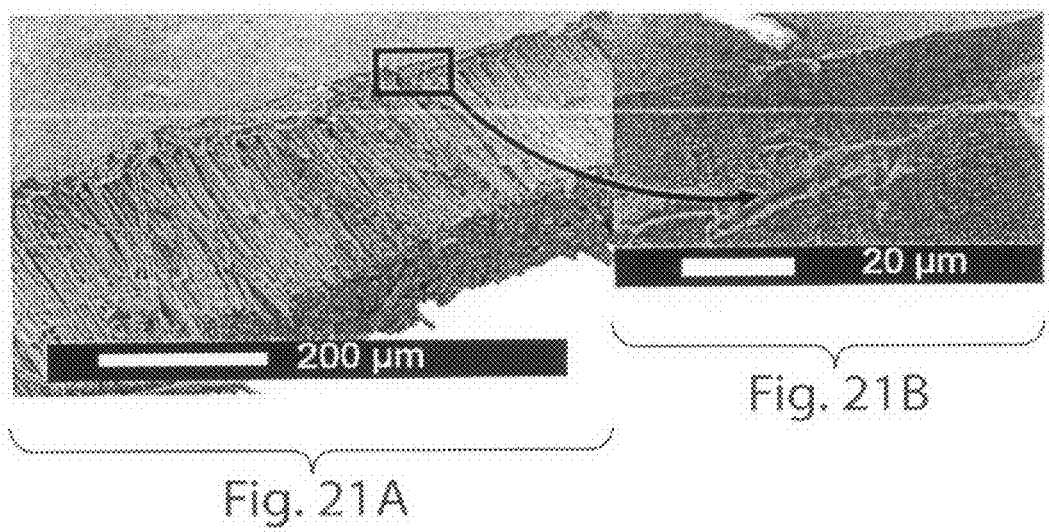
FIG. 21 shows an SEM image of a prepreg containing a forest of carbon nanotubes on its surface, at (a) 200 micron and (b) 20 micron scales.

To produce "nanostitched" composite structures, a rectangular piece of a commercially available graphite fiber/epoxy prepreg (AS4/3501-6 or IM7/977-3) was cut, and the CNT forest was transplanted to the surface of the prepreg using mechanical means, i.e., was transferred from the growth substrate to a receiving substrate, as illustrated in FIG. 9E. A caul plate was placed on top of the carbon nanotube "forest" and pressure was then applied in the form of a 100 g weight placed on the silicon wafer. The assembly was heated (or brought to room temperature) until the epoxy on the surface of the prepreg softened. The mechanical pressure and the softening of the epoxy allowed the carbon nanotubes to penetrate into the epoxy of the prepreg. The depth of nanotube penetration was controlled by adjusting the temperature of the surface and/or the magnitude of weight applied to the carbon nanotube substrate. When the CNTs were sufficiently embedded in the prepreg, the weight was removed and the epoxy was fully cured. FIG. 21 shows the resulting prepreg containing a forest of carbon nanotubes on its surface, at (a) 200 micron and (b) 20 micron scales. This configuration can be used for the creation of a reinforced multilayered composite material, as described herein.

Figure 22A:
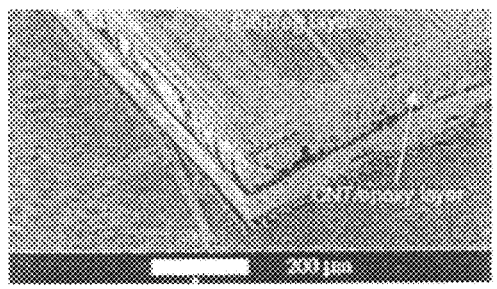
FIG. 22 shows SEM images of a composite material containing a carbon nanotube layer between two plies of graphite/epoxy prepregs, at (a) 200 micron and (b) 10 micron scales, and (c) a graph showing an increase in the fracture toughness of the composite material.
Figure 22B:
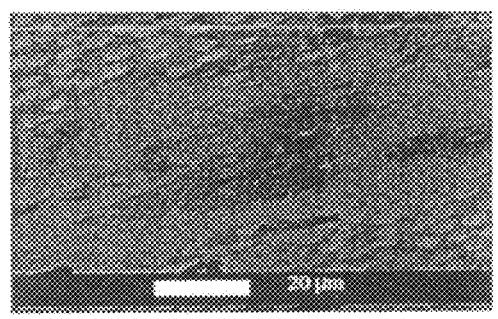

Alternatively, a carbon nanotube layer was placed between two plies of graphite/epoxy prepregs. The carbon nanotube forest was transplanted to the surface of one of the two prepreg plies, and the second ply was added on top of the forest, as illustrated schematically in FIG. 9D. The assembly was fully cured using an autoclave, and the resulting hybrid composite is shown in FIG. 22, at (a) 200 micron and (b) 10 micron scales. As seen in FIG. 22B, the carbon nanotubes in the interface penetrated into the prepreg ply ~5-7 μm (on the same order of the carbon fiber diameter), depending on the region.

Figure 22C:
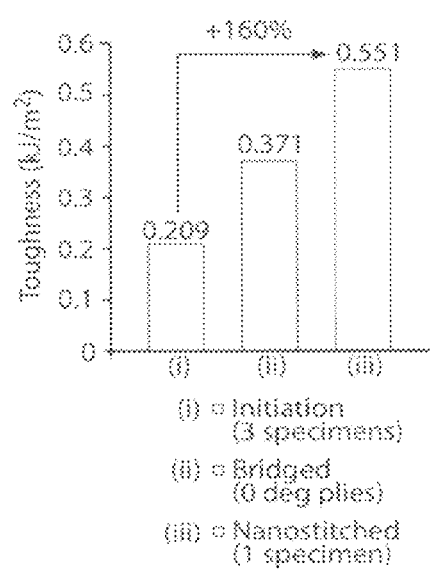

Double-cantilever beam specimens containing an aligned CNT layer in the midplane fabricated using the process described above were subjected to Mode I fracture tests. The results were compared with those of unreinforced composites. As shown in FIG. 22C, the carbon nanotube was shown to increase the fracture toughness of the composite by 60%, i.e., to 160%.

Figure 26A:
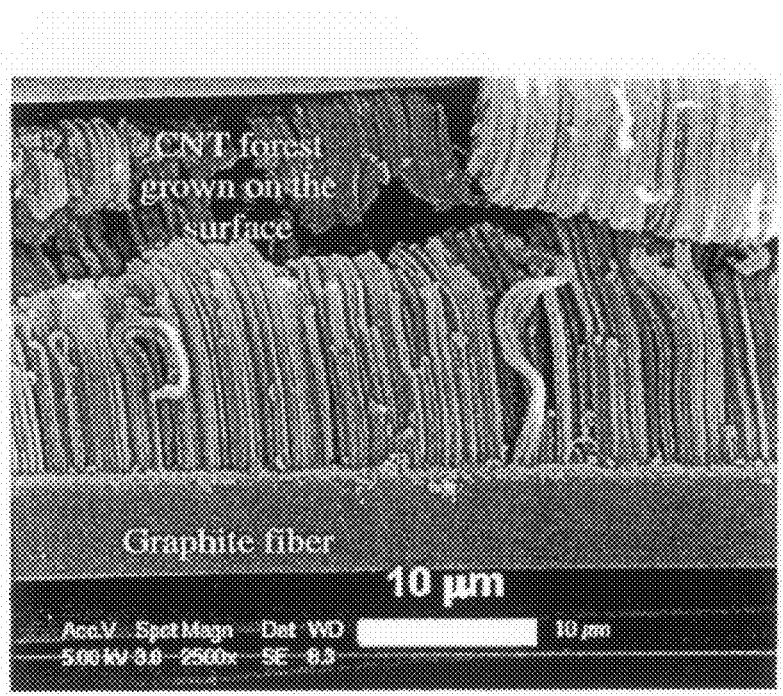
FIG. 26 shows an SEM image of carbon nanotubes grown on a graphite fiber.
Figure 26B:
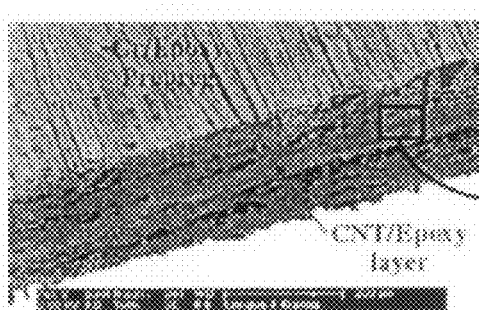
Figure 26C:
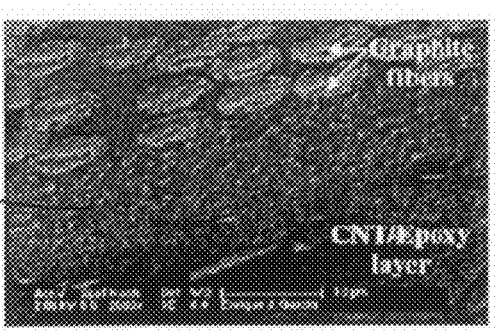
Figure 27A:
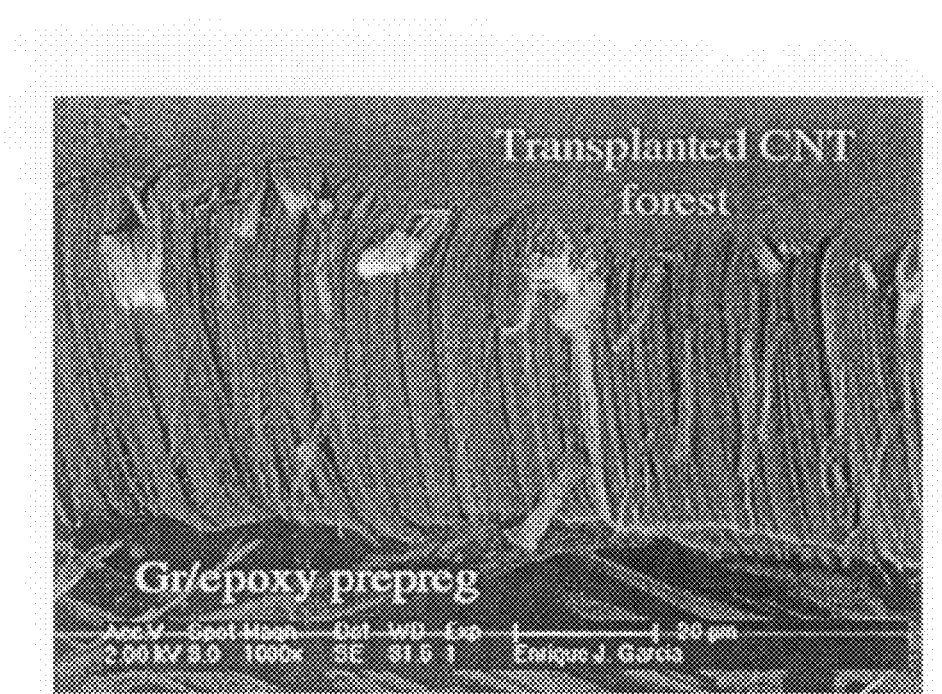
FIGS. 27A-D show SEM images of carbon nanotubes transplanted from a silicon substrate to a graphite/epoxy prepreg.
Figure 27B:
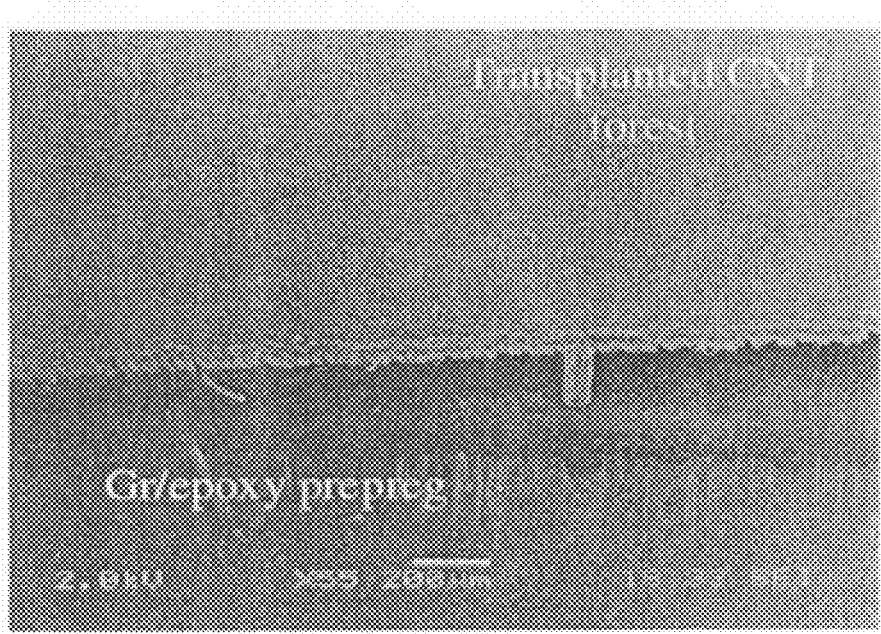
Figure 27C:
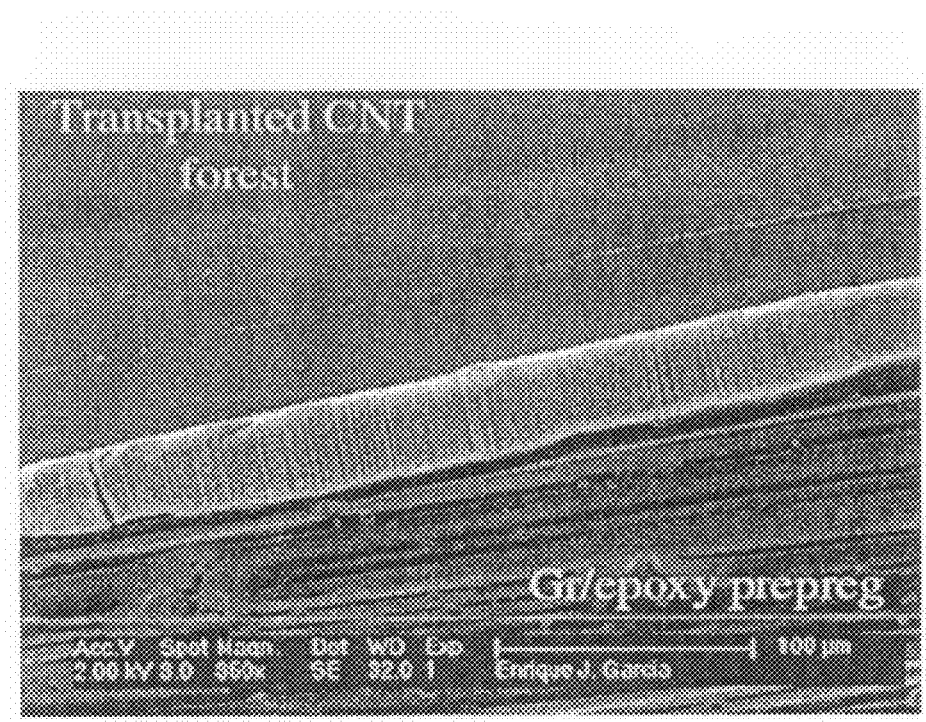
Figure 27D:
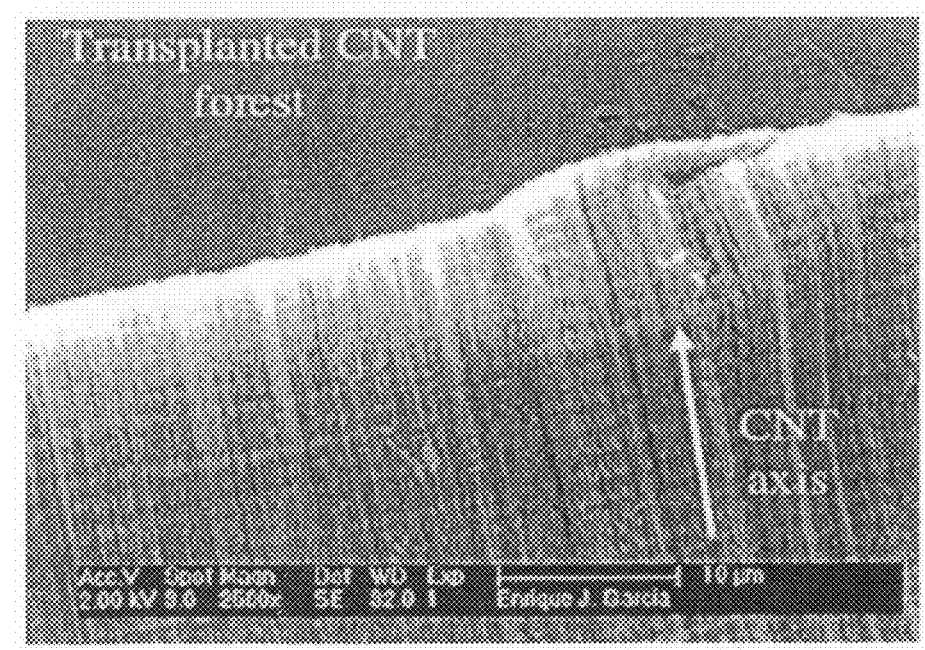

FIGS. 26B-C show SEM images of the carbon nanotube/graphite/epoxy hybrid composite on (a) 200 micron and (b) 10 micron scales.

Example 5

Figure 23:
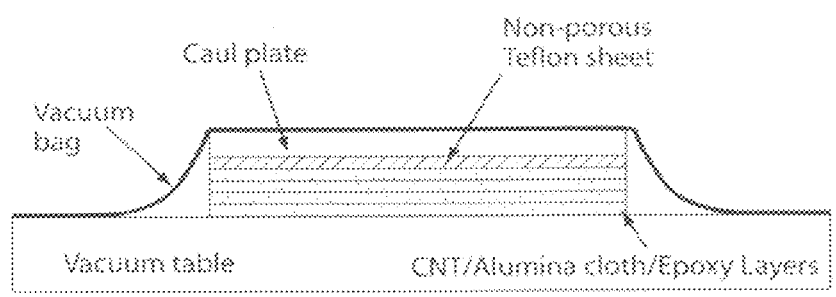
FIG. 23 illustrates the vacuum-assisted curing of a composite structure.

The following example describes the production of a woven, layered composite structure containing carbon nanotubes, alumina fiber, and epoxy. A carbon nanotube forest was grown to a height of 60 μm, according to the method described in Example 2. After growing the carbon nanotubes on the surface of the alumina fibers, the CNT/alumina cloth plies were submerged in Buehler's EpoThin epoxy and stacked to create a hybrid composite laminate. Vacuum-assisted curing was used to cure the composite structure, as illustrated in FIG. 23. The laminate was placed on a vacuum table, and a layer of non-porous Teflon was placed on top, followed by a caul plate of the same dimensions of the laminate (the non-porous Teflon was used to avoid the laminate sticking to the caul plate). Layers of porous Teflon and bleeding paper were placed on top of the assembly to remove the excess of epoxy during the curing process. A sheet of glass fiber was placed over the vacuum table to cover the assembly as well as the vacuum table, to ensure uniform distribution of the vacuum. Finally, a vacuum bag was used to enclose the assembly and a pressure of 30 psi was applied during the curing process.

A photograph of the resulting CNT/alumina/epoxy nanoengineered laminate is shown in FIG. 24A. The excess epoxy was effectively eliminated from the nanoengineered composite laminate by applying pressure (30 psi) during the curing process, and a sample was then cut with a fret-saw. An illustrative sample is shown by the photograph in FIG. 24B.

In an additional example, similar composite structures were manufactured with alumina cloth. Carbon nanotubes grown on the surface of fibers using the process described herein. Short beam shear (SBS) tests were applied to intralaminar specimens to determine the interlaminar shear strength. (FIG. 25A) The results were compared with those of similar composites lacking the carbon nanotubes, i.e., "unreinforced" composites, and are shown in FIG. 25. The CNT architecture increased the interlaminar shear strength of the composite by 70%.

Figure 29:
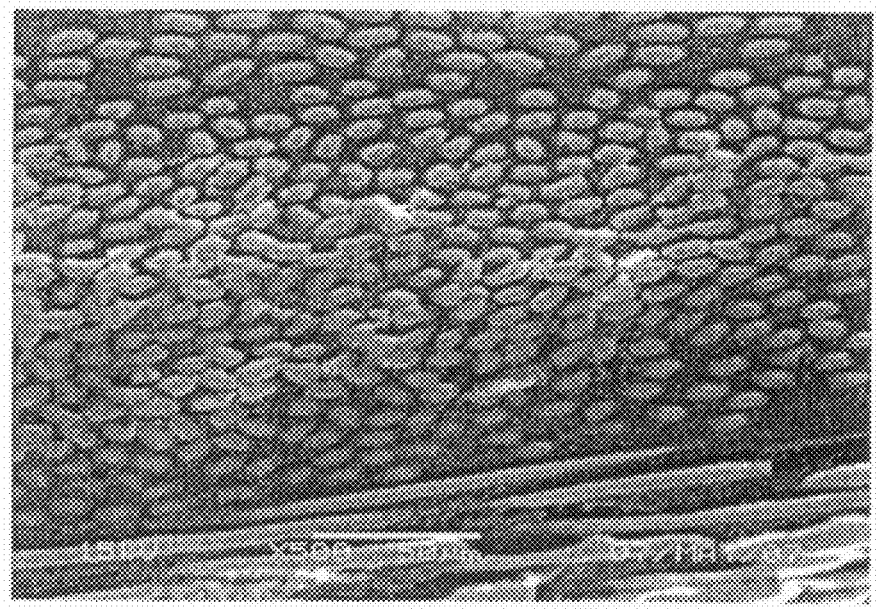
FIG. 29 shows an SEM image of a carbon nanotube/alumina fiber/epoxy intralaminar architecture, wherein full wetting and regular distribution of the fibers was observed.

Also, a composite structure containing carbon nanotubes, alumina fiber, and epoxy was manufactured following the steps described in Example 5. FIG. 29 shows an SEM image of the carbon nanotube/alumina/epoxy hybrid composite on a 50 micron scale. As shown by FIG. 29, the epoxy fully penetrates and wets the carbon nanotubes and alumina fibers. The uniform distribution of the fibers can also be observed.

The electrical conductivity of the composite structure containing carbon nanotubes, alumina fiber, and epoxy was then studied. FIG. 31A shows, schematically, the experimental setup for the electrical conductivity tests, where the composite was placed between two silver paint electrodes and its electrical properties were measures. FIG. 31B shows the results from the electrical resistivity measurements.

Example 6

In the following example, a set of carbon nanotubes was grown, as described herein, on a graphite (e.g., carbon) fiber and was utilized in the fabrication of various composite structures. As shown in the SEM image in FIG. 26A, carbon nanotubes were grown on a graphite fiber wherein the long axes of the carbon nanotubes are oriented perpendicular to the fiber surface.

Example 7

Figure 28A:
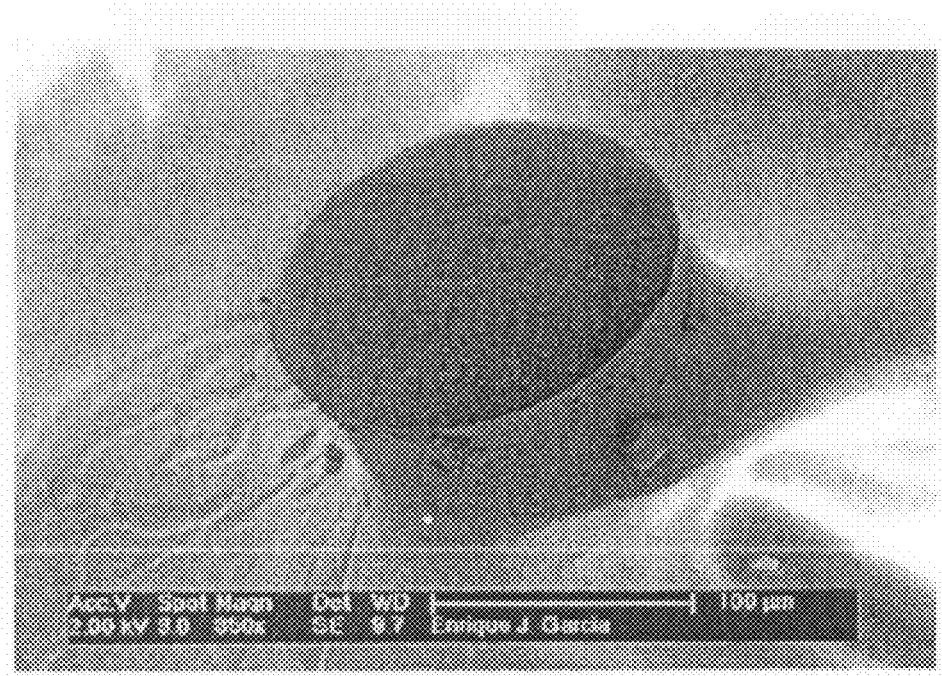
FIGS. 28A-C show SEM images of fully wet carbon nanotube/epoxy pillars.
Figure 28B:
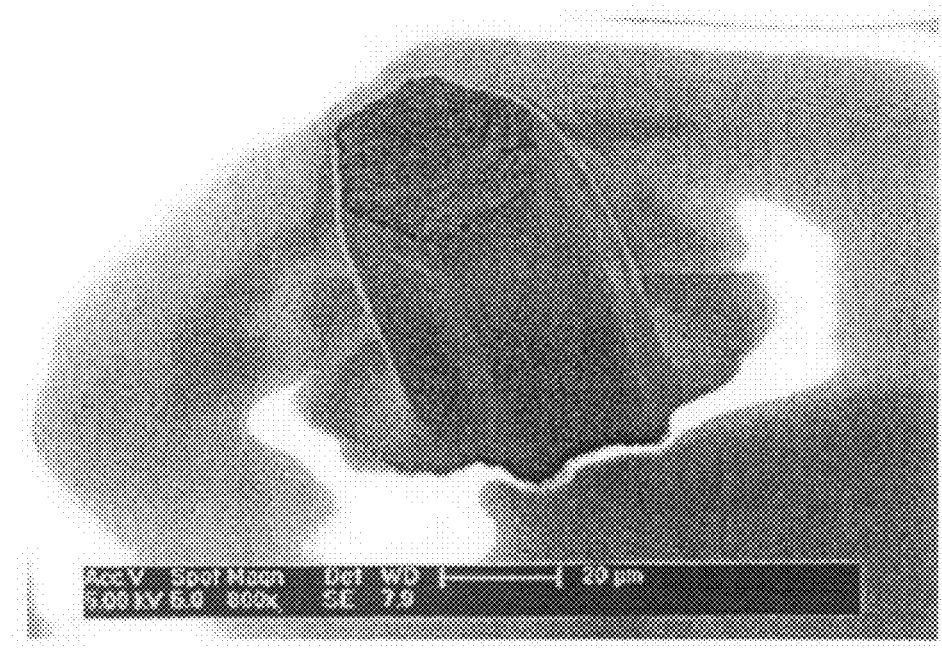
Figure 28C:
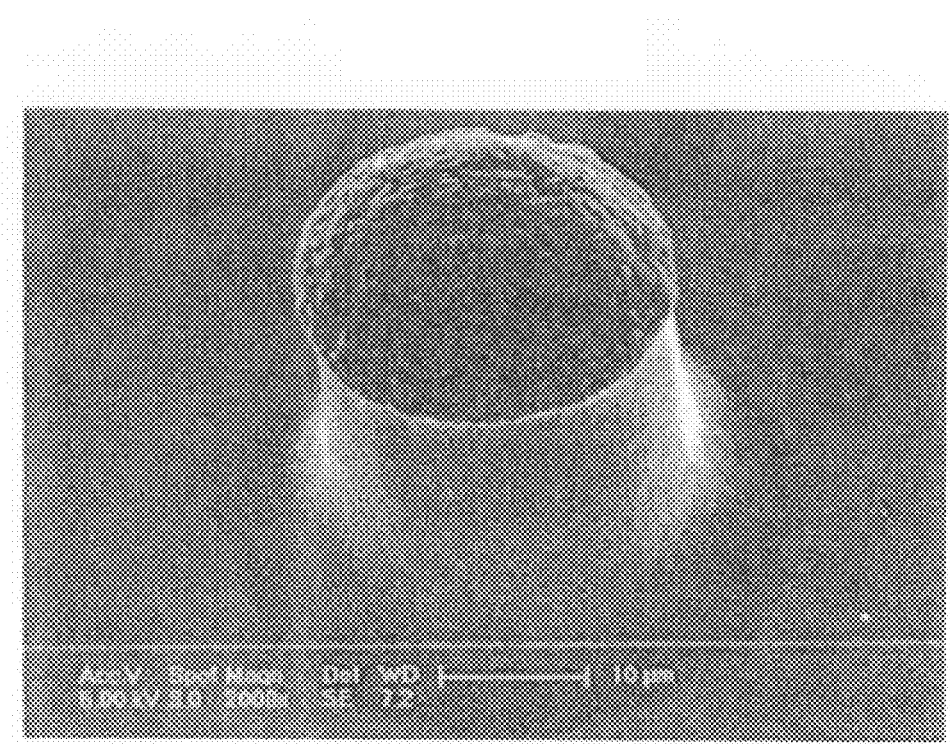

Nanostructure "pillars" containing carbon nanotubes and epoxy were fabricated using the submersion method. FIGS. 28A-C shows SEM images of carbon nanotube/epoxy pillars fully wet and with their shapes and CNT alignment maintained.

Example 8

The following example describes the production of carbon nanotubes using a continuous process as described herein.

Figure 32A:
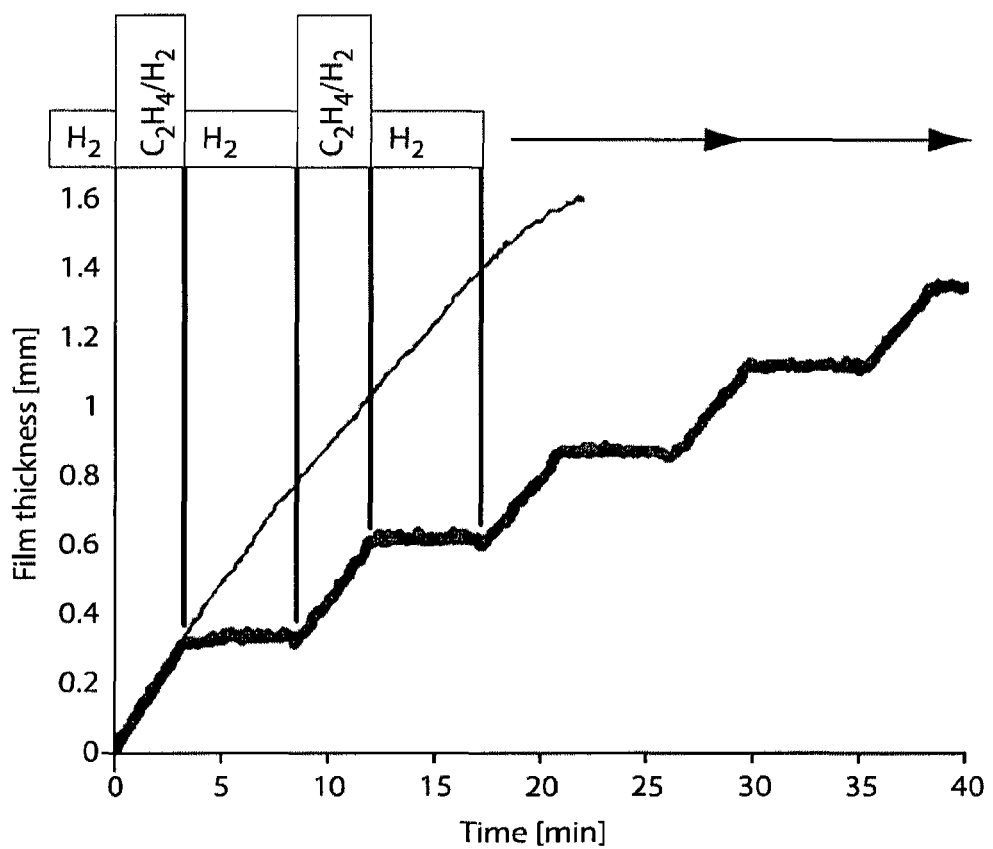
FIG. 32 shows (a) real-time measurement of the thickness of a film of aligned carbon nanotubes grown on a growth substrate upon intervals of exposure to carbon nanotubes growth conditions, (b) an SEM image of the carbon nanotube film produced, and (c) separation of layers of carbon nanotubes, wherein each layer represents the growth of carbon nanotubes per interval.
Figure 32B:
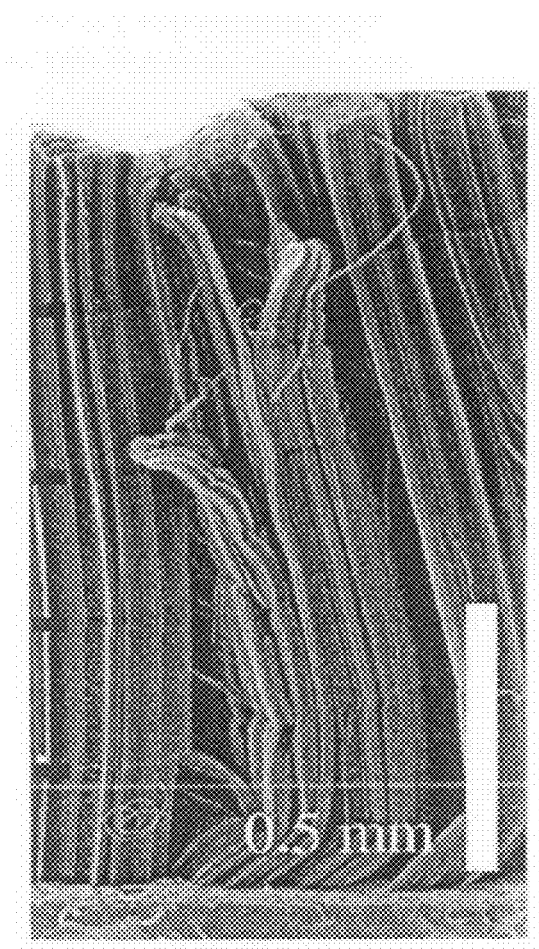
Figure 32C:
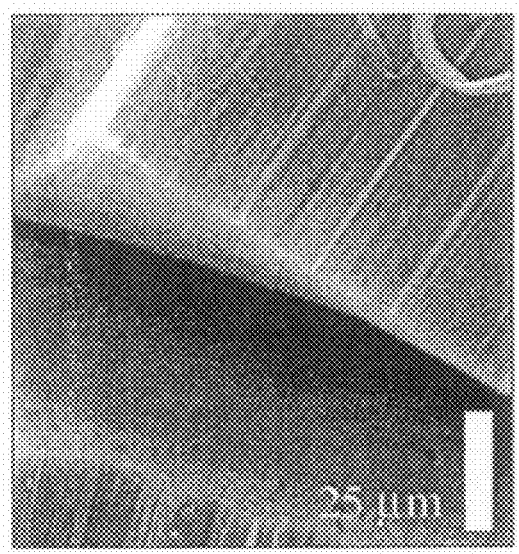

FIG. 32A shows real-time measurement of the thickness of a film of aligned carbon nanotubes grown on a growth substrate by cycling the atmosphere surrounding the growth substrate between a reactive, $C_2H_4/H_2$ atmosphere and an inert, $H_2$ atmosphere, where the marks placed along the left edge of the image indicate the interfaces between consecutive layers. The film grew upon exposure of the growth substrate, coated with Fe catalyst and $Al_2O_3$ supporting layer, was exposed to $C_2H_4/H_2$, and growth was paused when the substrate is exposed to $H_2$ alone This was replicated in a continuous fashion using a rotating cylindrical substrate where the growth zone was maintained at temperature T in an atmosphere of $C_2H_4/H_2$ ("condition set 1") and the delamination and pre-treatment zones were maintained at a different temperature ("condition set 2"). During this stage of continuous operation, where the same catalyst was recycled many times, the intermediate zones was maintained at condition set 2 and the catalyst could be removed and replaced when it was no longer suitably active for production of nanostructures. FIG. 32B shows a scanning electron micrograph of the carbon nanotube film grown by this process, where the marks placed along the left edge of the image indicate the interfaces between consecutive layers. The layers can be cleanly separated as shown in FIG. 32C, wherein each layer represents the growth of carbon nanotubes per interval.

Example 9

Figure 33A:
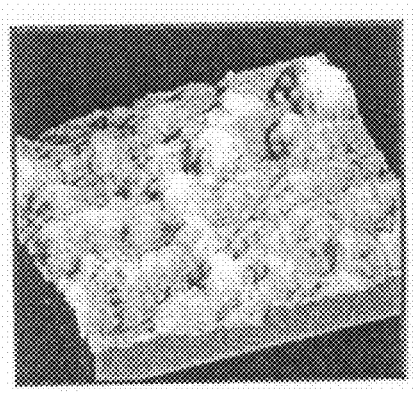
FIG. 33 shows AFM images of the surface topography of an Fe/Al$_2$O$_3$ (1/10 nm) supported catalyst film on a silicon substrate (a) after deposition but before any thermal or chemical treatment, (b) after heating in argon atmosphere and subsequent cooling, (c) after heating in argon/H$_2$ atmosphere and subsequent cooling.
Figure 33B:
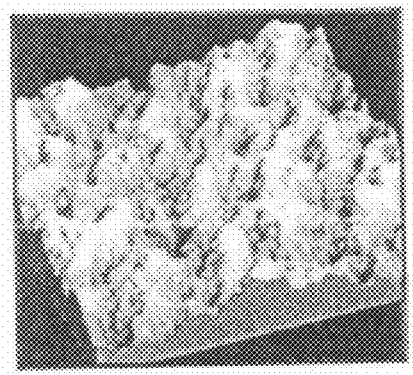
Figure 33C:
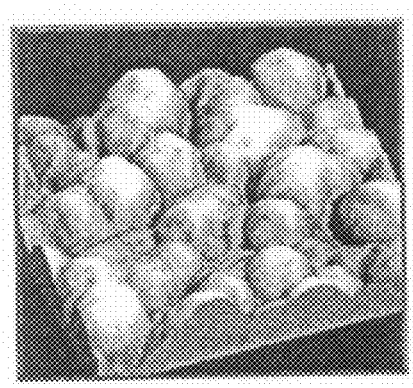

FIG. 33 shows AFM images of the surface topography of an $Fe/Al_2O_3$ (1/10 nm) supported catalyst film on a silicon substrate (a) after deposition but before any thermal or chemical treatment, (b) after heating in argon atmosphere and subsequent cooling, (c) after heating in argon/$H_2$ atmosphere and subsequent cooling. FIG. 33C may indicate that pre-treating the catalyst-coated substrate in a reducing ($H_2$-containing) atmosphere may aid in formation of Fe nanoparticles which are growth sites for carbon nanotubes when $C_2H_4$ is later added to the reaction atmosphere.

Example 10

Figure 37A:
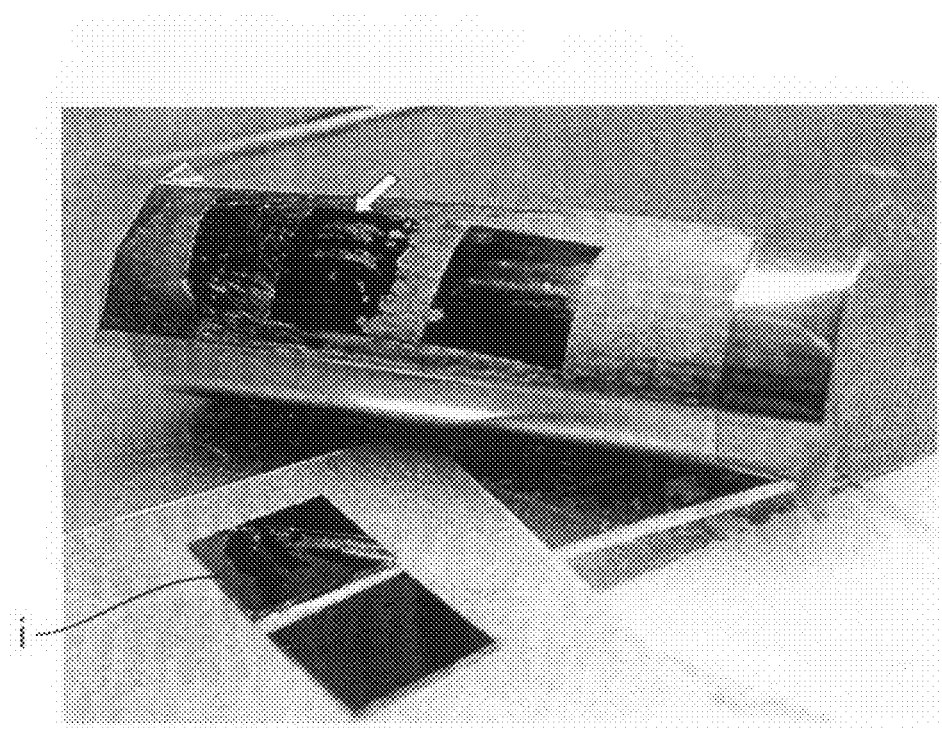
FIG. 37A shows a photograph of carbon nanotubes transferred from substantially planar substrate (i) to a prepreg positioned on a plastic roller.
Figure 37B:
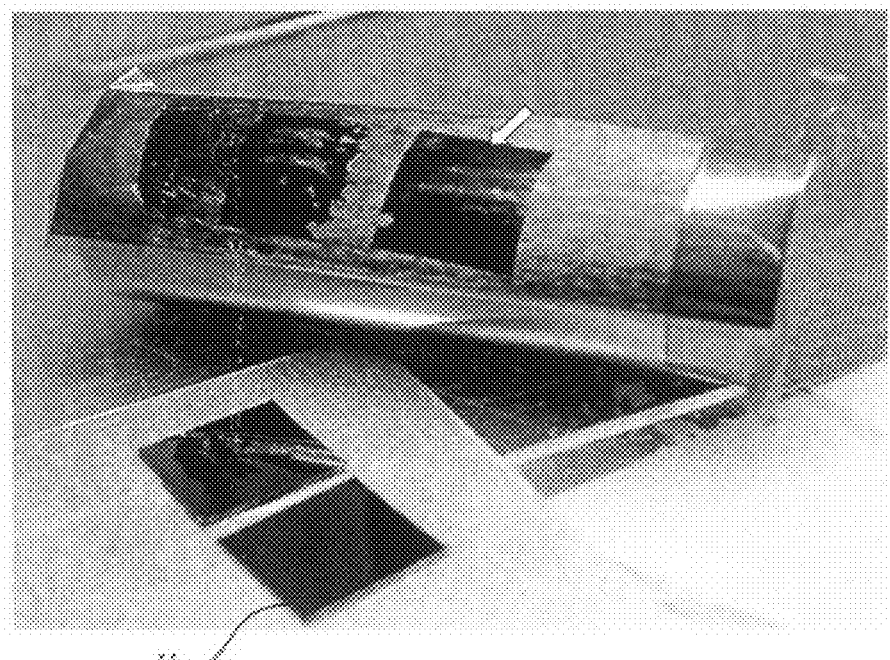
FIG. 37B shows a photograph of carbon nanotubes transferred from substantially planar substrate (ii) to a prepreg positioned on an aluminum cylinder with controllable pressure exerted on the cylinder. Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

Various substrate materials were investigated in the transfer of a set of carbon nanotubes from a first substrate to a second substrate. In the following example, a cylindrical substrate was rolled over a substantially planar substrate comprising carbon nanotubes position on the surface of the substrate. In some cases, the transfer of carbon nanotubes may be affected by the types of material used as the first and/or second substrate, as well as any external forces, as described herein, chemical agents, mechanical tools (e.g., an airknife), etc., used to facilitate transfer of the nanostructures. FIG. 37A shows carbon nanotubes transferred from substantially planar substrate (i) to a prepreg positioned on a plastic roller. Small regions (~15% of the total surface) of the carbon nanotubes were not transplanted to the prepreg on the plastic roller. FIG. 37B shows carbon nanotubes transferred from substantially planar substrate (ii) to a prepreg positioned on an aluminum cylinder (shown in FIG. 37) with controllable pressure exerted on the cylinder. Essentially complete transplantation of the carbon nanotubes from the original substrate (ii) to the prepreg attached to the cylinder was achieved.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed:

1. A composite article, comprising:
a first material layer, and a second material layer integrally connected to the first material layer, forming an interface of the material layers, the interface comprising a set of nanostructures dispersed uniformly throughout at least 10% of the interface, wherein the long axes of the nanostructures are substantially aligned and non-parallel to the interface of the material layers and at least some of the nanostructures penetrate a joining surface of at least one of the first and second material layers.

2. A composite article as in claim 1, wherein the set of nanostructures comprises a nanotube, a nanofiber, and/or a nanowire.

3. A composite article as in claim 1, wherein the set of nanostructures comprises a nanotube.

4. A composite article as in claim 1, wherein the set of nanostructures comprises a carbon nanotube.

5. A composite article as in claim 1, wherein the long axes of the nanostructures are substantially aligned and perpendicular to the interface of the material layers.

6. A composite article as in claim 1, wherein the composite article comprises a binding material between the first material layer and the second material layer.

7. A composite article as in claim 6, wherein the binding material comprises a polymeric material.

8. A composite article as in claim 7, wherein the polymeric material comprises a conducting material.

9. A composite article as in claim 8, wherein the conducting material comprises a conducting fiber.

10. A composite article as in claim 8, wherein the conducting material comprises a conducting weave.

11. A composite article as in claim 8, wherein the conducting material comprises a conducting polymeric material.

12. A composite article as in claim 8, wherein the conducting material comprises conducting nanostructures.

13. A composite article as in claim 1, wherein at least one of the first and second material layers comprises a fiber.

14. A composite article as in claim 1, wherein at least one of the first and second material layers comprises a prepreg comprising fibers and at least one polymer material.

15. A composite article as in claim 14, wherein at least one of the first and second material layers further comprises a conducting material, fibers, weaves, and/or nanostructures.

16. A composite article as in claim 1, wherein the composite article exhibits higher mechanical strength and/or toughness when compared to an essentially identical composite article lacking the set of substantially aligned nanostructures, under essentially identical conditions.

17. A composite article as in claim 1, wherein the composite article exhibits higher thermal and/or electrical conductivity when compared to an essentially identical composite article lacking the set of substantially aligned nanostructures, under essentially identical conditions.

18. A composite article as in claim 17, wherein the thermal and/or electrical conductivity is anisotropic.

19. A composite article as in claim 1, wherein the composite article comprises a support material within the first and/or second material layers.

20. A composite article as in claim 19, wherein the support material comprises a monomer.

21. A composite article as in claim 19, wherein the support material comprises a polymer.

22. A composite article as in claim 19, wherein the support material comprises a fiber.

23. A composite article as in claim 19, wherein the support material comprises a metal.

24. A composite article as in claim 1, wherein the nanostructures are dispersed uniformly throughout at least 20% of the interface.

25. A composite article as in claim 1, wherein the nanostructures are dispersed uniformly throughout at least 30% of the interface.

26. A composite article as in claim 1, wherein the nanostructures are dispersed uniformly throughout at least 40% of the interface.

27. A composite article as in claim 1, wherein the nanostructures are dispersed uniformly throughout at least 50% of the interface.

28. A composite article as in claim 1, wherein the nanostructures are dispersed uniformly throughout at least 60% of the interface.

29. A composite article as in claim 1, wherein the nanostructures are dispersed uniformly throughout at least 70% of the interface.

30. A composite article as in claim 1, wherein the nanostructures are dispersed uniformly throughout at least 80% of the interface.

31. A composite article as in claim 1, wherein the nanostructures are dispersed uniformly throughout at least 90% of the interface.

32. A composite article as in claim 1, wherein the nanostructures are dispersed uniformly throughout at least 95% of the interface.

33. A composite article as in claim 1, wherein the nanostructures are dispersed uniformly throughout a substantial majority of the interface.

34. A composite article as in claim 1, wherein the nanostructures have an average diameter of 100 nm or less.

35. A composite article as in claim 1, wherein the nanostructures have an average diameter of 75 nm or less.

36. A composite article as in claim 1, wherein the nanostructures have an average diameter of 50 nm or less.

37. A composite article as in claim 1, wherein the nanostructures have an average diameter of 25 nm or less.

38. A composite article as in claim 1, wherein the nanostructures have an average diameter of 10 nm or less.

39. A composite article as in claim 1, wherein at least some of the nanostructures penetrate a joining surface of the first material layer and a joining surface of the second material layer.

40. A composite article as in claim 1, wherein the joining surface of the first material layer is in contact with the joining surface of the second material layer.

41. A composite article as in claim 1, wherein the joining surface of the first material layer is not in contact with the joining surface of the second material layer.

42. A composite article as in claim 1, wherein at least one of the first and second material layers comprises a resin film.

43. A composite article as in claim 1, wherein at least one of the first and second material layers comprises a dry weave.

44. A composite article as in claim 1, wherein at least one of the first and second material layers comprises a tow.

45. A composite article, comprising:
a first material layer, and a second material layer integrally connected to the first material layer, forming an interface of the material layers, the interface comprising a set of nanostructures, wherein the long axes of the nanostructures are substantially aligned and non-parallel to the interface of the material layers, the nanostructures have an average diameter of 100 nm or less, and at least some of the nanostructures penetrate a joining surface of at least one of the first and second material layers.

46. A composite article as in claim 45, wherein the set of nanostructures comprises a nanotube, a nanofiber, and/or a nanowire.

47. A composite article as in claim 45, wherein the set of nanostructures comprises a nanotube.

48. A composite article as in claim 45, wherein the set of nanostructures comprises a carbon nanotube.

49. A composite article as in claim 45, wherein the long axes of the nanostructures are substantially aligned and perpendicular to the interface of the material layers.

50. A composite article as in claim 45, wherein the composite article comprises a binding material between the first material layer and the second material layer.

51. A composite article as in claim 50, wherein the binding material comprises a polymeric material.

52. A composite article as in claim 51, wherein the polymeric material comprises a conducting material.

53. A composite article as in claim 52, wherein the conducting material comprises a conducting fiber.

54. A composite article as in claim 52, wherein the conducting material comprises a conducting weave.

55. A composite article as in claim 52, wherein the conducting material comprises a conducting polymeric material.

56. A composite article as in claim 52, wherein the conducting material comprises conducting nanostructures.

57. A composite article as in claim 45, wherein at least one of the first and second material layers comprises a fiber.

58. A composite article as in claim 45, wherein at least one of the first and second material layers comprises a prepreg comprising fibers and at least one polymer material.

59. A composite article as in claim 58, wherein at least one of the first and second material layers further comprises a conducting material, fibers, weaves, and/or nanostructures.

60. A composite article as in claim 45, wherein the composite article exhibits higher mechanical strength and/or toughness when compared to an essentially identical composite article lacking the set of substantially aligned nanostructures, under essentially identical conditions.

61. A composite article as in claim 45, wherein the composite article exhibits higher thermal and/or electrical conductivity when compared to an essentially identical composite article lacking the set of substantially aligned nanostructures, under essentially identical conditions.

62. A composite article as in claim 61, wherein the thermal and/or electrical conductivity is anisotropic.

63. A composite article as in claim 45, wherein the composite article comprises a support material within the first and/or second material layers.

64. A composite article as in claim 63, wherein the support material comprises a monomer.

65. A composite article as in claim 63, wherein the support material comprises a polymer.

66. A composite article as in claim 63, wherein the support material comprises a fiber.

67. A composite article as in claim 63, wherein the support material comprises a metal.

68. A composite article as in claim 45, wherein the nanostructures are dispersed uniformly throughout at least 10% of the interface.

69. A composite article as in claim 45, wherein the nanostructures are dispersed uniformly throughout at least 20% of the interface.

70. A composite article as in claim 45, wherein the nanostructures are dispersed uniformly throughout at least 30% of the interface.

71. A composite article as in claim 45, wherein the nanostructures are dispersed uniformly throughout at least 40% of the interface.

72. A composite article as in claim 45, wherein the nanostructures are dispersed uniformly throughout at least 50% of the interface.

73. A composite article as in claim 45, wherein the nanostructures are dispersed uniformly throughout at least 60% of the interface.

74. A composite article as in claim 45, wherein the nanostructures are dispersed uniformly throughout at least 70% of the interface.

75. A composite article as in claim 45, wherein the nanostructures are dispersed uniformly throughout at least 80% of the interface.

76. A composite article as in claim 45, wherein the nanostructures are dispersed uniformly throughout at least 90% of the interface.

77. A composite article as in claim 45, wherein the nanostructures are dispersed uniformly throughout at least 95% of the interface.

78. A composite article as in claim 45, wherein the nanostructures are dispersed uniformly throughout a substantial majority of the interface.

79. A composite article as in claim 45, wherein the nanostructures have an average diameter of 75 nm or less.

80. A composite article as in claim 45, wherein the nanostructures have an average diameter of 50 nm or less.

81. A composite article as in claim 45, wherein the nanostructures have an average diameter of 25 nm or less.

82. A composite article as in claim 45, wherein the nanostructures have an average diameter of 10 nm or less.

83. A composite article as in claim 45, wherein at least some of the nanostructures penetrate a joining surface of the first material layer and a joining surface of the second material layer.

84. A composite article as in claim 45, wherein the joining surface of the first material layer is in contact with the joining surface of the second material layer.

85. A composite article as in claim 45, wherein the joining surface of the first material layer is not in contact with the joining surface of the second material layer.

86. A composite article as in claim 45, wherein at least one of the first and second material layers comprises a resin film.

87. A composite article as in claim 45, wherein at least one of the first and second material layers comprises a dry weave.

88. A composite article as in claim 45, wherein at least one of the first and second material layers comprises a tow.

* * * * *